US008995385B2

(12) United States Patent
Nam et al.

(10) Patent No.: US 8,995,385 B2
(45) Date of Patent: Mar. 31, 2015

(54) APPARATUS AND METHOD FOR UE-SPECIFIC DEMODULATION REFERENCE SIGNAL SCRAMBLING

(75) Inventors: Young-Han Nam, Richardson, TX (US); Jianzhong Zhang, Plano, TX (US); Jin-Kyu Han, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 293 days.

(21) Appl. No.: 13/564,469

(22) Filed: Aug. 1, 2012

(65) Prior Publication Data
US 2013/0034064 A1 Feb. 7, 2013

Related U.S. Application Data

(60) Provisional application No. 61/515,730, filed on Aug. 5, 2011, provisional application No. 61/525,605, filed on Aug. 19, 2011, provisional application No. 61/554,891, filed on Nov. 2, 2011, provisional application No. 61/565,885, filed on Dec. 1, 2011, provisional application No. 61/651,885, filed on May 25, 2012.

(51) Int. Cl.
*H04L 12/26* (2006.01)
*H04W 72/12* (2009.01)
(52) U.S. Cl.
CPC .......... *H04W 72/1294* (2013.01); *H04W 72/12* (2013.01)
USPC .......................................... 370/330

(58) Field of Classification Search
CPC ... H04L 5/0051; H04L 1/0041; H04L 1/0075; H04B 7/043; H04B 7/0417; H04W 72/12
USPC .................................. 370/329, 330; 455/450
See application file for complete search history.

(56) References Cited

U.S. PATENT DOCUMENTS

2009/0238064 A1   9/2009  Lee et al.
2009/0323957 A1   12/2009  Luo et al.
(Continued)

OTHER PUBLICATIONS

International Search Report dated Feb. 26, 2013 in connection with International Application No. PCT/KR2012/006235, 3 pages.
(Continued)

*Primary Examiner* — Raj Jain

(57) ABSTRACT

A user equipment (UE) is configured to communicate with a plurality of base stations in a wireless network. The UE includes a processor that receive a downlink grant scheduling a physical downlink shared channel (PDSCH) for the UE, the downlink grant being transmitted in a physical downlink control channel (PDCCH) or an enhanced physical downlink control channel (ePDCCH). The processor also receives UE-specific demodulation reference signals (UE-RS) provided for demodulation of the PDSCH, wherein the UE-RS are scrambled according to a scrambling sequence initialized with an initialization value $c_{init}$. The downlink grant includes a one-bit scrambling identifier (SCID) information field configured to indicate a pair of values comprising a scrambling identifier $n_{SCID}$ and a virtual cell ID $N_{v-ID}^{cell}$ out of two candidate pairs, the pair of values to be used for determining the initialization value $c_{init}$ for the UE-RS.

27 Claims, 8 Drawing Sheets

(56) References Cited

U.S. PATENT DOCUMENTS

| | | | |
|---|---|---|---|
| 2010/0323709 A1* | 12/2010 | Nam et al. | 455/450 |
| 2011/0085503 A1 | 4/2011 | Nam et al. | |
| 2012/0039298 A1* | 2/2012 | Lee et al. | 370/330 |
| 2012/0327885 A1* | 12/2012 | Chung et al. | 370/329 |
| 2013/0010685 A1* | 1/2013 | Kim et al. | 370/315 |
| 2013/0208645 A1* | 8/2013 | Feng et al. | 370/312 |

OTHER PUBLICATIONS

Written Opinion of International Searching Authority dated Feb. 26, 2013 in connection with International Application No. PCT/KR2012/006235, 3 pages.

Samsung, 3GPP TSG RAN WG1 #62, R1-104973, "Scrambling for DM-RS", Madrid, Spain, Aug. 23-Aug. 27, 2010, 2 pages.

* cited by examiner

APPARATUS AND METHOD FOR UE-SPECIFIC DEMODULATION REFERENCE SIGNAL SCRAMBLING

CROSS-REFERENCE TO RELATED APPLICATION(S) AND CLAIM OF PRIORITY

The present application is related to U.S. Provisional Patent Application No. 61/515,730, filed Aug. 5, 2011, entitled "METHODS AND APPARATUS ON TRANSMISSION POINT SPECIFIC CONFIGURATIONS", U.S. Provisional Patent Application No. 61/525,605, filed Aug. 19, 2011, entitled "METHODS AND APPARATUS ON DEMODULATION REFERENCE SIGNALS IN WIRELESS COMMUNICATIONS SYSTEMS", U.S. Provisional Patent Application No. 61/554,891, filed Nov. 2, 2011, entitled "METHODS AND APPARATUS ON DEMODULATION REFERENCE SIGNALS IN WIRELESS COMMUNICATIONS SYSTEMS", U.S. Provisional Patent Application No. 61/565,885, filed Dec. 1, 2011, entitled "METHODS AND APPARATUS ON DEMODULATION REFERENCE SIGNALS IN WIRELESS COMMUNICATIONS SYSTEMS", and U.S. Provisional Patent Application No. 61/651,885, filed May 25, 2012, entitled "METHODS AND APPARATUS ON DEMODULATION REFERENCE SIGNALS IN WIRELESS COMMUNICATIONS SYSTEMS". Provisional Patent Application Nos. 61/515,730, 61/525,605, 61/554,891, 61/565,885 and 61/651,885 are assigned to the assignee of the present application and is hereby incorporated by reference into the present application as if fully set forth herein. The present application hereby claims priority under 35 U.S.C. §119(e) to U.S. Provisional Patent Application Nos. 61/515,730, 61/525,605, 61/554,891, 61/565,885 and 61/651,885.

TECHNICAL FIELD

The present application relates generally to wireless communication and, more specifically, to a system and method for UE-specific demodulation reference signal scrambling.

BACKGROUND

In 3 GPP Long Term Evolution (LTE) and Long Term Evolution-Advanced (LTE-A) systems, there are two types of uplink reference signals (UL RS): demodulation reference signals (DM-RS) and sounding reference signals (SRS). For physical uplink shared channel (PUSCH) transmission, DM-RS signals are transmitted on two SC-FDMA (Single Carrier Frequency Division Multiple Access) symbols, one SC-FDMA symbol per each of the two time slots in a subframe. SRS is transmitted on one SC-FDMA symbol, the last SC-FDMA symbol of the second slot in a subframe. In Release 10 of the LTE standard, DM-RS scrambling initialization depends on the physical cell identity (PCI) and the scrambling identity (SCID).

SUMMARY

A method is provided for use in a user equipment (UE) configured to communicate with a plurality of base stations in a wireless network. The method includes receiving a downlink grant scheduling a physical downlink shared channel (PDSCH) for the UE, the downlink grant being transmitted in a physical downlink control channel (PDCCH) or an enhanced physical downlink control channel (ePDCCH). The method also includes receiving UE-specific demodulation reference signals (UE-RS) provided for demodulation of the PDSCH, wherein the UE-RS are scrambled according to a scrambling sequence initialized with an initialization value $c_{init}$. The downlink grant includes a one-bit scrambling identifier (SCID) information field configured to indicate a pair of values comprising a scrambling identifier $n_{SCID}$ and a virtual cell ID $N_{v\text{-}ID}^{cell}$ out of two candidate pairs, the pair of values to be used for determining the initialization value $c_{init}$ for the UE-RS. $c_{init}$ is determined according to the equation $c_{init} = (\lfloor n_s/2 \rfloor + 1) \cdot (2N_{v\text{-}ID}^{cell} + 1) \cdot 2^{16} + n_{SCID}$ where $n_s$ is a slot number.

A user equipment (UE) configured to communicate with a plurality of base stations in a wireless network is provided. The user equipment includes a processor configured to receive a downlink grant scheduling a physical downlink shared channel (PDSCH) for the UE, the downlink grant being transmitted in a physical downlink control channel (PDCCH) or an enhanced physical downlink control channel (ePDCCH). The processor is further configured to receive UE-specific demodulation reference signals (UE-RS) provided for demodulation of the PDSCH, wherein the UE-RS are scrambled according to a scrambling sequence initialized with an initialization value $c_{init}$. The downlink grant comprises a one-bit scrambling identifier (SCID) information field configured to indicate a pair of values comprising a scrambling identifier $n_{SCID}$ and a virtual cell ID $N_{v\text{-}ID}^{cell}$ out of two candidate pairs, the pair of values to be used for determining the initialization value $c_{init}$ for the UE-RS. $C_{init}$ is determined according to the equation $c_{init} = (\lfloor n_s/2 \rfloor + 1) \cdot (2N_{v\text{-}ID}^{cell} + 1) \cdot 2^{16} + n_{SCID}$ where $n_s$ is a slot number.

A base station configured for communication with a plurality of user equipments (UEs) is provided. The base station includes a processor configured to transmit a downlink grant scheduling a physical downlink shared channel (PDSCH) for the UE, the downlink grant being transmitted in a physical downlink control channel (PDCCH) or an enhanced physical downlink control channel (ePDCCH). The processor is also configured to transmit UE-specific demodulation reference signals (UE-RS) provided for demodulation of the PDSCH, wherein the UE-RS are scrambled according to a scrambling sequence initialized with an initialization value $c_{init}$. The downlink grant comprises a one-bit scrambling identifier (SCID) information field configured to indicate a pair of values comprising a scrambling identifier $n_{SCID}$ and a virtual cell ID $N_{v\text{-}ID}^{cell}$ out of two candidate pairs, the pair of values to be used for determining the initialization value $c_{init}$ for the UE-RS. $C_{init}$ is determined according to the equation $c_{init} = (\lfloor n_s/2 \rfloor + 1) \cdot (2N_{v\text{-}ID}^{cell} + 1) \cdot 2^{16} + n_{SCID}$ where $n_s$ is a slot number.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) 3GPP Technical Specification No. 36.211, version 10.1.0, "E-UTRA, Physical Channels and Modulation" (hereinafter "REF1"); (ii) 3GPP Technical Specification No. 36.212, version 10.1.0, "E-UTRA, Multiplexing and Channel Coding" (hereinafter "REF2"); and (iii) 3GPP Technical Specification No. 36.213, version 10.1.0, "E-UTRA, Physical Layer Procedures" (hereinafter "REF3").

Figure 1:
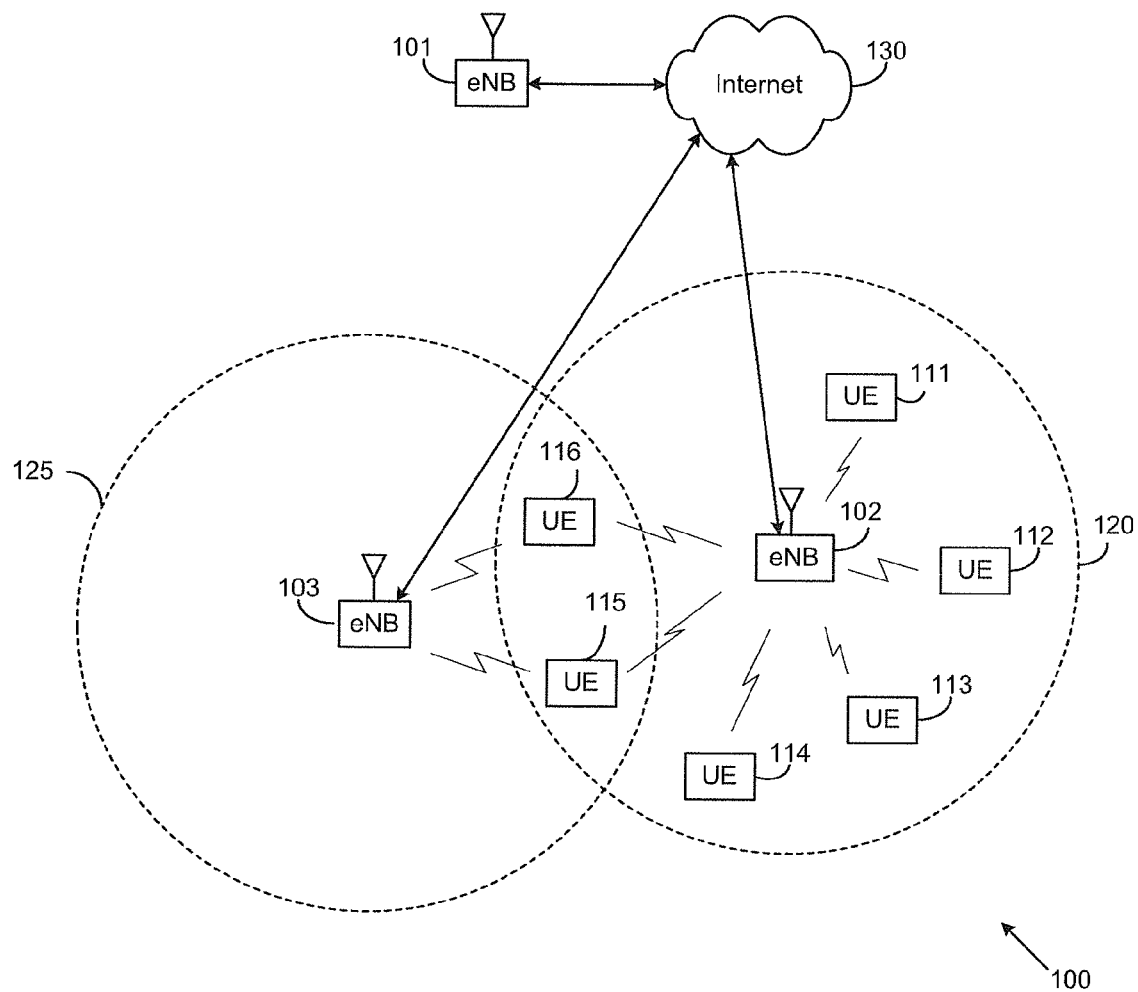
FIG. 1 illustrates a wireless network according to an embodiment of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiment, eNBs 101-103 may communicate with each other and with UEs 111-116 using LTE or LTE-A techniques.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2:
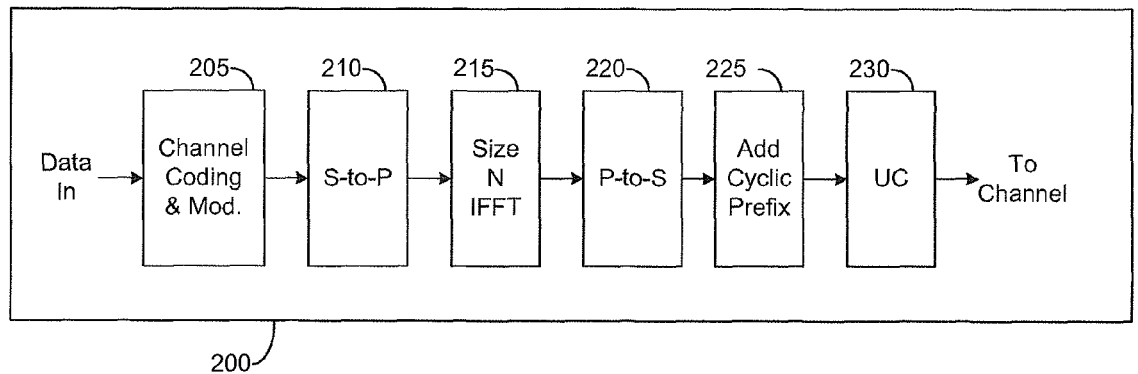
FIG. 2 illustrates a high-level diagram of a wireless transmit path according to an embodiment of this disclosure.
Figure 3:
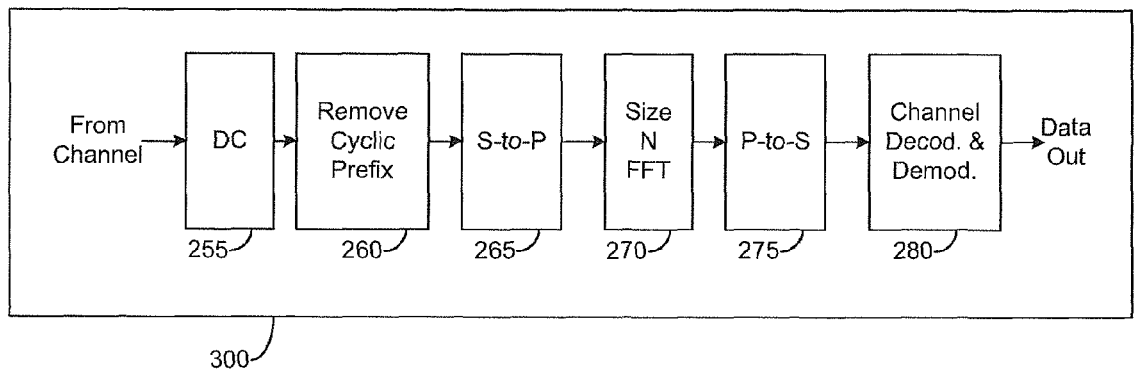
FIG. 3 illustrates a high-level diagram of a wireless receive path according to an embodiment of this disclosure.

FIG. 2 is a high-level diagram of a wireless transmit path. FIG. 3 is a high-level diagram of a wireless receive path. In FIGS. 2 and 3, the transmit path 200 may be implemented, e.g., in eNB 102 and the receive path 300 may be implemented, e.g., in a UE, such as UE 116 of FIG. 1. It will be understood, however, that the receive path 300 could be implemented in an eNB (e.g. eNB 102 of FIG. 1) and the transmit path 200 could be implemented in a UE.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

In LTE and LTE-A systems, there are two types of uplink reference signals (UL RS): demodulation reference signals (DM-RS) and sounding reference signals (SRS). For physical uplink shared channel (PUSCH) transmission, DM-RS signals are transmitted on two SC-FDMA (Single Carrier Frequency Division Multiple Access) symbols, one SC-FDMA symbol per each of the two time slots in a subframe. SRS is transmitted on one SC-FDMA symbol, the last SC-FDMA symbol of the second slot in a subframe.

To generate a UL RS sequence, a subscriber station first generates a base UL RS sequence, which is a CAZAC (constant amplitude zero auto-correlation) sequence. Then the subscriber station applies cyclic shifts (CS) to the base UL RS sequence, where CS∈{0, 1, . . . , 11}. According to LTE Release 10 ("Rel-10") specifications, the base UL RS sequence is a cell-specific one, i.e., is a function of the physical cell-ID.

The CS and the base UL RS sequence are assigned to subscriber stations so as to maintain small inter-user interference, or to make UL RS sequences of the subscriber stations orthogonal or quasi-orthogonal. Multiple UL RS sequences are orthogonal, when they are generated from the same base UL RS sequence with different CSs. When multiple subscriber stations in a same cell are multiplexed in a same UL BW (i.e., intra-cell interference), inter-user interference power level is relatively high. To mitigate inter-user interference impact in this case, a base station can orthogonalize the UL RS sequences. That is, the base station may assign different CSs to those subscriber stations.

Multiple UL RS sequences are quasi-orthogonal (i.e., have relatively small cross-correlation) if they are generated from different UL RS sequences, regardless of whether their CSs are different or not. When multiple subscriber stations in different cells are multiplexed in a same UL BW (i.e., inter-cell interference), inter-user interference power level is relatively low. However to ensure that the interference does not coherently add up with the desired signal, different base sequences are assigned to those subscriber stations.

There are 30 base UL RS sequence groups in LTE, where each group is indexed by u=0, 1, . . . , 29. Within a group, where the RS sequence length is greater than or equal to 6 RBs (or 84 (=12×7) subcarriers), there are two base sequences indexed by v=0,1. When the RS sequence length is less than 6 RBs, there is only one base sequence.

A base UL RS sequence is a CAZAC sequence, but is generated differently depending on the length of the sequence. For base sequences for 1 or 2 RBs (or 12 or 24 subcarriers), the base RS sequences are computer-generated CAZAC sequences. For base sequences for more than 2 RBs (or more than 24 subcarriers), the base RS sequences are Zadoff-Chu (ZC) sequences. In REF1, ZC sequence generation is described in Section 5.5.1.1 as in the following, where the number of subcarriers in a PRB is $N_{sc}^{RB}=12$, and the length of a base sequence is denoted by $M_{sc}^{RS}$.

For $M_{sc}^{RS} \geq 3N_{sc}^{RB}$, the base sequence $\bar{r}_{u,v}(0), \ldots, \bar{r}_{u,v}(M_{sc}^{RS}-1)$ is given by $$\bar{r}_{u,v}(n) = x_q(n \bmod N_{ZC}^{RS}), 0 \leq n < M_{sc}^{RS}$$

where the $q^{th}$ root Zadoff-Chu sequence is defined by $$x_q(m) = e^{-j\frac{\pi q m(m+1)}{N_{ZC}^{RS}}}, 0 \leq m \leq N_{ZC}^{RS} - 1$$

with q given by $$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

The length $N_{ZC}^{RS}$ of the Zadoff-Chu sequence is given by the largest prime number such that $Z_{ZC}^{RS} < M_{sc}^{RS}$.

For further reducing the inter-cell interference (e.g., R1-080241), LTE defines sequence group hopping (SGH). When SGH is enabled (by cell-specific RRC (radio resource control) parameter Group-hopping-enabled), the base sequence group index (u) of UL RS changes over slots. There are 17 hopping and 30 sequence-shift patterns (504 (>510) patterns for cell planning). In REF1, SGH and sequence hopping (SH) are explained in Section 5.5.1.3 and Section 5.5.1.4 respectively, the contents of which are incorporated below.

5.5.1.3 Group Hopping

The sequence-group number u in slot $n_s$ is defined by a group hopping pattern $f_{gh}(n_s)$ and a sequence-shift pattern $f_{ss}$ according to $$u = (f_{gh}(n_s) f_{ss}) \bmod 30$$

There are 17 different hopping patterns and 30 different sequence-shift patterns. Sequence-group hopping can be enabled or disabled by means of the cell-specific parameter Group-hopping enabled provided by higher layers. Sequence-group hopping for PUSCH can be disabled for a certain UE through the higher-layer parameter Disable-sequence-group-hopping despite being enabled on a cell basis. PUCCH and PUSCH have the same hopping pattern but may have different sequence-shift patterns.

The group-hopping pattern $f_{gh}(n_s)$ is the same for PUSCH and PUCCH and given by $$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases}$$

where the pseudo-random sequence c(i) is defined by section 7.2. The pseudo-random sequence generator is initialized with $$c_{init} = \left\lfloor \frac{N_{ID}^{cell}}{30} \right\rfloor$$

at the beginning of each radio frame.

The sequence-shift pattern $f_{ss}$ definition differs between PUCCH and PUSCH. For PUCCH, the sequence-shift pattern $f_{ss}^{PUCCH}$ is given by $f_{ss}^{PUCCH} = N_{ID}^{cell} \bmod 30$. For PUSCH, the sequence-shift pattern $f_{ss}^{PUSCH}$ is given by $f_{ss}^{PUSCH} = (f_{ss}^{PUCCH} + \Delta_{ss}) \bmod 30$, where $\Delta_{ss} \in \{0, 1, \ldots, 29\}$ is configured by higher layers.

5.5.1.4 Sequence Hopping

Sequence hopping only applies for reference-signals of length $M_{sc}^{RS} \geq 6 N_{sc}^{RB}$.

For reference-signals of length $M_{sc}^{RS} < 6 N_{sc}^{RB}$, the base sequence number v within the base sequence group is given by v=0.

For reference-signals of length $M_{sc}^{RS} \geq 6 N_{sc}^{RB}$, the base sequence number v within the base sequence group in slot $n_s$ is defined by $$v = \begin{cases} c(n_s) & \text{if group hopping is disabled and sequence hopping is enabled} \\ 0 & \text{otherwise} \end{cases}$$

where the pseudo-random sequence c(i) is given by section 7.2. The parameter Sequence-hopping-enabled provided by higher layers determines if sequence hopping is enabled or not. Sequence hopping for PUSCH can be disabled for a certain UE through the higher-layer parameter Disable-sequence-group-hopping despite being enabled on a cell basis. The pseudo-random sequence generator is initialized with $$c_{init} = \left\lfloor \frac{N_{ID}^{cell}}{30} \right\rfloor \cdot 2^5 + f_{ss}^{PUSCH}$$

at the beginning of each radio frame.

The UL RS base sequences are used for generating physical signals of two formats of physical uplink control channel (PUCCH) as well: PUCCH format 1/1a/1b and PUCCH format 2/2a/2b. Inter-cell and intra-cell interference are managed in the same way as the UL RS.

Figure 4:
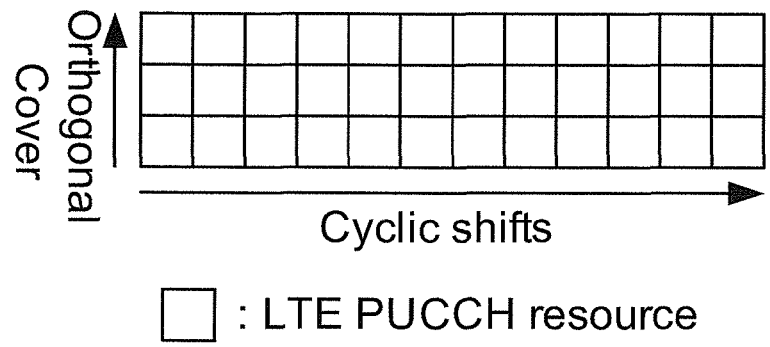
FIG. 4 illustrates a physical uplink control channel (PUCCH) resource partition in one pair of physical resource blocks (PRBs) in an uplink carrier in a LTE system, according to an embodiment of this disclosure.

A resource used for transmission of PUCCH format 1/1a/1b (for scheduling request or HARQ-ACK) is represented by a non-negative index $n_{PUCCH}^{(1)}$. FIG. 4 illustrates a PUCCH resource partition in one pair of PRBs in a UL carrier in the LTE system. PUCCH resource index $n_{PUCCH}^{(1)}$ determines an orthogonal cover code (OCC) and a cyclic shift (CS), and these two parameters indicate a unique resource. In one pair of PRBs, there are 3×12=36 PUCCH AN resources available in this example.

The following description of sequence generation for PUCCH format 1/1a/1b is adapted from REF1.

Resources used for transmission of PUCCH format 1, 1a and 1b are identified by a resource index $n_{PUCCH}^{(1)}$ from which the orthogonal sequence index $n_{oc}(n_s)$ and the cyclic shift $a(n_s, l)$ are determined according to $$n_{oc}(n_s) = \begin{cases} \lfloor n'(n_s) \cdot \Delta_{shift}^{PUCCH} / N' \rfloor & \text{for normal cyclic prefix} \\ 2 \cdot \lfloor n'(n_s) \cdot \Delta_{shift}^{PUCCH} / N' \rfloor & \text{for extended cyclic prefix} \end{cases}$$

$$\alpha(n_s, l) = 2\pi \cdot n_{cs}(n_s, l) / N_{sc}^{RB}$$

$$n_{cs}(n_s, l) = \begin{cases} [n_{cs}^{cell}(n_s, l) + (n'(n_s) \cdot \Delta_{shift}^{PUCCH} + \\ \delta_{offset}^{PUCCH} + (n_{oc}(n_s) \bmod \Delta_{shift}^{PUCCH})) \bmod N'] \bmod N_{sc}^{RB} & \text{for normal cyclic prefix} \\ [n_{cs}^{cell}(n_s, l) + (n'(n_s) \cdot \Delta_{shift}^{PUCCH} + \\ \delta_{offset}^{PUCCH} + n_{oc}(n_s)/2) \bmod N'] \bmod N_{sc}^{RB} & \text{for extended cyclic prefix} \end{cases}$$

where $$N' = \begin{cases} N_{cs}^{(1)} & \text{if } n_{PUCCH}^{(1)} < c \cdot N_{cs}^{(1)} / \Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

The resource indices within the two resource blocks in the two slots of a subframe to which the PUCCH is mapped are given by $$n'(n_s) = \begin{cases} n_{PUCCH}^{(1)} & \text{if } n_{PUCCH}^{(1)} < c \cdot N_{cs}^{(1)} / \Delta_{shift}^{PUCCH} \\ (n_{PUCCH}^{(1)} - c \cdot N_{cs}^{(1)} / \Delta_{shift}^{PUCCH}) \bmod \\ (c \cdot N_{sc}^{RB} / \Delta_{shift}^{PUCCH}) & \text{otherwise} \end{cases}$$

for $n_s \bmod 2 = 0$ and by $$n'(n_s) = \begin{cases} [c(n'(n_s - 1) + 1)] \bmod \\ (cN_{sc}^{RB} / \Delta_{shift}^{PUCCH} + 1) - 1 & n_{PUCCH}^{(1)} \geq c \cdot N_{cs}^{(1)} / \Delta_{shift}^{PUCCH} \\ \lfloor h/c \rfloor + (h \bmod c) N' / \Delta_{shift}^{PUCCH} & \text{otherwise} \end{cases}$$

for $n_s$ mod 2=1, where $h=(n'(n_s-1)+d)\mod(cN'/\Delta_{shift}^{PUCCH})$, with d=2 for normal CP and d=0 for extended CP.

The quantities $$\Delta_{shift}^{PUCCH} \in \begin{cases} \{1, 2, 3\} & \text{for normal cyclic prefix} \\ \{1, 2, 3\} & \text{for extended cyclic prefix} \end{cases}$$

$$\delta_{offset}^{PUCCH} \in \{0, 1, \ldots, \Delta_{shift}^{PUCCH} - 1\}$$

are set by higher layers.

PUCCH 1a carries one-bit information using BPSK (+1,−1) modulation, while PUCCH 1b carries two-bit information using QPSK (+1,−1,+j,−j) modulation, where $j=\sqrt{-1}$.

For PUCCH format 2/2a/2b (for CSI and HARQ-ACK feedback), REF1 describes the sequence generation as in the following.

Resources used for transmission of PUCCH formats 2/2a/2b are identified by a resource index $n_{PUCCH}^{(2,\tilde{p})}$ from which the cyclic shift $\alpha_{\tilde{p}}(n_s,l)$ is determined according to $$\alpha_{\tilde{p}}(n_s,l) = 2\pi \cdot n_{cs}^{(\tilde{p})}(n_s,l)/N_{sc}^{RB}$$

where $$n_{cs}^{(\tilde{p})}(n_s,l) = (n_{cs}^{cell}(n_s,l) + n_{\tilde{p}}'(n_s)) \mod N_{sc}^{RB}$$

and $$n_{\tilde{p}}'(n_s) = \begin{cases} n_{PUCCH}^{(2,\tilde{p})} \mod N_{sc}^{RB} & \text{if } n_{PUCCH}^{(2,\tilde{p})} < N_{sc}^{RB} N_{RB}^{(2)} \\ (n_{PUCCH}^{(2,\tilde{p})} + N_{cs}^{(1)} + 1) \mod N_{sc}^{RB} & \text{otherwise} \end{cases}$$

for $n_s$ mod 2=0 and by $$n_{\tilde{p}}'(n_s) = \begin{cases} [N_{sc}^{RB}(n_{\tilde{p}}'(n_s-1)+1)] \mod(N_{sc}^{RB}+1) - 1 & \text{if } n_{PUCCH}^{(2,\tilde{p})} < N_{sc}^{RB} N_{RB}^{(2)} \\ (N_{sc}^{RB} - 2 - n_{PUCCH}^{(2,\tilde{p})}) \mod N_{sc}^{RB} & \text{otherwise} \end{cases}$$

for $n_s$ mod 2=1

For PUCCH formats 2a and 2b, supported for normal cyclic prefix only, the bit(s) b(20), . . . , b($M_{bit}$−1) are modulated as described in Table 5.4.2-1 resulting in a single modulation symbol d(10) used in the generation of the reference-signal for PUCCH format 2a and 2b as described in Section 5.5.2.2.1 of REF1.

TABLE 5.4.2-1

Modulation symbol d(10) for PUCCH formats 2a and 2b.

| PUCCH format | b(20), . . . , b($M_{bit}$ − 1) | d(10) |
|---|---|---|
| 2a | 0 | 1 |
|  | 1 | −1 |
| 2b | 00 | 1 |
|  | 01 | −j |
|  | 10 | j |
|  | 11 | −1 |

Section 5.4.3 of REF1 describes PUCCH mapping to physical resources, as follows.

5.4.3 Mapping to Physical Resources

The block of complex-valued symbols $Z^{(\tilde{p})}(i)$ is multiplied with the amplitude scaling factor $\beta_{PUCCH}$ in order to conform to the transmit power $P_{PUCCH}$ specified in Section 5.1.2.1, and mapped in sequence starting with $z^{(\tilde{p})}(0)$ to resource elements. The PUCCH uses one resource block in each of the two slots in a subframe. Within the physical resource block used for transmission, the mapping of $z^{(\tilde{p})}(i)$ to resource elements (k,l) on antenna port p and not used for transmission of reference signals is in increasing order of first k, then l and finally the slot number, starting with the first slot in the subframe. The relation between the index $\tilde{p}$ and the antenna port number p is given by Table 5.2.1-1.

The physical resource blocks to be used for transmission of PUCCH in slot $n_s$ are given by $$n_{PRB} = \begin{cases} \left\lfloor \frac{m}{2} \right\rfloor & \text{if } (m + n_s \mod 2) \mod 2 = 0 \\ N_{RB}^{UL} - 1 - \left\lfloor \frac{m}{2} \right\rfloor & \text{if } (m + n_s \mod 2) \mod 2 = 1 \end{cases}$$

where the variable m depends on the PUCCH format. For formats 1, 1a and 1b $$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB}^{(2)} + \left\lceil \frac{N_{cs}^{(1)}}{8} \right\rceil \end{cases}$$

$$c = \begin{cases} 3 & \text{normal cyclic prefix} \\ 2 & \text{extended cyclic prefix} \end{cases}$$

and for formats 2, 2a and 2b $$m = \lfloor n_{PUCCH}^{(2,\tilde{p})}/N_{sc}^{RB} \rfloor$$

and for format 3

$$m = \lfloor n_{PUCCH}^{(3,\tilde{p})}/N_{SF,0}^{PUCCH} \rfloor$$

Figure 5:
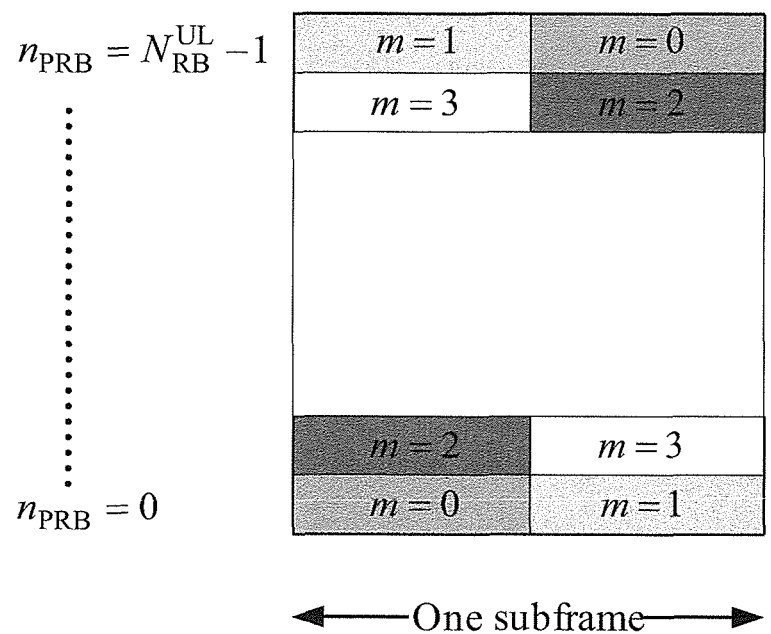
FIG. 5 illustrates a mapping of modulation symbols for the PUCCH, according to an embodiment of this disclosure.

The mapping of modulation symbols for the physical uplink control channel is illustrated in FIG. 5.

In situations having simultaneous transmission of the sounding reference signal and PUCCH format 1, 1a, 1b or 3 when there is one serving cell configured, a shortened PUCCH format is used where the last SC-FDMA symbol in the second slot of a subframe is left empty.

Figure 6:
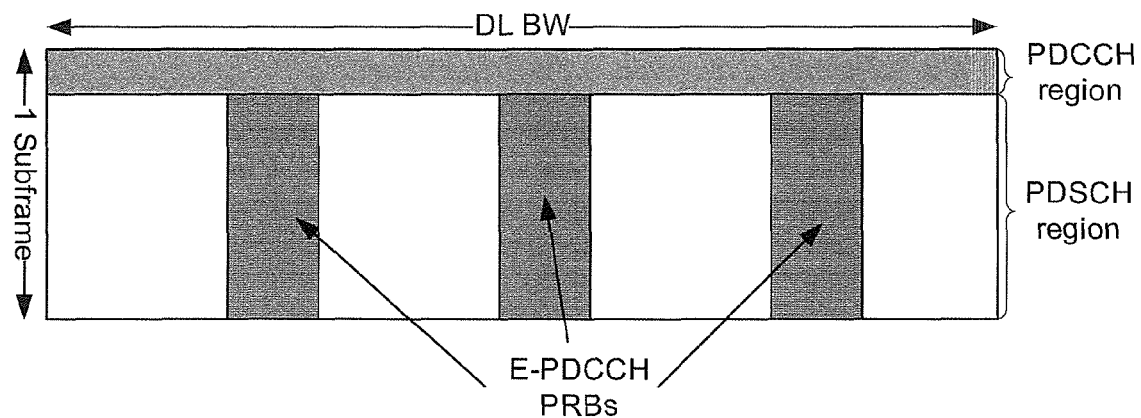
FIG. 6 illustrates placement of extended physical downlink control channels (E-PDCCHs) in a physical downlink shared channel (PDSCH) region, according to an embodiment of this disclosure.

In LTE Release 11 ("Rel-11"), an E-PDCCH may be implemented to increase DL control capacity within a cell and for mitigating inter-cell interference for DL control. E-PDCCHs are placed in the PDSCH region as illustrated in FIG. 6, and they convey DL control signaling to Rel-11 UEs configured to receive E-PDCCH.

In 36.331 v10.1.0, a configuration is defined for CSI-RS. The information element (IE) CSI-RS-Config is used to specify the CSI (Channel-State Information) reference signal configuration.

CSI-RS-Config information elements

```
-- ASN1START
CSI-RS-Config-r10 ::=    SEQUENCE {
    csi-RS-r10                  CHOICE {
        release                     NULL,
        setup                       SEQUENCE {
```

-continued

| CSI-RS-Config information elements |
|---|
| ```
        antennaPortsCount-r10        ENUMERATED {an1, an2, an4, an8},
        resourceConfig-r10           INTEGER (0..31),
        subframeConfig-r10           INTEGER (0..154),
        p-C-r10                      INTEGER (−8..15)
    }
}                                    OPTIONAL,    -- Need ON
zeroTxPowerCSI-RS-r10        CHOICE {
    release                          NULL,
    setup                            SEQUENCE {
        zeroTxPowerResourceConfigList-r10    BIT STRING (SIZE (16)),
        zeroTxPowerSubframeConfig-r10        INTEGER (0..154)
    }
}                                    OPTIONAL     -- Need ON
}
-- ASN1STOP
``` |

| CSI-RS-Config field descriptions |
|---|
| antennaPortsCount |
| Parameter represents the number of antenna ports used for transmission of CSI reference signals where an1 corresponds to 1, an2 to 2 antenna ports etc. see TS 36.211 [21, 6.10.5]. |
| p-C |
| Parameter: $P_c$, see TS 36.213 [23, 7.2.5]. |
| resourceConfig |
| Parameter: CSI reference signal configuration, see TS 36.211 [21, table 6.10.5.2-1 and 6.10.5.2-2]. |
| subframeConfig |
| Parameter: $I_{CSI-RS}$, see TS 36.211 [21, table 6.10.5.3-1]. |
| zeroTxPowerResourceConfigList |
| Parameter: ZeroPowerCSI-RS, see TS 36.211 [21, 6.10.5.2]. |
| zeroTxPowerSubframeConfig |
| Parameter: $I_{CSI-RS}$, see TS 36.211 [21, table 6.10.5.3-1]. |

REF1 describes CSI-RS mapping to resource elements as in the following:

6.10.5.2 Mapping to Resource Elements

In subframes configured for CSI reference signal transmission, the reference signal sequence $r_{l,n_s}(m)$ is mapped to complex-valued modulation symbols $a_{k,l}^{(p)}$ used as reference symbols on antenna port p according to $$a_{k,l}^{(p)} = w_{l''} \cdot r_{l,n_s}(m')$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations } 0 - 19, \text{ normal cyclic prefix} \\ 2l'' & \text{CSI reference signal configurations } 20 - 31, \text{ normal cyclic prefix} \\ l'' & \text{CSI reference signal configurations } 0 - 27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$
$$m = 0, 1, \ldots, N_{RB}^{DL} - 1$$
$$m' = m + \left\lfloor \frac{N_{RB}^{max,DL} - N_{RB}^{DL}}{2} \right\rfloor$$

The quantity (k',l') and the necessary conditions on $n_s$ are given by Table 1 for normal cyclic prefix.

TABLE 1

Mapping from CSI reference signal configuration to (k', l') for normal cyclic prefix

| | CSI reference signal Configuration (resourceConfig) | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |

TABLE 1-continued

Mapping from CSI reference signal configuration to (k', l') for normal cyclic prefix

| CSI reference signal Configuration (resourceConfig) | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

6.10.5.3 CSI Reference Signal Subframe Configuration

The cell-specific subframe configuration period $T_{CSI-RS}$ and the cell-specific subframe offset $\Delta_{CSI-RS}$ for the occurrence of CSI reference signals are listed in Table 2 below. The parameter $I_{CSI-RS}$ can be configured separately for CSI reference signals for which the UE assumes non-zero and zero transmission power. Subframes containing CSI reference signals satisfy $(10n_f + \lfloor n_s/2 \rfloor - \Delta CSI\text{-}RS) \bmod T_{CSI-RS} = 0$.

TABLE 2

CSI reference signal subframe configuration

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Figure 7:
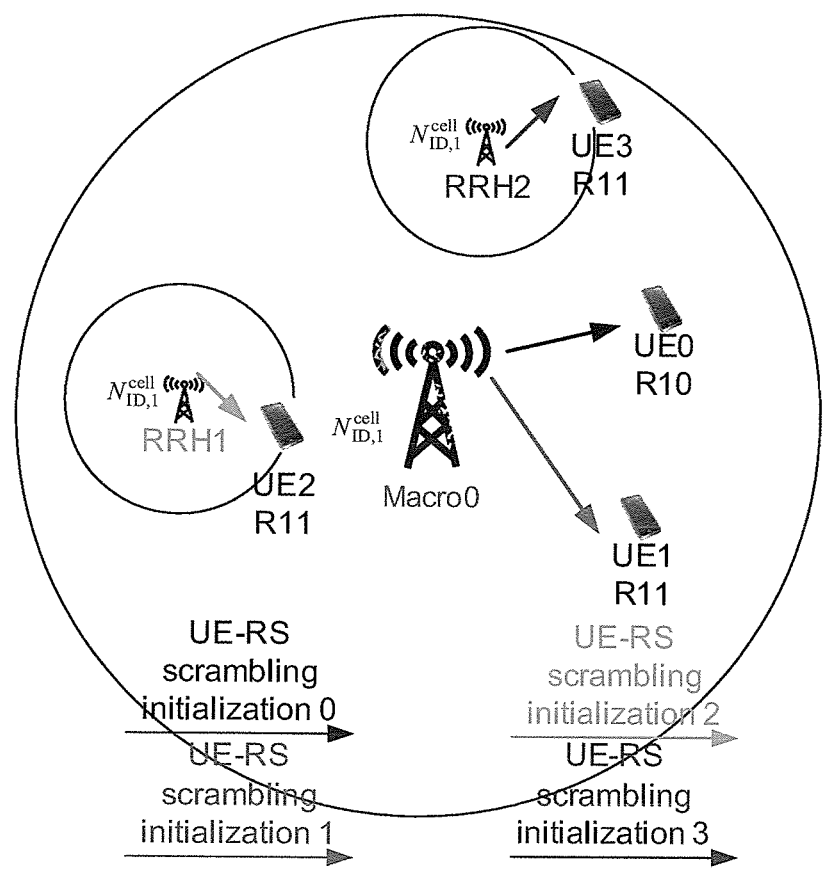
FIG. 7 illustrates a coordinated multi-point scenario where one physical cell ID is assigned to a macro cell and a number of remote radio heads (RRHs), according to an embodiment of this disclosure.

Downlink Soft-Cell Partitioning—UE-RS Scrambling Based on CSI-RS Configuration Parameters FIG. 7 illustrates a coordinated multi-point scenario where one physical cell ID is assigned to a macro cell and a number of remote radio heads (RRHs), according to an embodiment of this disclosure. As shown in FIG. 7, a LTE-A Rel-11 CoMP (coordinated multi-point) scenario commonly referred to "CoMP scenario 4" includes a central controller that controls a number of transmission points (TPs) (macro0 RRH1, and RRH2) in the macro coverage. One physical cell ID, $N_{ID}^{cell}$, is assigned to the macro and RRHs. A number of UEs (UE0 through UE3) are in communication with one or more of the macro and RRHs. In some embodiments, each of macro0, RRH1, and RRH2 may represent one or more of eNBs 101-103 in FIG. 1. Likewise, each UE, UE0 through UE3, may represent one or more of UEs 111-116 in FIG. 1. In some embodiments, RRH1 and RRH2 may represent a picocell station, femtocell station, or any other base station with a small coverage area.

According to the legacy LTE specifications (3GPP LTE Rel-10), regardless of which TP a UE receives DL data signals from, a UE would expect that UE-specific demodulation reference signals (UE-RS) are scrambled according to the physical cell ID $N_{ID}^{cell}$ obtained during the initial access procedure. In Section 6.10.3.1 of 3GPP TS 36.211 v10.0.0, the following UE behavior is described on the scrambling of UE-RS as follows.

The pseudo-random sequence generator is initialized with $c_{init} = (\lfloor n_s/2 \rfloor + 1) \cdot (2N_{ID}^{cell} + 1) \cdot 2^{16} + n_{SCID}$ at the start of each subframe, where for antenna ports 7 and 8 $n_{SCID}$ is given by the scrambling identity field according to Table 6.10.3.1-1 in the most recent DCI format 2B or 2C associated with the PDSCH transmission (see REF3). If there is no DCI format 2B or 2C associated with the PDSCH transmission on antenna ports 7 or 8, the UE assumes that $n_{SCID}$ is zero. For antenna ports 9 to 14, the UE assumes that $n_{SCID}$ is zero.

According to this UE behavior described above, if macro0, RRH1, and RRH2 are simultaneously transmitting in the same frequency band to different UEs (i.e., UE0, UE1, UE2 and UE3, as illustrated in FIG. 7), the interference from other TPs received at each UE would coherently add to the desired signal, and thus each UE cannot distinguish the desired signal and the interfering signals.

To resolve this issue, a number of soft cell-splitting techniques are proposed, e.g., assigning different UE-RS scrambling initializations to UEs receiving from different TPs. When one of the soft cell-splitting techniques is implemented, UE1, UE2 and UE3 are receiving differently scrambled UE-RS, as shown in FIG. 7.

The following methods for dynamic soft cell-splitting in accordance with embodiments of this disclosure are provided below.

Method 1: For a UE configured to implement soft-cell partitioning, UE-RS scrambling is initialized depending at least partly upon at least one of resourceConfig, subframeConfig and antennaPortsCount of the UE's CSI-RS configuration, e.g., the IE CSI-RS-Config defined above. Here, subframeConfig $\epsilon\{0, 1, \ldots 31\}$ determines subframes on which the CSI-RS are transmitted according to Table 1;

antennaPortsCount $\epsilon\{1, 2, 4, 8\}$ determines the number of antenna ports for which the CSI-RS are transmitted;

resourceConfig $\epsilon\{0, 1, \ldots 154\}$ determines a CSI-RS pattern corresponding to antennaPortsCount on a subframe on which the CSI-RS is transmitted according to Table 2.

In other words, $c_{init}$ for UE-RS scrambling is defined as a function of at least one of resourceConfig (RC), subframeConfig (SC, or $I_{CSI-RS}$) and antennaPortsCount (APC).

Method 1 includes a number of benefits. One benefit is that no (or little) additional signaling is needed to configure UE-RS scrambling initialization for facilitating soft cell-partitioning, other than the signaling used for CSI-RS configuration for the CoMP scenario 4 operation. Another benefit is that CSI-RS configurations are likely to be different between TPs, as it is common that different TPs transmit CSI-RS in different time-frequency resources. Relying on this property, Method 1 ensures that UEs receiving DL signals from different TPs receive DL signals with differently scrambled UE-RS.

For an illustration of method 1, consider FIG. 7, where macro0 transmits CSI-RS according to CSI-RS configuration 1, RRH1 transmits CSI-RS according to CSI-RS configuration 2, and RRH2 transmits CSI-RS according to CSI-RS configuration 3, where the three CSI-RS configurations are defined below.

CSI-RS configuration 1 comprises at least the following fields:
resourceConfig=RC1
subframeConfig=SC1
antennaPortCount=APC1.

CSI-RS configuration 2 comprises at least the following fields:
resourceConfig=RC2
subframeConfig=SC2
antennaPortCount=APC2.

CSI-RS configuration 3 comprises at least the following fields:
resourceConfig=RC3
subframeConfig=SC3
antennaPortCount=APC3.

In FIG. 7, UE1, UE2 and UE3 are advanced UEs, implementing not only Rel-10 features but also new features introduced in Rel-11.

In one embodiment (hereinafter referred to as embodiment 0), UE0 is not configured to do soft-cell partitioning and is configured with CSI-RS configuration 1. UE0 receives a PDSCH with UE-RS scrambled by a Rel-9 scrambling sequence initialized with $c_{init}=(\lfloor n_s/2 \rfloor+1)\cdot(2N_{ID}^{cell}+1)\cdot2^{16}+n_{SCID}$ as described above.

In one example, UE0 is a Rel-9 UE. In another example, UE0 is a Rel-10 UE. In yet another example, UE0 is a Rel-11 UE, which has not received a signaling to implement soft-cell partitioning.

In one embodiment (hereinafter referred to as embodiment 1), UE1 is configured to do soft-cell partitioning and is configured with CSI-RS configuration 1. UE1 receives a PDSCH with UE-RS scrambled by a scrambling sequence initialized with $c_{init}=(\lfloor n_s/2 \rfloor+1)\cdot(2N_{ID}^{cell}+1)\cdot2^{16}+n_{SCID2}\cdot2+n_{SCID}$, where $n_{SCID2}$ is a function of at least one of RC1, SC1, and APC1. Here, $n_{SCID2}$ is multiplied by 2 so that the initialization $c_{init}$ changes according to $n_{SCID2}$ independently of $n_{SCID}$, which is a one-bit quantity. Some examples of determining $n_{SCID2}$ are listed below:

$n_{SCID2}=g(RC)$: In this case, $n_{SCID2}$ only depends on the CSI-RS pattern.

$n_{SCID2}=g(RC)\cdot(I_{CSI-RS} \bmod 5)$: Here, $(I_{CSI-RS} \bmod 5)$ is applied to ensure that at most 5 different scrambling initializations are generated with possible values of $I_{CSI-RS}$, where 5 corresponds to the minimum configurable period for CSI-RS subframes. In this case, $n_{SCID2}$ is an 8-bit quantity.

$n_{SCID2}=g(RC)\cdot(I_{CSI-RS} \bmod 80)$: Here, $(I_{CSI-RS} \bmod 80)$ is applied to ensure that at most 80 different scrambling initializations are generated with possible values of $I_{CSI-RS}$, where 80 corresponds to the maximum configurable period for CSI-RS subframes. In this case, $n_{SCID2}$ is a 12-bit quantity.

$n_{SCID2}=g(RC)\cdot\Delta_{CSI-RS}$: Here, $\Delta_{CSI-RS}$ is applied to ensure that at most $T_{CSI-RS}$ different scrambling initializations are generated with possible values of $I_{CSI-RS}$.

In these examples, $\Delta_{CSI-RS}$ and $T_{CSI-RS}$ are the CSI-RS subframe offset and period derived from $I_{CSI-RS}$=SC1 using Table 2.

Some alternatives of determining the function g(RC) are listed below:

g(RC)=RC: In this case, g(RC) would have 20 possible values depending on the corresponding 1-port or 2-port CSI-RS pattern in case of FDD.

g(RC)=RC mod 10: In this case, g(RC) would have 10 possible values, depending on the corresponding 4-port CSI-RS pattern in case of FDD, that is, two 1-port or 2-port CSI-RS patterns would result in the same g(RC) if the two CSI-RS patterns belong to the same 4-port CSI-RS pattern.

In another embodiment (hereinafter referred to as embodiment 2), UE1 is configured to do soft-cell partitioning and configured with CSI-RS configuration 1. UE1 receives a PDSCH with UE-RS scrambled by a scrambling sequence initialized with $c_{init}=(\lfloor n_s/2 \rfloor+1)\cdot(2N_{ID}^{cell}+1)\cdot2^{16}+n_{SCID2}\cdot2+n_{SCID}$, where n is a function of not only at least one of RC1, SC1 and APC1, but also an additional parameter X. Here, X is a parameter providing a means for TPs to control the UE-RS scrambling behavior. For example, $X\epsilon\{0, 1, \ldots, 2^{N_x}-1\}$ is an $N_x$ bit parameter. For signaling of X, two alternatives are listed below.

In a first alternative (Alt 1), the parameter X is semi-statically signaled in the radio resource control (RRC) layer. In a second alternative (Alt 2), the parameter X is dynamically signaled in a DCI format.

Some examples of determining $n_{SCID2}$ are listed below, where $\tilde{n}_{SCID2}$ is a function of RC=RC1, SC=SC1, APC=APC1:

$n_{SCID2}=\tilde{n}_{SCID2}\cdot(1+X)$. Here, the multiplication of (1+X) expands the possible values for the UE-RS scrambling initialization $c_{init}$.

$n_{SCID2}=\tilde{n}_{SCID2}\cdot X$. Here, the multiplication of X expands the possible values for the UE-RS scrambling initialization $c_{init}$, and at the same time gives flexibility of turning off the soft-cell partitioning.

$n_{SCID2}=\tilde{n}_{SCID2}+X$. Here, the addition of X lets the eNodeB have flexibility to choose the UE-RS scrambling initialization $c_{init}$, e.g., to intentionally configure a different UE-RS scrambling to a UE than the one configured by the CSI-RS configuration.

Similar to embodiment 2, some examples of determining ñSCID2 are listed below:

$ñ_{SCID2}=g(RC)=$
$ñ_{SCID2}=g(RC)·(I_{CSI-RS} \bmod 5)$
$ñ_{SCID2}=g(RC)·(I_{CSI-RS} \bmod 80)$
$ñ_{SCID2}2=g(RC)·Δ_{CSI-RS}.$ In these examples, $Δ_{CSI-RS}$ is the CSI-RS subframe offset derived from $I_{CSI-RS}=SC1$ using Table 2.

Some alternatives of determining the function g(RC) are listed below:

g(RC)=RC
g(RC)=RC mod 10.

In another embodiment (hereinafter referred to as embodiment 3), for CoMP operation, UE2 is configured to do soft-cell partitioning and is configured with two CSI-RS configurations, i.e., CSI-RS configuration 1 and CSI-RS configuration 2. In this embodiment, UE2 identifies one CSI-RS configuration out of the two configurations to determine $n_{SCID2}$. Once the one CSI-RS configuration is determined, UE2 calculates $n_{SCID2}$ based on the field values of the one CSI-RS configuration, and receives UE-RS scrambled with an initialization $c_{init}=(\lfloor n_s/2 \rfloor+1)·(2N_{ID}^{cell}+1)·2^{16}+n_{SCID2}·2+n_{SCID}$. Some examples of $n_{SCID2}$ are listed in embodiments 1 and 2. Example methods for a UE to determine the one CSI-RS configuration to be used for determining $n_{SCID2}$ out of the two configurations are listed below.

In one example, the one CSI-RS configuration to determine $n_{SCID2}$ is the CSI-RS configuration of the primary TP of a UE, from which the UE receives E-PDCCH. In another example, the one CSI-RS configuration to determine $n_{SCID2}$ is explicitly identified by an RRC signaling.

In one method, an RRC signaling identifies a single primary CSI-RS configuration among the multiple CSI-RS configurations configured to a UE. In this case, the field values in the primary CSI-RS configuration determine $n_{SCID2}$. For instance, when UE2 receives an RRC signaling identifying that CSI-RS configuration 1 is a primary CSI-RS configuration, UE2 receives UE-RS scrambled with initialization $c_{init}=(\lfloor n_s/2 \rfloor+1)·(2N_{ID}^{cell}+1)·2^{16}+n_{SCID2}·2+n_{SCID}$, where $n_{SCID2}$ is determined based on the field values of the CSI-RS configuration 1.

One example RRC signaling design to identify that CSI-RS configuration 1 is a primary CSI-RS configuration is to introduce a one-bit flag field (e.g., primaryFlag) in each CSI-RS configuration indicating whether the CSI-RS configuration is primary or not. If primaryFlag=1, then the associated CSI-RS configuration is primary. If primaryFlag=0, then the associated CSI-RS configuration is non-primary. An example of such an RRC signaling message is shown below, where the RRC signaling message includes two CSI-RS configurations, i.e., CSI-RS configuration 1 and CSI-RS configuration 2, and CSI-RS configuration 1 (csi-RS1) is flagged to be a primary configuration, with setting primaryFlag=1.

```
csi-RS1                 {
    setup               {
        antennaPortsCount = APC1,
        resourceConfig = RC1,
        subframeConfig = SC1,
        p-C-r11 = PC1
        primaryFlag = 1
    }
}
csi-RS2                 {
```

-continued

```
    setup               {
        antennaPortsCount = APC2,
        resourceConfig = RC2,
        subframeConfig = SC2,
        p-C-r11 = PC2
        primaryFlag = 0
    }
}
```

In another method, one RRC signaling message comprises two CSI-RS configurations as shown below, i.e., CSI-RS configuration 1 and CSI-RS configuration 2. The signaling message is sent to UE2. Then, UE2 will use the first CSI-RS configuration, i.e., CSI-RS configuration 1, in the RRC signaling message to determine $n_{SCID2}$.

```
csi-RS1                 {
    setup               {
        antennaPortsCount = APC1,
        resourceConfig = RC1,
        subframeConfig = SC1,
        p-C-r11 = PC1
    }
}
csi-RS2                 {
    setup               {
        antennaPortsCount = APC2,
        resourceConfig = RC2,
        subframeConfig = SC2,
        p-C-r11 = PC2
    }
}
```

The one CSI-RS configuration to determine $n_{SCID2}$ is with the smallest g(RC). In one example with g(RC)=RC, when RC=7 and RC2=15, UE2 uses CSI-RS configuration 1 for determining $n_{SCID2}$. In another example with g(RC)=RC mod 10, when RC1=7 and RC2=15, UE2 uses CSI-RS configuration 2 for determining $n_{SCID2}$.

The one CSI-RS configuration to determine $n_{SCID2}$ is with the smallest period, i.e., $T_{CSI-RS}$, where $T_{CSI-RS}$ is the CSI-RS period derived with $I_{CSI-RS}=SC$ in Table 2. For example, when SC1 gives $T_{CSI-RS}=5$ and SC2 gives $T_{CSI-RS}=10$, UE2 uses CSI-RS configuration 1 for determining $n_{SCID2}$.

The one CSI-RS configuration to determine $n_{SCID2}$ is with the largest period, i.e., $T_{CSI-RS}$, where $T_{CSI-RS}$ is the CSI-RS period derived with $I_{CSI-RS}=SC$ in Table 2. For example, when SC1 gives $T_{CSI-RS}=5$ and SC2 gives $T_{CSI-RS}=10$, UE2 uses CSI-RS configuration 2 for determining $n_{SCID2}$.

The one CSI-RS configuration to determine $n_{SCID2}$ is with the smallest offset, i.e., $Δ_{CSI-RS}$ where $Δ_{CSI-RS}$ is the CSI-RS subframe offset derived with $I_{CSI-RS}=SC$ in Table 2. For example, when SC1 gives $Δ_{CSI-RS}=5$ and SC2 gives $Δ_{CSI-RS}=10$, UE2 uses CSI-RS configuration 1 for determining $n_{SCID2}$.

The one CSI-RS configuration to determine $n_{SCID2}$ is with the largest offset, i.e., $Δ_{CSI-RS}$ where $Δ_{CSI-RS}$ is the CSI-RS subframe offset derived with $I_{CSI-RS}=SC$ in Table 2. For example, when SC1 gives $Δ_{CSI-RS}=5$ and SC2 gives $Δ_{CSI-RS}=10$, UE2 uses CSI-RS configuration 2 for determining $n_{SCID2}$.

Figure 8:
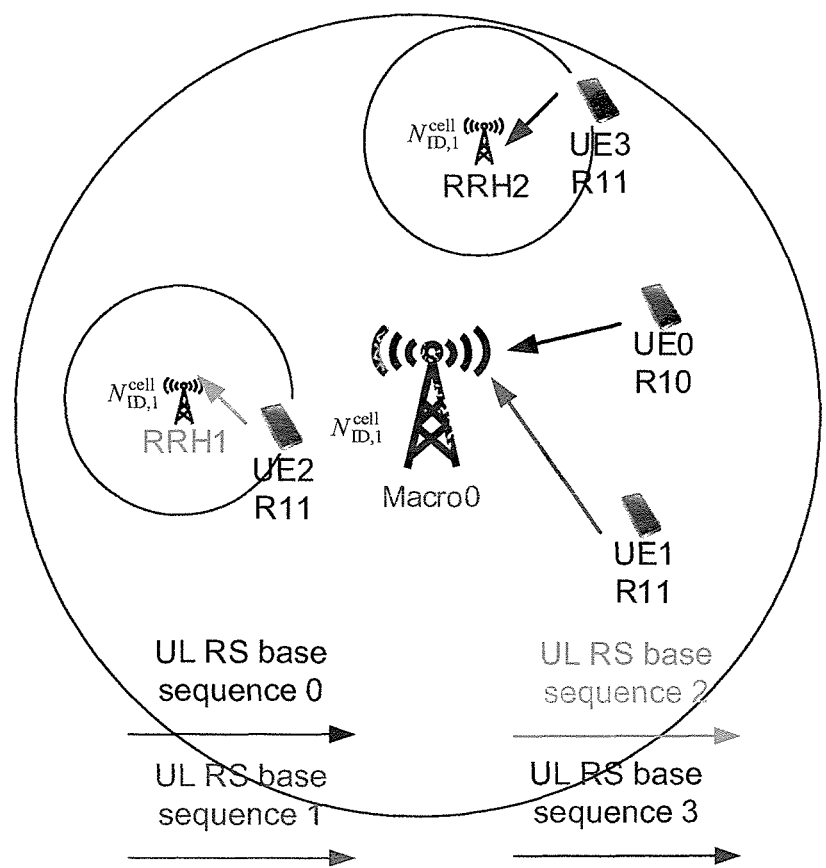
FIG. 8 illustrates an uplink reference signal (RS) base sequence generation having a mixture of cell-specific and transmission point (TP)-specific sequences, according to an embodiment of this disclosure.

Uplink Soft-Cell Partitioning—UL RS Base Sequence Initialization Based on CSI-RS Configuration Parameters When soft-cell partitioning is implemented for the uplink, the two base RS sequences are configured to be different for the two UEs transmitting uplink signals to different TPs, while all the TPs may still operate with the same cell ID. The soft-cell partitioning for UL is illustrated in FIG. 8. As shown in FIG. 8, macro0, RRH1, and RRH2 are operating with the same cell ID, i.e., $N_{ID}^{cell}$. Furthermore, UE0 and UE1 transmit UL signals to macro0, UE2 transmits UL signals to RRH1, and UE3 transmits UL signals to RRH2. To prevent coherent addition of interfering UL signals, soft-cell partitioning can be implemented, in which case the three UEs transmitting to three different TPs will use different UL RS base sequences.

The following methods for facilitating UL soft-cell portioning in accordance with embodiments of this disclosure are provided below.

Method 2: A UE configured to do soft-cell partitioning generates an UL RS base sequence depending at least partly upon at least one of resourceConfig (RC), subframeConfig (SC) and antennaPortsCount (APC) in the UE's CSI-RS configuration, e.g., CSI-RS-Config defined above. Here, subframeConfig $\in \{0, 1, \ldots 31\}$ determines subframes on which CSI-RS are transmitted according to Table 1 above;

antennaPortsCount $\in \{1, 2, 4, 8\}$ determines the number of antenna ports for which CSI-RS are transmitted;

resourceConfig $\in \{0, 1, \ldots 154\}$ determines a CSI-RS pattern corresponding to antennaPortsCount on a subframe on which CSI-RS is transmitted according to Table 2 above.

In one example, the UE generates its base sequence $\bar{r}_{u,v}(0), \ldots, \bar{r}_{u,v}(M_{sc}^{RS}-1)$ dependent at least partly upon RC, SC, and APC of the UE's CSI-RS configuration. In another example, the UE calculates at least one of the two parameters u and v which determine a base sequence $\bar{r}_{u,v}(0), \ldots, \bar{r}_{u,v}(M_{sc}^{RS}-1)$, depending at least partly upon at least one of RC, SC and APC of the UE's CSI-RS configuration. Here, as defined in 3GPP TS 36.211 v10.1.0, $u \in \{0, 1, \ldots, 29\}$ is the group number, v=0,1 is the base sequence number within the group and $M_{sc}^{RS}$ is the length of a base sequence.

For an illustration of method 2, consider FIG. 8, where macro0 transmits CSI-RS according to CSI-RS configuration 1, RRH1 transmits CSI-RS according to CSI-RS configuration 2, and RRH2 transmits CSI-RS according to CSI-RS configuration 3, where the three CSI-RS configurations are defined below.

CSI-RS configuration 1 comprises at least the following fields:
resourceConfig=RC1
subframeConfig=SC1
antennaPortCount=APC1.

CSI-RS configuration 2 comprises at least the following fields:
resourceConfig=RC2
subframeConfig=SC2
antennaPortCount=APC2.

CSI-RS configuration 3 comprises at least the following fields:
resourceConfig=RC3
subframeConfig=SC3
antennaPortCount=APC3.

In FIG. 8, UE1, UE2 and UE3 are advanced UEs, implementing not only Rel-10 features but also new features introduced in Rel-11.

In one embodiment (hereinafter referred to as embodiment 0A), UE0 is not configured to do soft-cell partitioning and is configured with CSI-RS configuration 1. UE0 transmits PUSCH DM-RS and PUCCH generated with a base sequence $\bar{r}_{u,v}(0), \ldots, \bar{r}_{u,v}(M_{sc}^{RS}-1)$, wherein the base sequence is generated according to the Rel-8 mechanism described above.

In one example, UE0 is a Rel-8 UE. In another example, UE0 is a Rel-9 UE. In yet another example, UE0 is a Rel-10 UE. In still another example, UE0 is a Rel-11 UE, which has not received a signaling to implement soft-cell partitioning.

In one embodiment (hereinafter referred to as embodiment 4), UE1 is configured to do soft-cell partitioning and configured with CSI-RS configuration 1. UE1 transmits at least one of PUSCH DM-RS and PUCCH generated with a base sequence $\bar{r}_{u,v}(0), \ldots, \bar{r}_{u,v}(M_{sc}^{RS}-1)$, where the sequence group number u is generated depending on at least one of RC1, SC1, and APC1. Some examples of determining u $\in \{0, 1, \ldots, 29\}$ are listed below, where g(RC) is a function of RC=RC1:

$u=(f_{gh}(n_s))+f_{ss}+g(RC))\bmod 30$;

$u=(f_{gh}(n_s))+f_{ss}+g(RC)\cdot\Delta_{CSI-RS})\bmod 30$;

$u=(f_{gh}(n_s)f_{ss}+g(RC)\cdot(I_{CSI-RS}\bmod 5))\bmod 30$;

$u=(f_{gh}(n_s))+f_{ss}+g(RC)\cdot(I_{CSI-RS}\bmod 80))\bmod 30$;

where $\Delta_{CSI-RS}$ is the CSI-RS subframe offset defined in Table 2 with $I_{CSI-RS}$=SC1, and $I_{CSI-RS}$=SC1. The group-hopping pattern $f_{gh}(n_s)$ is the same for PUSCH and PUCCH and given by $$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases},$$

where the pseudo-random sequence c(i) is defined by section 7.2. The pseudo-random sequence generator is initialized with $$c_{init} = \left\lfloor \frac{N_{ID}^{cell}}{30} \right\rfloor$$

at the beginning of each radio frame.

The sequence-shift pattern $f_{ss}$ definition differs between PUCCH and PUSCH. For PUCCH, the sequence-shift pattern $f_{ss}^{PUCCH}$ is given by $f_{ss}^{PUCCH}=N_{ID}^{cell}\bmod 30$. For PUSCH, the sequence-shift pattern $f_{ss}^{PUSCH}$ is given by $f_{ss}^{PUSCH}=(f_{ss}^{PUCCH}+\Delta_{ss})\bmod 30$, where $\Delta_{ss}\in\{0, 1, \ldots 29\}$ is configured by higher layers.

Some alternatives of determining g(RC) are listed below:

g(RC)=RC.

g(RC)=RC mod 10.

In another embodiment (hereinafter referred to as embodiment 5), UE1 is configured to do soft-cell partitioning and configured with CSI-RS configuration 1. UE1 transmits at least one of PUCCH and PUSCH DM-RS generated with a base sequence $\bar{r}_{u,v}(0), \ldots, \bar{r}_{u,v}(M_{sc}^{RS}-1)$, where the sequence group number u is generated according to $u=(f_{gh}(n_s)+f_{ss})\bmod 30$.

Here, the sequence-shift pattern $f_{ss}$ is determined according to Rel-8 UE behavior. For PUCCH, the sequence-shift pattern $f_{ss}^{PUCCH}$ is given by $f_{ss}^{PUCCH}\bmod 30$. For PUSCH, the sequence-shift pattern $f_{ss}^{PUSCH}$ is given by $f_{ss}^{PUSCH}=(f_{ss}^{PUCCH}+\Delta_{ss})\bmod 30$, where $\Delta_{ss}\in\{0, 1, \ldots, 29\}$ is configured by higher layers.

The group hopping pattern $f_{gh}(n_s)$) is determined depending on at least one of RC1, APC1, and SC1. Similar to the legacy system, $f_{gh}(n_s)$) is determined according to, $$f_{gh}(n_s) = \begin{cases} 0 & \text{if group hopping is disabled} \\ \left(\sum_{i=0}^{7} c(8n_s+i)\cdot 2^i\right) \bmod 30 & \text{if group hopping is enabled} \end{cases},$$

but the pseudo random sequence c(i) is differently initialized. Some example equations for determining the initialization seed $c_{init}$ for the pseudo random sequence c(i) are listed below:

$$c_{init} = \left\lfloor \frac{N_{ID}^{cell} + \tilde{n}_{SCID2}}{30} \right\rfloor.$$

Here, $c_{init}$ is still determined dependent on the cell id.

$$c_{init} = \left\lfloor \frac{\tilde{n}_{SCID2}}{30} \right\rfloor.$$

Here, $c_{init}$ is determined independently of the cell id.

Here, $\tilde{n}_{SCID2}$ is a function of RC=RC1, SC=SC1, APC=APC1. Similar to embodiment 2, some examples of determining $\tilde{n}_{SCID2}$ are listed below:
$\tilde{n}_{SCID2}$=g(RC)
$\tilde{n}_{SCID2}$=g(RC)·($I_{CSI-RS}$ mod 5)
$\tilde{n}_{SCID2}$=g(RC)·($I_{CSI-RS}$ mod 80)
$\tilde{n}_{SCID2}$=g(RC)·$\Delta_{CSI-RS}$.

Here, $\Delta_{CSI-RS}$ is the CSI-RS subframe offset defined in Table 2 with $I_{CSI-RS}$=SC1; $I_{CSI-RS}$=SC1; and g(RC) is a function of RC=RC1. Some alternatives of determining g(RC) are listed below:
g(RC)=RC
g(RC)=RC mod 10.

In another embodiment (hereinafter referred to as embodiment 6), UE1 is configured to do soft-cell partitioning and configured with CSI-RS configuration 1. UE1 transmits at least one of PUSCH DM-RS and PUCCH generated with a base sequence $\bar{r}_{u,v}(0), \ldots, \bar{r}_{u,v}(M_{sc}^{RS}-1)$, where the sequence group number u is generated according to u=($f_{gh}(n_s)+f_{ss}$)mod 30.

Here, $f_{gh}(n_s)$ is determined according to Rel-8 UE behavior:

$$f_{gh}(n_s) = \begin{cases} 0 & \text{if group hopping is disabled} \\ \left(\sum_{i=0}^{7} c(8n_s+i)\cdot 2^i\right) \bmod 30 & \text{if group hopping is enabled} \end{cases},$$

and the pseudo-random sequence c(i) is initialized with $$c_{init} = \left\lfloor \frac{N_{ID}^{cell}}{30} \right\rfloor$$

at the beginning of each radio frame.

The PUCCH sequence-shift pattern $f_{ss}^{PUCCH}$ is determined depending on at least one of RC1, SC1, and APC1 so that it facilitates soft-cell partitioning. Some example equations for determining the PUCCH sequence-shift pattern $f_{ss}^{PUCCH}$ are listed below:
$f_{ss}^{PUCCH}$=($N_{ID}^{cell}+\tilde{n}_{SCID2}$)mod 30. Here, $f_{ss}^{PUCCH}$ is still determined dependent on the cell id.

$f_{ss}^{PUCCH}=\tilde{n}_{SCID2}$ mod 30. Here, $f_{ss}^{PUCCH}$ is determined independently of the cell id.

Here, $\tilde{n}_{SCID2}$ is a function of RC=RC1, SC=SC1, APC=APC1. Similar to embodiment 2, some examples of determining $\tilde{n}_{SCID2}$ are listed below:
$\tilde{n}_{SCID2}$=g(RC)
$\tilde{n}_{SCID2}$=g(RC)·($I_{CSI-RS}$ mod 5)
$\tilde{n}_{SCID2}$=g(RC)·($I_{CSI-RS}$ mod 80)
$\tilde{n}_{SCID}2$=g(RC)·$\Delta_{CSI-RS}$.

Here, $\Delta_{CSI-RS}$ is the CSI-RS subframe offset defined in Table 2 with $I_{CSI-RS}$=SC1; $I_{CSI-RS}$=SC1; and g(RC) is a function of RC=RC1. Some alternatives of determining g(RC) are listed below:
g(RC)=RC
g(RC)=RC mod 10.

For the PUSCH sequence-shift pattern $f_{ss}^{PUSCH}$, two alternatives are presented here. In one alternative, the PUSCH sequence-shift pattern is determined according to the Rel-8 equation with the PUCCH sequence-shift pattern $f_{ss}^{PUSCH}$ facilitating soft-cell partitioning, so that soft-cell partitioning is applied on the PUSCH as well:

$$f_{ss}^{PUSCH}=(f_{ss}^{PUCCH}+\Delta_{ss})\bmod 30,$$

where $\Delta_{ss} \in \{0, 1, \ldots, 29\}$ is configured by higher layers.

In another alternative, the PUSCH sequence-shift pattern is determined according to Rel-8 UE behavior, so that soft-cell partitioning is not applied for the PUSCH:

$$f_{ss}^{PUSCH}(N_{ID}^{cell}\Delta_{ss})\bmod 30.$$

In another embodiment (hereinafter referred to as embodiment 7), UE1 is configured to do soft-cell partitioning and configured with CSI-RS configuration 1. UE1 transmits at least one of PUSCH DM-RS and PUCCH generated with a base sequence $\bar{r}_{u,v}(0), \ldots, \bar{r}_{u,v}(M_{sc}^{RS}-1)$, where the sequence group number u is generated according to u=($f_{gh}(n_s)+f_{ss}$)mod 30.

Here, $f_{gh}(n_s)$ is determined according to Rel-8 UE behavior:

$$f_{gh}(n_s) = \begin{cases} 0 & \text{if group hopping is disabled} \\ \left(\sum_{i=0}^{7} c(8n_s+i)\cdot 2^i\right) \bmod 30 & \text{if group hopping is enabled} \end{cases},$$

and the pseudo-random sequence c(i) is initialized with $$c_{init} = \left\lfloor \frac{N_{ID}^{cell}}{30} \right\rfloor$$

at the beginning of each radio frame.

The PUCCH sequence-shift pattern $f_{ss}^{PUCCH}$ is determined according to the Rel-8 UE behavior:

$$f_{ss}^{PUCCH}=N_{ID}^{cell} \bmod 30.$$

The PUSCH sequence-shift pattern $f_{ss}^{PUCCH}$ is determined depending on at least one of RC1, SC1, and APC1 so that it facilitates soft-cell partitioning. Some example equations for determining the PUSCH sequence-shift pattern $f_{ss}^{PUSCH}$ are listed below, where g(RC) is a function of RC=RC1:
$f_{ss}^{PUSCH}=(f_{ss}^{PUCCH}+g(RC)+\Delta_{ss})$mod 30
$f_{ss}^{PUSCH}=(f_{ss}^{PUCCH}+g(RC)\cdot\Delta_{CSI-RS}+\Delta_{ss})$mod 30
$f_{ss}^{PUSCH}=(f_{ss}^{PUCCH}+g(RC)\cdot(I_{CSI-RS}$ mod 5$)+\Delta_{ss})$mod 30
$f_{ss}^{PUSCH}=(f_{ss}^{PUCCH}+g(RC)\cdot(I_{CSI-RS}$ mod 80$)+\Delta_{ss})$mod 30

Here, $\Delta_{CSI-RS}$ is the CSI-RS subframe offset defined in Table 2 with $I_{CSI-RS}$=SC1; and $I_{CSI-RS}$=SC1.

Some alternatives of determining g(RC) are listed below:
- g(RC)=RC, in which case, g(RC) would have 20 possible values depending on the corresponding 1-port or 2-port CSI-RS pattern in case of FDD.
- g(RC)=RC mod 10, in which case, g(RC) would have 10 possible values, depending on the corresponding 4-port CSI-RS pattern in case of FDD, that is, two 1-port or 2-port CSI-RS patterns would result in the same g(RC) if the two CSI-RS patterns belong to the same 4-port CSI-RS pattern.

These example equations for $f_{ss}^{PUSCH}$ facilitate soft-cell partitioning of PUSCH, but no soft-cell partitioning of PUCCH.

In another embodiment (hereinafter referred to as embodiment 8), UE1 is configured with CSI-RS configuration 1. UE1 transmits at least one of PUSCH DM-RS and PUCCH generated with a base sequence $\bar{r}_{u,v}(0), \ldots, \bar{r}_{u,v}(M_{sc}^{RS}-1)$, where the sequence group number u is generated according to $u=(f_{gh}(n_s)+f_{ss})\bmod 30$.

Here, $f_{gh}(n_s))$ is determined according to Rel-8 UE behavior:

$$f_{gh}(n_s) = \begin{cases} 0 & \text{if group hopping is disabled} \\ \left(\sum_{i=0}^{7} c(8n_s+i)\cdot 2^i\right)\bmod 30 & \text{if group hopping is enabled} \end{cases},$$

and the pseudo-random sequence c(i) is initialized with $$c_{init} = \left\lfloor \frac{N_{ID}^{cell}}{30} \right\rfloor$$

at the beginning of each radio frame.

Both the PUCCH sequence-shift pattern $f_{ss}^{PUCCH}$ and PUSCH sequence-shift pattern $f_{ss}^{PUSCH}$ are determined depending at least partly upon RC1, APC1, and SC1. Examples described in embodiment 5 can be used for determining $f_{ss}^{PUCCH}$, and examples described in embodiment 6 can be used for determining $f_{ss}^{PUSCH}$.

In another embodiment (hereinafter referred to as embodiment 9), UE1 is configured to do soft-cell partitioning and configured with CSI-RS configuration 1. UE1 transmits at least one of PUSCH DM-RS and PUCCH generated with a base sequence $\bar{r}_{u,v}(0), \ldots, \bar{r}_{u,v}(M_{sc}^{RS}-1)$, where the sequence group number u is generated depending not only on at least one of RC1, SC1, and APC1 but an additional parameter, X. In one example, the parameter X is UE-specifically explicitly signaled in the RRC layer. In another example, the parameter X is dynamically signaled in a DCI format. In yet another example, the parameter X is used for determine not only the sequence group number u as in this embodiment, but also the UE-RS scrambling initialization $n_{SCID2}$ as in embodiment 2.

Assuming that $\tilde{n}_{SCID2}$ is a function of RC=RC1, SC=SC1, APC=APC1, some example equations for determining u∈{0, 1, . . . , 29} based on RC1, SC1, APC1 and X according to embodiment 4 are listed below:
- $u=(f_{gh}(n_s)+f_{ss}+\tilde{n}_{SCID2}\cdot(1+X))\bmod 30$. Here, the multiplication of (1+X) expands the possible values for the UE-RS scrambling initialization $c_{init}$.
- $u=(f_{gh}(n_s)+f_{ss}+\tilde{n}_{SCID2}\cdot X)\bmod 30$. Here, the multiplication of X expands the possible values for the UE-RS scrambling initialization $c_{init}$, and at the same time gives flexibility of turning off the soft-cell partitioning.
- $u=(f_{gh}(n_s)f_{ss}+\tilde{n}_{SCID2}+X)\bmod 30$. Here, the addition of X lets the eNodeB have flexibility to choose the UE-RS scrambling initialization $c_{init}$, e.g., to intentionally configure a different UE-RS scrambling to a UE than the one configured by the CSI-RS configuration.

Assuming that $\tilde{n}_{SCID2}$ is a function of RC=RC1, SC=SC1, APC=APC1, some example equations for determining $c_{init}$ and u∈{0, 1, . . . , 29} based on RC1, SC1, APC1 and X according to embodiment 5 are listed below:

$$c_{init} = \left\lfloor \frac{N_{ID}^{cell} + \tilde{n}_{SCID2}\cdot(1+X)}{30} \right\rfloor$$

$$c_{init} = \left\lfloor \frac{\tilde{n}_{SCID2}\cdot X}{30} \right\rfloor$$

$$c_{init} = \left\lfloor \frac{\tilde{n}_{SCID2} + X}{30} \right\rfloor.$$

Assuming that $\tilde{n}_{SCID2}$ is a function of RC=RC1, SC=SC1, APC=APC1, some example equations for determining the PUCCH sequence-shift pattern $f_{ss}^{PUCCH}$ and u∈{0, 1, . . . , 29} based on RC1, SC1, APC1 and X according to embodiment 6 are listed below:
- $f_{ss}^{PUCCH}=(N_{ID}^{cell}+\tilde{n}_{SCID2}\cdot(1+X))\bmod 30$
- $f_{ss}^{PUCCH}=(\tilde{n}_{SCID2}\cdot(1+X))\bmod 30$
- $f_{ss}^{PUCCH}=(N_{ID}^{cell}+\tilde{n}_{SCID2}\cdot X)\bmod 30$
- $f_{ss}^{PUCCH}=(\tilde{n}_{SCID2}\cdot X)\bmod 30$
- $f_{ss}^{PUCCH}=(N_{ID}^{cell}+\tilde{n}_{SCID2}+X)\bmod 30$
- $f_{ss}^{PUCCH}=(\tilde{n}_{SCID2}+X)\bmod 30$.

Assuming that $\tilde{n}_{SCID2}$ is a function of RC=RC1, SC=SC1, APC=APC1, some example equations for determining the PUSCH sequence-shift pattern $f_{ss}^{PUSCH}$ and u∈{0, 1, . . . , 29} based on RC1, SC1, APC1, and X according to embodiment 7 are listed below:
- $f_{ss}^{PUSCH}=(f_{ss}^{PUCCH}+\tilde{n}_{SCID2}\cdot(1+X)+\Delta_{ss})\bmod 30$
- $f_{ss}^{PUSCH}=(f_{ss}^{PUCCH}+\tilde{n}_{SCID2}\cdot X+\Delta_{ss})\bmod 30$
- $f_{ss}^{PUSCH}=(f_{ss}^{PUCCH}+\tilde{n}_{SCID2}+X+\Delta_{ss})\bmod 30$.

Some examples of determining $\tilde{n}_{SCID2}$ are listed below:
- $\tilde{n}_{SCID2}=g(RC)$
- $\tilde{n}_{SCID2}=g(RC)\cdot(I_{CSI-RS}\bmod 5)$
- $\tilde{n}_{SCID2}=g(RC)\cdot(I_{CSI-RS}\bmod 80)$
- $\tilde{n}_{SCID2}=g(RC)\cdot\Delta_{CSI-RS}$.

Here, $\Delta_{CSI-RS}$ is the CSI-RS subframe offset defined in Table 2 with $I_{CSI-RS}$=SC1; $I_{CSI-RS}$=SC1; and g(RC) is a function of RC=RC1. Some alternatives of determining g(RC) are listed below:
- g(RC)=RC
- g(RC)=RC mod 10.

In another embodiment (hereinafter referred to as embodiment 10), UE1 is configured to do soft-cell partitioning and configured with CSI-RS configuration 1. UE1 transmits at least one of PUSCH DM-RS and PUCCH generated with a base sequence $\bar{r}_{u,v}(0), \ldots, \bar{r}_{u,v}(M_{sc}^{RS}-1)$, where the sequence group number u is generated depending not only on at least one of RC1, SC1, and APC1 but also whether the signal is PUSCH DM-RS or PUCCH.

In one example, if the signal is PUSCH DM-RS, a UE generates u so that it facilitates soft-cell partitioning. If the signal is PUCCH, the UE generates u according to Rel-8 UE behavior. If the signal is PUSCH DM-RS, the UE generates u∈{0, 1, . . . , 29} according to the examples in embodiments 4 through 9 with RC1, SC1, and APC1. If the signal is PUCCH, the UE generates u∈{0, 1, . . . , 29} according to the Rel-8 procedure. One advantage of this approach is that the eNodeB may still orthogonalize PUCCH sequences transmitted from different UEs configured with different CSI-RS configurations, and at the same time, the system can still achieve soft-cell splitting gain for the PUSCH.

In another example, if the signal is PUCCH, a UE generates u so that it facilitates soft-cell partitioning. If the signal is PUSCH DM-RS, the UE generates u according to Rel-8 UE behavior. If the signal is PUCCH, the UE generates u∈{0, 1, . . . , 29} according to the examples in embodiments 4 through 9 with RC1, SC1, and APC1. If the signal is PUSCH DM-RS, the UE generates u∈{0, 1, . . . , 29} according to the Rel-8 procedure. One advantage of this approach is that the eNodeB may still orthogonalize PUSCH DM-RS transmitted from different UEs configured with different CSI-RS configurations, and at the same time, the system can still achieve soft-cell splitting gain for the PUCCH.

In another embodiment (hereinafter referred to as embodiment 11), for CoMP operation, UE2 is configured to do soft-cell partitioning and configured with two CSI-RS configurations, i.e., CSI-RS configuration 1 and CSI-RS configuration 2. In this embodiment, UE2 identifies one CSI-RS configuration out of the two configurations to determine the sequence group number u∈{0, 1, . . . , 29} for facilitating soft-cell splitting. Once the one CSI-RS configuration is determined, UE2 calculates u∈{0, 1, . . . , 29} based on the field values of the one CSI-RS configuration, and transmits at least one of PUSCH DM-RS and PUCCH generated with a base sequence $\bar{r}_{u,v}(0), \ldots, \bar{r}_{u,v}(M_{sc}^{RS}-1)$, where some example methods to calculate u∈{0, 1, . . . , 29} are described in embodiments 4 through 10. Some example methods for UE2 to determine the one CSI-RS configuration to be used for determining u∈{0, 1, . . . , 29} out of the two configurations are described in embodiment 3.

In another embodiment (hereinafter referred to as embodiment 12), UE1 is configured to do soft-cell partitioning and configured with CSI-RS configuration 1 and is scheduled to transmit PUSCH. Then UE1 transmits PUSCH DM-RS generated with a base sequence $\bar{r}_{u,v}(0), \ldots, \bar{r}_{u,v}(M_{sc}^{RS}-1)$.

When the PUSCH allocation size is $M_{sc}^{RS} < 6N_{sc}^{RB}=72$ subcarriers, the base sequence number v=0. Alternatively, when the PUSCH allocation size is $M_{sc}^{RS} \geq 6N_{sc}^{RB}=72$ subcarriers, the base sequence number is determined by:

$$v = \begin{cases} c(n_s) & \text{if group hopping is disabled and} \\ & \text{sequence hopping is enabled} \\ 0 & \text{otherwise} \end{cases}$$

where the pseudo-random sequence c(i) is initialized with $$c_{init} = \left\lfloor \frac{N_{ID}^{cell}}{30} \right\rfloor \cdot 2^5 + f_{ss}^{PUSCH}$$

at the beginning of each radio frame. Thus, when group hopping is disabled and sequence hopping is enabled, we have v=c($n_s$). In this embodiment, a number of alternatives of generating the PUSCH sequence shift $f_{ss}^{PUSCH}$ and the sequence group number u are listed below.

In a first alternative (Alt 1), the sequence group number u is generated according to u=($f_{gh}(n_s)+f_{ss}^{PUSCH}$)mod 30, where $f_{gh}(n_s)=0$ and $f_{ss}^{PUSCH}$ is determined according to embodiments 6, 7 and 8. In a second alternative (Alt 2), the sequence group number u and $f_{ss}^{PUSCH}$ are generated according to embodiment 4.

UL/DL Soft-Cell Partitioning—Configuration of Soft-Cell Partitioning

In one embodiment, if UE1 in FIG. 7 or FIG. 8 receives an information element (IE) indicating to perform soft-cell partitioning in the RRC layer, then UE1 is configured to do soft-cell partitioning for the downlink UE-RS and for the uplink RS/PUCCH. In one example, the IE is a one-bit field, toggling on or off the soft-cell partitioning as shown in Table 3.

TABLE 3

Explicit indication of soft-cell partitioning

| State in the one-bit IE turning on/off the soft-cell partitioning | Meaning |
| --- | --- |
| 0 | Turn off soft-cell partitioning for UL and DL |
| 1 | Turn on soft-cell partitioning for UL and DL |

In another embodiment, if UE1 in FIG. 7 or FIG. 8 receives a Rel-11 CSI-RS configuration, then UE1 is configured to do soft-cell partitioning for the downlink UE-RS and for the uplink RS/PUCCH. An example mechanism for toggling on or off the soft-cell partitioning is shown in Table 4.

TABLE 4

Implicit indication of soft-cell partitioning - CSI-RS configuration

| CSI-RS configuration | Meaning |
| --- | --- |
| Rel-10 CSI-RS configuration | Turn off soft-cell partitioning for UL and DL |
| Rel-11 CSI-RS configuration | Turn on soft-cell partitioning for UL and DL |

In another embodiment, if UE1 in FIG. 7 or FIG. 8 receives a Rel-11 CSI-RS configuration, then UE1 is configured to do soft-cell partitioning for the downlink UE-RS only. This signaling is useful for the scenarios where the UL soft-cell partitioning is not significantly beneficial over no UL soft-cell partitioning. An example mechanism for toggling on or off the soft-cell partitioning is shown in Table 5.

TABLE 5

Implicit indication of DL soft-cell partitioning - CSI-RS configuration

| CSI-RS configuration | Meaning |
| --- | --- |
| Rel-10 CSI-RS configuration | Turn off soft-cell partitioning for DL |
| Rel-11 CSI-RS configuration | Turn on soft-cell partitioning for DL |

In another embodiment, if UE1 in FIG. 7 or FIG. 8 is configured to receive E-PDCCH, then UE1 is configured to do soft-cell partitioning for the downlink UE-RS and uplink RS/PUCCH. An example mechanism for toggling on or off the soft-cell partitioning is shown in Table 6.

TABLE 6

Implicit indication of DL soft-cell partitioning - E-PDCCH configuration

| E-PDCCH configuration | Meaning |
| --- | --- |
| E-PDCCH not configured | Turn off soft-cell partitioning for DL |
| E-PDCCH configured | Turn on soft-cell partitioning for DL |

In another embodiment, if UE1 in FIG. 7 or FIG. 8 receives parameter X as in embodiments 2 and 9, then UE1 is configured to do soft-cell partitioning for the downlink UE-RS and for the uplink RS. An example mechanism for toggling on or off the soft-cell partitioning is shown in Table 7.

TABLE 7

Implicit indication of soft-cell partitioning - CSI-RS configuration

| Reception of X | Meaning |
|---|---|
| Not received | Turn off soft-cell partitioning for UL and DL |
| Received | Turn on soft-cell partitioning for UL and DL |

Uplink Soft-Cell Partitioning—PUCCH Resource Allocation

In legacy systems (3 GPP LTE Rel 8,9,10), a PUCCH resource carrying HARQ-ACK (PUCCH format 1a/1b) is dynamically configured to a UE when the UE's HARQ-ACK feedback is for a PDSCH dynamically scheduled by a PDCCH. In this case, the PUCCH resource number $n_{PUCCH}^{(1)}$ for HARQ-ACK is determined by the following equation: $n_{PUCCH}^{(1)} = n_{CCE} + N_{PUCCH}^{(1)}$, where $N_{PUCCH}^{(1)}$ is RRC configured and $n_{CCE}$ is the smallest control channel element (CCE) number of the PDCCH. Using $n_{PUCCH}^{(1)}$, the UE determines CS and OCC for the PUCCH according to the mechanism explained in the background. Furthermore, $n_{PUCCH}^{(1)}$ together with higher-layer configured parameter $N_{RB}^{(2)}$ is used for determining the PRB index.

The physical resource blocks to be used for transmission of PUCCH in slot $n_s$ are given by:

$$n_{PRB} = \begin{cases} \lfloor \frac{m}{2} \rfloor & \text{if } (m + n_s \bmod 2) \bmod 2 = 0 \\ N_{RB}^{UL} - 1 - \lfloor \frac{m}{2} \rfloor & \text{if } (m + n_s \bmod 2) \bmod 2 = 1 \end{cases}$$

where the variable m depends on the PUCCH format. For formats 1, 1a, and 1b:

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + & \\ N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases},$$

Figure 9:
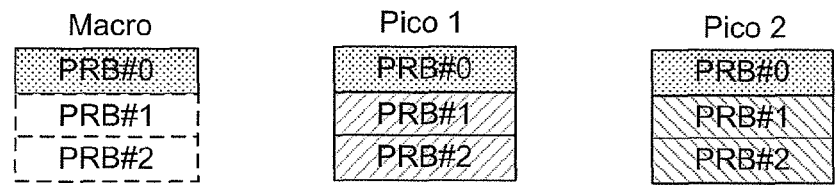
FIG. 9 illustrates PUCCH PRBs designated for PUCCH inter-sequence interference reduction, according to an embodiment of this disclosure.
Figure 9:
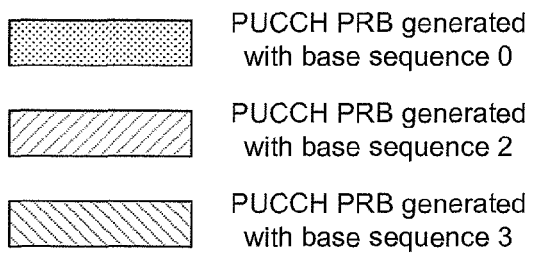

In Rel-11 system, one type of UE (type 1) implements UL soft-cell partitioning for PUCCH, while the other type of UE (type 0) does not. To reduce interference between the two types of UE and its adverse impact on the system performance, it is beneficial to multiplex only one type of UE in each PRB. FIG. 9 illustrates this concept. As shown in FIG. 9, PRB#0 is used only by type 0 UEs that transmit the PUCCH according to Rel-8 mechanism. On the other hand, PRB#1 and PRB#2 are used only by type 1 UEs that transmit the PUCCH with soft-cell partitioning.

In one embodiment, UE1 in FIG. 7 or FIG. 8 is configured to implement soft-cell partitioning and is configured with CSI-RS configuration 1. Then, $n_{PUCCH}^{(1)}$ of UE1's HARQ-ACK corresponding to a PDSCH scheduled by a PDCCH is determined by $n_{PUCCH}^{(1)} = n_{CCE} + N_{PUCCH,1}^{(1)}$, and the variable m determining the PRB on which the HARQ-ACK is transmitted is given by:

$$m = \begin{cases} N_{RB,1}^{(2)} & \text{if } n_{PUCCH}^{(1)} < c \cdot N_{cs}^{(1)} / \Delta_{shift}^{PUCCH} \\ \left\lfloor \frac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + & \\ N_{RB,1}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases},$$

where both $N_{PUCCH,1}^{(1)}$ and $N_{RB,1}^{(2)}$ are RRC configured separately from legacy offsets $N_{PUCCH}^{(1)}$ and $N_{RB}^{(2)}$.

In one example, $N_{PUCCH,1}^{(1)}$ and $N_{RB,1}^{(2)}$ are configured in the E-PDCCH IE transmitted in the RRC layer. In another example, at least one of $N_{PUCCH,1}^{(1)}$ and $N_{RB,1}^{(2)}$ are determined at least partly upon at least one of RC1, SC1, APC1, and X of CSI-RS configuration 1.

In another embodiment, UE1 in FIG. 7 or FIG. 8 is configured to implement soft-cell partitioning and is configured with CSI-RS configuration 1. Then, $n_{PUCCH}^{(1)}$ of UE 1's HARQ-ACK corresponding to a PDSCH scheduled by a PDCCH is determined by $n_{PUCCH}^{(1)} = n_{CCE} + N_{PUCCH}^{(1)} + N_{PUCCH,offset}^{(1)}$, and the variable m determining the PRB on which the HARQ-ACK is transmitted is given by:

$$m = \begin{cases} N_{RB}^{(2)} + N_{RB,offset}^{(2)} & \text{if } n_{PUCCH}^{(1)} < c \cdot N_{cs}^{(1)} / \Delta_{shift}^{PUCCH} \\ \left\lfloor \frac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + & \\ N_{RB,1}^{(2)} + N_{RB,offset}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases},$$

where both $N_{PUCCH,offset}^{(1)}$ and $N_{RB,offset}^{(2)}$ are RRC configured separately from legacy offsets $N_{PUCCH}^{(1)}$ and $N_{RB,1}^{(2)}$.

In one example, $N_{PUCCH,offset}^{(1)}$ and $N_{RB,offset}^{(2)}$ are configured in the E-PDCCH IE transmitted in the RRC layer. In another example, at least one of $N_{PUCCH,1}^{(1)}$ and $N_{RB,1}^{(2)}$ are determined at least partly upon at least one of RC1, SC1, APC1 and X of CSI-RS configuration 1.

In another embodiment, UE1 in FIG. 7 or FIG. 8 is configured to implement soft-cell partitioning and is configured with CSI-RS configuration 1. Then, $n_{PUCCH}^{(1)}$ of UE 1's HARQ-ACK corresponding to a PDSCH scheduled by a PDCCH is determined by a combination of semi-static RRC signaling and dynamic PDCCH signaling. The network semi-statically configures a set of N candidates for $n_{PUCCH}^{(1)}$ by RRC, and dynamically indicates one $n_{PUCCH}^{(1)}$ out of the N candidates by PDCCH signaling.

In one example, the number of the candidates N=4, and hence a two-bit information element (IE) is included in the PDCCH, e.g., corresponding to the DL grant. In this example, 4 candidate $n_{PUCCH}^{(1)}$ values are configured by RRC, and depending on the value of the IE, $n_{PUCCH}^{(1)}$ is determined as Table 8 below.

TABLE 8

Dynamic indication of $n_{PUCCH}^{(1)}$ example 1

| The two-bit IE indicating $n_{PUCCH}^{(1)}$ | Indicated $n_{PUCCH}^{(1)}$ value |
|---|---|
| 00 | The first $n_{PUCCH}^{(1)}$ value configured by RRC |
| 01 | The second $n_{PUCCH}^{(1)}$ value configured by RRC |
| 10 | The third $n_{PUCCH}^{(1)}$ value configured by RRC |
| 11 | The fourth $n_{PUCCH}^{(1)}$ value configured by RRC |

For example, the IE is included in the DL grant as an explicit 2-bit field.

In another example, the number of the candidates N=2, and hence a one-bit information element (IE) is included in the PDCCH, e.g., corresponding to the DL grant. In this case, 2 candidate $n_{PUCCH}^{(1)}$ values are configured by RRC, and depending on the value of the IE, $n_{PUCCH}^{(1)}$ is determined as in Table 9 below.

TABLE 9

Dynamic indication of $n_{PUCCH}^{(1)}$ example 2

| The one-bit IE indicating $n_{PUCCH}^{(1)}$ | Indicated $n_{PUCCH}^{(1)}$ value |
|---|---|
| 0 | The first $n_{PUCCH}^{(1)}$ value configured by RRC |
| 1 | The second $n_{PUCCH}^{(1)}$ value configured by RRC |

For example, the IE is included in a UL grant as an explicit 1-bit field.

In another embodiment, UE1 in FIG. 7 or FIG. 8 is configured to implement soft-cell partitioning and is configured with CSI-RS configuration 1. Then, UE1 determines a PUCCH format 1/1a/1b resource and generates its base sequence differently depending on the location of DL grant, i.e., whether PDCCH or E-PDCCH is used for conveying a DL grant associated with the HARQ-ACK feedback. For E-PDCCH, refer to FIG. 6. In one example, UE1 generates UL RS base sequence for a PUCCH format 1/1a/1b when UE1 receives a DL grant in the E-PDCCH region as shown in Table 10.

TABLE 10

Base RS sequence Generation depending on DL grant location

| DL grant location | Base sequence generation method | $n_{PUCCH}^{(1)}$ mapping |
|---|---|---|
| PDCCH | With soft-cell partitioning | $n_{CCE}$ derived within the PDCCH region |
| E-PDCCH | Without soft-cell partition (Rel-8) | $n_{CCE}$ derived within the E-PDCCH region |

In Section 5.1.2 of REF3, PUCCH power control is described as follows.

If serving cell c is the primary cell, the setting of the UE Transmit power $P_{PUCCH}$ for the physical uplink control channel (PUCCH) transmission in subframe i is defined by $$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix}$$

[dBm]

where $P_{CMAX,c}(i)$ is the configured UE transmit power in subframe i for serving cell c.

The parameter $\Delta_{F\_PUCCH}(F)$ is provided by higher layers. Each $\Delta_{F\_PUCCH}(F)$ value corresponds to a PUCCH format (F) relative to PUCCH format 1a, where each PUCCH format (F) is defined in Table 5.4-1 of REF3.

If the UE is configured by higher layers to transmit PUCCH on two antenna ports, the value of $\Delta_{TxD}(F')$ is provided by higher layers where each PUCCH format F' is defined in Table 5.4-1 of REF3; otherwise, $\Delta_{TxD}(F')=0$.

$h(n_{CQI}, n_{HARQ}, n_{SR})$ is a PUCCH format dependent value, where $n_{CQI}$ corresponds to the number of information bits for the channel quality information defined in section 5.2.3.3. $n_{SR}=1$ if subframe i is configured for SR for the UE not having any associated transport block for UL-SCH, otherwise $n_{SR}=0$. If the UE is configured with one serving cell, $n_{HARQ}$ is the number of HARQ bits sent in subframe i; otherwise, the value of $n_{HARQ}$ is defined in section 10.1.

For PUCCH format 1,1a, and 1b, $h(n_{CQI}, n_{HARQ}, n_{SR})=0$

For PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})=0$

For PUCCH format 2, 2a, 2b, and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}.$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}.$$

For PUCCH format 3, if the UE is configured by higher layers to transmit PUCCH on two antenna ports, or if the UE transmits more than 11 bits of HARQ-ACK/SR, $$h(n_{CQI}, n_{HARQ}, n_{SR}) = \frac{n_{HARQ} + n_{SR} - 1}{3}.$$

Otherwise, $$h(n_{CQI}, n_{HARQ}, n_{SR}) = \frac{n_{HARQ} + n_{SR} - 1}{2}.$$

$P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

$\delta_{PUCCH}$ is a UE specific correction value, also referred to as a TPC command, included in a PDCCH with DCI format 1A/1B/1D/1/2A/2/2B/2C for the primary cell or sent jointly coded with other UE specific PUCCH correction values on a PDCCH with DCI format 3/3A whose CRC parity bits are scrambled with TPC-PUCCH-RNTI.

The UE attempts to decode a PDCCH of DCI format 3/3A with the UE's TPC-PUCCH-RNTI and one or several PDCCHs of DCI format 1A/1B/1D/1/2A/2/2B/2C with the UE's C-RNTI (cell radio network temporary identifier) or SPS C-RNTI on every subframe except when in DRX. If the UE decodes a PDCCH with DCI format 1A/1B/1D/1/2A/2/2B/2C for the primary cell and the corresponding detected RNTI equals the C-RNTI or SPS C-RNTI of the UE, the UE uses the $\delta_{PUCCH}$ provided in that PDCCH unless the TPC field in the DCI format is used to determine the PUCCH resource as in section 10.1. Alternatively, if the UE decodes a PDCCH with DCI format 3/3A, the UE shall use the $\delta_{PUCCH}$ provided in that PDCCH. Otherwise, the UE sets $\delta_{PUCCH}=0$ dB.

$$g(i) = g(i-1) + \sum_{m=0}^{M-1} \delta_{PUCCH}(i - k_m)$$

where g(i) is the current PUCCH power control adjustment state and where g(0) is the first value after reset. For FDD, M=1 and $k_0$=4. For TDD, values of M and $k_m$ are given in Table 10.1.3.1-1.

The $\delta_{PUCCH}$ dB values signaled on PDCCH with DCI format 1A/1B/1D/1/2A/2/2B/2C are given in Table 5.1.2.1-1. If the PDCCH with DCI format 1/1A/2/2A/2B/2C is validated as a SPS activation PDCCH, or the PDCCH with DCI format 1A is validated as an SPS release PDCCH, then $\delta_{PUCCH}$ is 0 dB. The $\delta_{PUCCH}$ dB values signaled on PDCCH with DCI format 3/3A are given in Table 5.1.2.1-1 or in Table 5.1.2.1-2 as semi-statically configured by higher layers.

If $P_{O\_UE\_PUCCH}$ value is changed by higher layers, then g(0)=0. Otherwise, g(0)=$\Delta P_{rampup}+\delta_{msg2}$ where $\delta_{msg2}$ is the TPC command indicated in the random access response, see Section 6.2 and $\Delta P_{rampup}$ is the total power ramp-up from the first to the last preamble provided by higher layers.

If the UE has reached $P_{CMAX,c}$ for the primary cell, positive TPC commands for the primary cell are not accumulated. If the UE has reached minimum power, negative TPC commands are not accumulated. The UE resets accumulation when $P_{O\_UE\_PUCCH}$ value is changed by higher layers, or when the UE receives a random access response message. g(i)=g(i−1) if i is not an uplink subframe in TDD.

TABLE 5.1.2.1-1

Mapping of TPC Command Field in
DCI format 1A/1B/1D/1/2A/2B/2C/2/3 to $\delta_{PUCCH}$ values

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

TABLE 5.1.2.1-2

Mapping of TPC Command Field in DCI format 3A to $\delta_{PUCCH}$ values

| TPC Command Field in DCI format 3A | $\delta_{PUCCH}$ [dB] |
|---|---|
| 0 | −1 |
| 1 | 1 |

Downlink Dynamic UE-RS Scrambling

Figure 10:
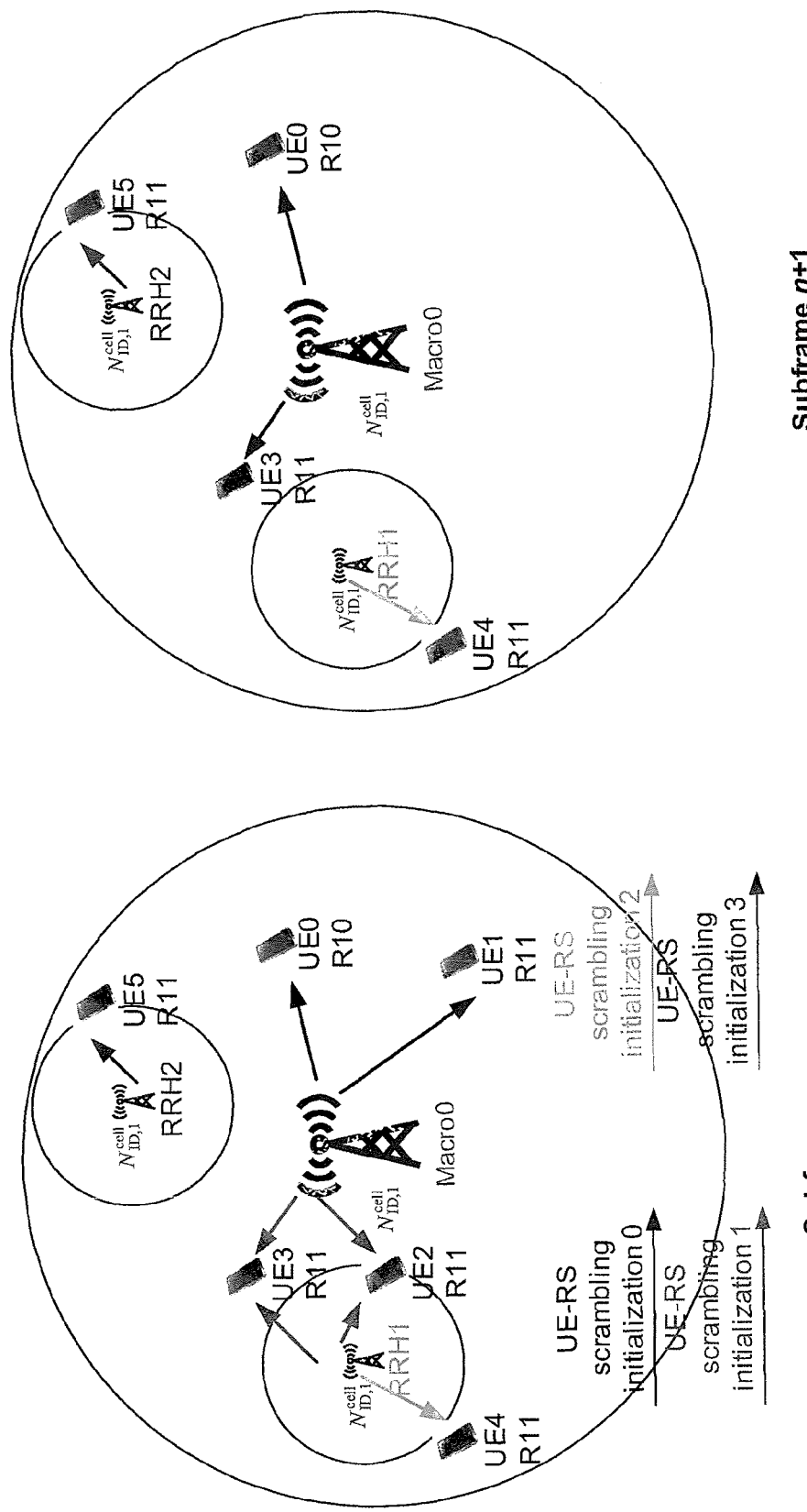
FIG. 10 illustrates downlink transmissions in a heterogeneous network, according to an embodiment of this disclosure.

FIG. 10 illustrates downlink transmissions in a heterogeneous network, according to an embodiment of this disclosure. Like FIG. 7, FIG. 10 illustrates LTE-A Rel-11 CoMP scenario 4, where a central controller controls a number of transmission points (TPs) (macro0, RRH1, and RRH2) in the macro coverage. One physical cell ID $N_{ID}^{cell}$ is assigned to the macro and RRHs. A number of UEs (UE0 through UE5) are in communication with one or more of the macro and RRHs. In some embodiments, each of macro0, RRH1, and RRH2 may represent one or more of eNBs 101-103 in FIG. 1 or macro0, RRH1, and RRH2 of FIG. 7. Likewise, each UE, UE0 through UE5, may represent one or more of UEs 111-116 in FIG. 1 or UE0 through UE3 in FIG. 7.

According to the legacy LTE specifications (3GPP LTE Rel-10), regardless of which TP a UE receives DL data signals from, a UE expects that UE-specific demodulation reference signals (UE-RS) are scrambled according to the physical cell ID $N_{ID}^{cell}$ obtained during the initial access procedure. In Section 6.10.3.1 in 3GPP TS 36.211 v10.0.0, the UE behavior is on the scrambling of UE-RS is described as follows.

The pseudo-random sequence generator is initialized with $c_{init}=(\lfloor n_s/2 \rfloor+1)\cdot(2N_{ID}^{cell}+1)\cdot2^{16}+n_{SCID}$ at the start of each subframe, where, for antenna ports 7 and 8, $n_{SCID}$ is given by the scrambling identity field according to Table 6.10.3.1-1 in the most recent DCI format 2B or 2C associated with the PDSCH transmission. If there is no DCI format 2B or 2C associated with the PDSCH transmission on antenna ports 7 or 8, the UE considers $n_{SCID}$ to be zero. For antenna ports 9 to 14, the UE considers $n_{SCID}$ to be zero.

According to this UE behavior described above, if macro0, RRH1, and RRH2 were simultaneously transmitting in the same frequency band to different UEs, as illustrated in FIG. 10, the interference from other TPs received at each UE would be coherently added to the desired signal, and thus each UE cannot distinguish the desired signal and the interfering signals.

To mitigate this problem, UE-specific or TP-specific UE-RS scrambling may be introduced for Rel-11 UEs.

At the same time, to facilitate MU-MIMO UE pairing of Rel-11 UEs and Rel-10 or Rel-9 UEs, it may be beneficial to use legacy UE-RS scrambling for Rel-11 UEs as well. Two methods to enable this scrambling are now described. One method is dynamic indication of UE-RS scrambling method in a DL/UL grant DCI format. This method includes the dynamic allocation of a UE-RS scrambling method from at least two of UE-specific, TP-specific, and Rel-10 compatible UE-RS scrambling.

A second method is semi-static indication of UE-RS scrambling method. This method includes semi-static allocation (e.g., via RRC signaling) of a UE-RS scrambling method from at least two of UE-specific, TP-specific, and Rel-10 compatible UE-RS scrambling.

FIG. 10 illustrates example downlink transmissions in subframes n and n+1 in a heterogeneous network. UE0 is a Rel-10 UE, while the other UEs (UE1, UE2, UE3, UE4 and UE5) are Rel-11 UEs. In the network illustrated in FIG. 10, the following transmissions occur in subframe n.

In subframe n, the network schedules the same PRBs for UE4 and UE5 (where UE4 is positioned close to RRH1, and UE5 is positioned close to RRH2, which is positioned far away from RRH1) in a subframe without a significant concern about the interference power. Furthermore, two UE-RS from RRH1 and RRH2 are not coherent combined at the receivers, with the aid of different UE-RS scrambling (initialization). The network MU-MIMO multiplexes and assigns orthogonal UE-RS for Rel-11 UE1 and Rel-10 UE0, without affecting Rel-10 UE0's demodulation performance. The network MU-MIMO multiplexes and assigns orthogonal UE-RS for two Rel-11 UEs: UE2 and UE3.

Alternatively, in subframe n+1, UE1 and UE2 do not receive transmissions, e.g., because they completed data reception. Because of the UE population change, the following transmissions occur in subframe n+1.

In subframe n+1, the network schedules the same PRBs for UE4 and UE5 (where UE4 is positioned close to RRH1, and UE5 is positioned close to RRH2, which is positioned far away from RRH1) in a subframe without a significant concern about the interference power. Furthermore, two UE-RS from RRH1 and RRH2 are not coherent combined at the receivers, with the aid of different UE-RS scrambling (initialization). The network MU-MIMO multiplexes and assigns orthogonal UE-RS for Rel-11 UE3 and Rel-10 UE0, without affecting Rel-10 UE0's demodulation performance.

To increase the network throughput and flexibility of implementation/scheduling, it is desirable that the network is able to efficiently support these diverse and dynamically changing transmission schemes. To facilitate this diverse and dynamic operation, a control signaling design may be used for advanced (or Rel-11) UEs.

Examples of TP-Specific Scrambling

In one embodiment, for a UE configured to receive TP-specifically scrambled UE-RS, UE-RS scrambling is initialized depending at least partly upon at least one of virtual cell ID, resourceConfig, subframeConfig, and antennaPortsCount of the UE's CSI-RS configuration (e.g., the CSI-RS-Config described above). Here, IE subframeConfig $\in \{0, 1, \ldots 31\}$ determines subframes on which CSI-RS are transmitted according to Table 1 above. IE antennaPortsCount $\in \{1, 2, 4, 8\}$ determines the number of antenna ports for which CSI-RS are transmitted. IE resourceConfig $\in \{0, 1, \ldots 154\}$ determines a CSI-RS pattern corresponding to antennaPortsCount on a subframe on which CSI-RS is transmitted according to Table 2 above. The Virtual cell ID is used for initializing the scrambling sequence. In one example, virtual cell ID $N_{v\text{-}ID}^{cell}$ replaces $N_{ID}^{cell}$ CSI-RS and UE-RS scrambling initializations, and in UL RS base sequence generation (e.g., in sequence group hopping, and the like).

In other words, $c_{init}$ for UE-RS scrambling is defined as a function of at least one of resourceConfig (RC), subframeConfig (SC, or $I_{CSI\text{-}RS}$) and antennaPortsCount (APC).

In one example, for a UE configured to receive TP-specifically scrambled UE-RS, UE-RS scrambling is initialized depending at least partly upon at least one of resourceConfig, subframeConfig, and antennaPortsCount of the UE's CSI-RS configuration (e.g., the CSI-RS-Config described above). Here, IE subframeConfig $\in \{0, 1, \ldots 31\}$ determines subframes on which CSI-RS are transmitted according to Table 1. IE antennaPortsCount $\in \{1, 2, 4, 8\}$ determines the number of antenna ports for which CSI-RS are transmitted. IE resourceConfig $\in \{0, 1, \ldots 154\}$ determines a CSI-RS pattern corresponding to antennaPortsCount on a subframe on which CSI-RS is transmitted according to Table 2.

In other words, $c_{init}$ for UE-RS scrambling is defined as a function of at least one of resourceConfig (RC), subframeConfig (SC, or $I_{CSI\text{-}RS}$ and antennaPortsCount (APC).

There are a number of benefits of this method. One benefit is that no (or little) additional signaling is needed to configured UE-RS scrambling initialization for facilitating soft cell-partitioning, other than the signaling used for CSI-RS configuration for CoMP scenario 4 operation. Another benefit is that CSI-RS configurations are likely to be different between TPs, as it is common that different TPs transmit CSI-RS in different time-frequency resources. Relying on this property, this method ensures that UEs receiving DL signals from different TPs receive DL signals with differently scrambled UE-RS.

For an illustration of the method, consider FIG. 10, where macro( )transmits CSI-RS according to CSI-RS configuration 1, RRH1 transmits CSI-RS according to CSI-RS configuration 2, and RRH2 transmits CSI-RS according to CSI-RS configuration 3, where the three CSI-RS configurations are defined below.

CSI-RS configuration 1 comprises at least the following fields:
  resourceConfig=RC1
  subframeConfig=SC1
  antennaPortCount=APC1
  virtualCellID=VCID1.

CSI-RS configuration 2 comprises at least the following fields:
  resourceConfig=RC2
  subframeConfig=SC2
  antennaPortCount=APC2
  virtualCellID=VCID2.

CSI-RS configuration 3 comprises at least the following fields:
  resourceConfig=RC3
  subframeConfig=SC3
  antennaPortCount=APC3
  virtualCellID=VCID3.

In FIG. 10, UE1, UE2 and UE3 are advanced UEs, implementing not only Rel-10 features but also new features introduced in Rel-11.

Some example TP-specific scrambling initializations are considered in the following embodiments.

In an embodiment, UE1 is configured with CSI-RS configuration 1 and is also configured to receive TP-specifically scrambled UE-RS. UE1 receives PDSCH with UE-RS scrambled by a scrambling sequence with an initialization $c_{init}$ which is dependent on either RRC configured TP ID or CSI-RS configuration 1. Some examples for $c_{init}$ are listed below.

$c_{init} = (\lfloor n_s/2 \rfloor + 1) \cdot (2N_{v\text{-}ID,1}^{cell} + 1) \cdot 2^{16} + n_{SCID}$. Here, virtual cell ID $N_{v\text{-}ID,1}^{cell}$ replaces $N_{ID}^{cell}$ of the legacy UE-RS scrambling sequence initialization.

$c_{init} = (\lfloor n_s/2 \rfloor + 1) \cdot (2N_{ID}^{cell} + 1) \cdot 2^{16} + n_{SCID2} \cdot 2 + n_{SCID}$. Here, $n_{SCID2}$ is multiplied by 2 so that the initialization $c_{init}$ changes according to $n_{SCID2}$ independently of $n_{SCID}$, which is a one-bit quantity.

$c_{init} = (\lfloor n_s/2 \rfloor + 1) \cdot (2N_{ID}^{cell} + 1) \cdot 2^{16} + n_{SCID2}$. Here, the legacy SC-ID $n_{SCID}$ is removed and $n_{SCID2}$ alone determines the scrambling initialization.

$c_{init} = (\lfloor n_s/2 \rfloor + 1) \cdot (2N_{v\text{-}ID,1}^{cell} + 1) \cdot 2^{16} + n_{SCID2} \cdot + n_{SCID}$.

$c_{init} = (\lfloor n_s/2 \rfloor + 1) \cdot (2N_{ID}^{cell} + 1) \cdot 2^{16} + n_{SCID2}$.

Some examples of determining $n_{SCID2}$ are listed below, where X is a parameter providing means to TPs to control the UE-RS scrambling behavior. For example, $X \in \{0, 1, \ldots, 2^{N_x}-1\}$ is an $N_x$-bit parameter. In one example, X is a one-bit quantity. For signaling of X, three alternatives are listed below.

In a first alternative (Alt 0), the parameter X is fixed to be 0, and not signaled. In a second alternative (Alt 1), the parameter X is semi-statically signaled in the RRC layer. In a third alternative (Alt 2), the parameter X is dynamically signaled in a DCI format.

Some examples of determining $n_{SCID2}$ are listed below, where $\tilde{n}_{SCID2}$ is a function of RC=RC1, SC=SC1, APC=APC1:

$n_{SCID2} = n_{SCID}2 \cdot (1+X)$. Here, the multiplication of (1+X) expands the possible values for the UE-RS scrambling initialization $c_{init}$.

$n_{SCID2} = \tilde{n}_{SCID2} \cdot X$. Here, the multiplication of X expands the possible values for the UE-RS scrambling initialization $c_{init}$, and at the same time gives flexibility of turning off the soft-cell partitioning.

$n_{SCID2} = \tilde{n}_{SCID2} + X$. Here, the addition of X lets eNodeB have flexibility to choose the UE-RS scrambling initialization $c_{init}$, e.g., to intentionally configure a different UE-RS scrambling to a UE than the one configured by the CSI-RS configuration.

Some examples of determining $\tilde{n}_{SCID2}$ are listed below:

$\tilde{n}_{SCID2} = g(RC)$. In this case, $n_{SCID2}$ only depends on the CSI-RS pattern.

$\tilde{n}_{SCID2} = g(RC) \cdot (I_{CSI-RS} \bmod 5)$. Here, ($I_{CSI-RS} \bmod 5$) is applied to ensure that at most 5 different scrambling initializations are generated with possible values of $I_{CSI-RS}$, where 5 corresponds to the minimum configurable period for CSI-RS subframes. In this case, $n_{SCID2}$ is an 8-bit quantity.

$\tilde{n}_{SCID2} = g(RC) \cdot (I_{CSI-RS} \bmod 80)$. Here, ($I_{CSI-RS} \bmod 80$) is applied to ensure that at most 80 different scrambling initializations are generated with possible values of $I_{CSI-RS}$, where 80 corresponds to the maximum configurable period for CSI-RS subframes. In this case, $n_{SCID2}$ is a 12-bit quantity.

$\tilde{n}_{SCID2} = g(RC) \cdot \Delta_{CSI-RS}$. Here, $\Delta_{CSI-RS}$ is applied to ensure that at most $T_{CSI-RS}$ different scrambling initializations are generated with possible values of $I_{CSI-RS}$.

In these examples, $\Delta_{CSI-RS}$ is CSI-RS subframe offset derived from $I_{CSI-RS} = $SC1 using Table 2.

Some alternatives of determining the function g(RC) are listed below:

g(RC)=RC.

g(RC)=RC mod 10

In one embodiment, for CoMP operation, UE2 is configured with two CSI-RS configurations, i.e., CSI-RS configuration 1 and CSI-RS configuration 2. UE2 is also configured to receive TP-specifically scrambled UE-RS. In this embodiment, UE2 identifies one CSI-RS configuration out of the two configurations to determine $n_{SCID2}$. Once the one CSI-RS configuration is determined, UE2 calculates $n_{SCID2}$ based on the field values of the one CSI-RS configuration, and receives UE-RS scrambled with an initialization $c_{init}$ which is dependent on either RRC configured TP ID or CSI-RS configuration 1. Some examples for $c_{init}$ are listed below.

$c_{init} = (\lfloor n_s/2 \rfloor + 1) \cdot (2N_{v-ID}^{cell} + 1) \cdot 2^{16} + n_{SCID}$.

$c_{init} = (\lfloor n_s/2 \rfloor + 1) \cdot (2N_{ID}^{cell} + 1) \cdot 2^{16} + n_{SCID2} \cdot 2 + n_{SCID}$.

$c_{init} = (\lfloor n_s/2 \rfloor + 1) \cdot (2N_{ID}^{cell} + 1) \cdot 2^{16} + n_{SCID2}$.

$c_{init} = (\lfloor n_s/2 \rfloor + 1) \cdot (2N_{v-ID}^{cell} + 1) \cdot 2^{16} + n_{SCID2} \cdot 2 + n_{SCID}$.

$c_{init} = (\lfloor n_s/2 \rfloor + 1) \cdot (2N_{v-ID}^{cell} + 1) \cdot 2^{16} + n_{SCID2}$.

Example methods for a UE to determine the one CSI-RS configuration to be used for determining at least one of $n_{SCID2}$ and $N_{v-ID}^{cell}$ out of the two configurations are now disclosed.

In one example method (Example method 1), the one CSI-RS configuration to determine the at least one of $n_{SCID2}$ and $N_{v-ID}^{cell}$ is the CSI-RS configuration of the primary TP of a UE, from which the UE receives E-PDCCH.

In another example method (Example method 2), the one CSI-RS configuration to determine the at least one of $n_{SCID2}$ and $N_{v-ID}^{cell}$ is explicitly identified by a PHY signaling. In one example, a one-bit information field is introduced in UL DCI format(s) (e.g., DCI format 0/0A and DCI format 4) to indicate one of the two CSI-RS configurations, as shown in Table 11 below.

TABLE 11

Explicit PHY signaling example

| The one bit information field in the UL DCI format(s) | Meaning |
| --- | --- |
| 0 | A first CSI-RS configuration |
| 1 | A second CSI-RS configuration |

In another example method (Example method 3), the one CSI-RS configuration to cell determine the at least one of $n_{SCID2}$ and $N_{v-ID}^{cell}$ is explicitly identified by an RRC signaling. In one method, an RRC signaling identifies a single primary CSI-RS configuration among the multiple CSI-RS configurations configured to a UE. In this case, the field values in the primary CSI-RS configuration determine the at least one of $n_{SCID2}$ and $N_{v-ID}^{cell}$.

In one example, when UE2 receives an RRC signaling identifying that CSI-RS configuration 1 is a primary CSI-RS configuration, UE2 would receive UE-RS scrambled with initialization $c_{init}$ with $n^{(1)}SCID2$, where $n^{(1)}SCID2$ is determined based on the field values of the CSI-RS configuration 1. In another example, when UE2 receives an RRC signaling identifying that CSI-RS configuration 1 is a primary CSI-RS configuration, UE2 would receive UE-RS scrambled with initialization $c_{init}$ with $N_{v-ID,2}^{cell}$, where $N_{v-ID,2}^{cell}$ is the virtual cell ID of the CSI-RS configuration 2.

One example RRC signaling design to identify that CSI-RS configuration 1 is a primary CSI-RS configuration is to introduce a one-bit flag, i.e., primaryFlag field in each CSI-RS configuration indicating whether the CSI-RS configuration is primary or not. If primaryFlag=1, then the associated CSI-RS configuration is primary. If primaryFlag=0, then the associated CSI-RS configuration is non-primary. An example of such an RRC signaling message is shown below, where the RRC signaling message includes two CSI-RS configurations, i.e., CSI-RS configuration 1 and CSI-RS configuration 2, and CSI-RS configuration 1 (csi-RS1) is flagged to be a primary configuration, with setting primaryFlag=1.

```
csi-RS1                    {
    setup                  {
        antennaPortsCount = APC1,
        resourceConfig = RC1,
        subframeConfig = SC1,
        p-C-r11 = PC1,
    virtualCellID = VCID1,
        primaryFlag = 1
    }
}
csi-RS2                    {
    setup                  {
        antennaPortsCount = APC2,
        resourceConfig = RC2;
        subframeConfig = SC2,
        p-C-r11 = PC2,
    virtualCellID = VCID2,
        primaryFlag = 0
    }
}
```

In another method, one RRC signaling message comprises two CSI-RS configurations as shown below, i.e., CSI-RS configuration 1 and CSI-RS configuration 2. The signaling message is sent to UE2. Then, UE2 will use the first CSI-RS configuration, i.e., CSI-RS configuration 1, in the RRC signaling message to determine the at least one of $n_{SCID2}$ and $N_{v-ID}^{cell}$.

```
    csi-RS1                              {
        setup                            {
            antennaPortsCount = APC1,
            resourceConfig = RC1,
            subframeConfig = SC1,
        virtualCellID = VCID1,
            p-C-r11 = PC1
        }
    }
    csi-RS2                              {
        setup                            {
            antennaPortsCount = APC2,
            resourceConfig = RC2,
            subframeConfig = SC2,
        virtualCellID = VCID2,
            p-C-r11 = PC2
        }
    }
```

In another example method (Example method 4), the one CSI-RS configuration to determine $n_{SCID2}$ is with the smallest g(RC). In one example where g(RC)=RC, when RC1=7 and RC2=15, UE2 uses CSI-RS configuration 1 for determining $n_{SCID2}$. In another example where g(RC)=RC mod 10, when RC1=7 and RC2=15, UE2 uses CSI-RS configuration 2 for determining $n_{SCID2}$.

In another example method (Example method 5), the one CSI-RS configuration to determine $n_{SCID2}$ is with the smallest period, i.e., $T_{CSI-RS}$, where $T_{CSI-RS}$ is the CSI-RS period derived with $I_{CSI-RS}$=SC in Table 2. For example, when SC1 gives $T_{CSI-RS}$=5 and SC2 gives $T_{CSI-RS}$=10, UE2 uses CSI-RS configuration 1 for determining $n_{SCID2}$.

In another example method (Example method 6), the one CSI-RS configuration to determine $n_{SCID2}$ is with the largest period, i.e., $T_{CSI-RS}$, where $T_{CSI-RS}$ is the CSI-RS period derived with $I_{CSI-RS}$=SC in Table 2. For example, when SC1 gives $T_{CSI-RS}$=5 and SC2 gives $T_{CSI-RS}$=10, UE2 uses CSI-RS configuration 2 for determining $n_{SCID2}$.

In another example method (Example method 7), the one CSI-RS configuration to determine $n_{SCID2}$ is with the smallest offset, i.e., $\Delta_{CSI-RS}$ where $\Delta_{CSI-RS}$ is CSI-RS subframe offset derived with $I_{CSI-RS}$=SC in Table 2. For example, when SC1 gives $\Delta_{CSI-RS}$=5 and SC2 gives $\Delta_{CSI-RS}$=10, UE2 uses CSI-RS configuration 1 for determining $n_{SCID2}$.

In another example method (Example method 8), the one CSI-RS configuration to determine $n_{SCID2}$ is with the largest offset, i.e., $\Delta_{CSI-RS}$, where $\Delta_{CSI-RS}$ is CSI-RS subframe offset derived with $I_{CSI-RS}$=SC in Table 2. For example, when SC1 gives $\Delta_{CSI-RS}$=5 and SC2 gives $\Delta_{CSI-RS}$=10, UE2 uses CSI-RS configuration 2 for determining $n_{SCID2}$.

Examples of UE-Specific Scrambling

In one embodiment, for a UE configured to receive UE-specifically scrambled UE-RS, UE-RS scrambling is initialized depending at least partly upon an RRC signaled parameter, RRC_SCID. Some example UE-specific scrambling initializations are considered in the following embodiments.

In one embodiment, UE1 is configured to receive UE-specifically scrambled UE-RS, and UE1 receives the RRC parameter RRC_SCID=$n_{SCID2}$. Then, UE1 receives the PDSCH with UE-RS scrambled by a scrambling sequence initialized with $c_{init}=(\lfloor n_s/2 \rfloor +1) \cdot (2N_{ID}^{cell}+1) \cdot 2^{16}+n_{SCID2} \cdot 2+n_{SCID2}$. Here, $n_{SCID2}$ is multiplied by 2 so that the initialization $c_{init}$ changes according to $n_{SCID2}$ independently of $n_{SCID}$, which is a one-bit quantity.

In another embodiment, UE1 is configured to receive UE-specifically scrambled UE-RS, and UE1 receives the RRC parameter RRC_SCID=$n_{SCID2}$. Then, UE1 receives the PDSCH with UE-RS scrambled by a scrambling sequence initialized with $c_{init}=(\lfloor n_s/2 \rfloor +1) \cdot (2N_{ID}^{cell}+1) \cdot 2^{16}+n_{SCID2}$.

Here, the legacy SC-ID $n_{SCID}$ is removed and $n_{SCID2}$ alone determines the scrambling initialization.

In another embodiment, UE1 is configured to receive UE-specifically scrambled UE-RS, and UE1 is instructed to generate the UE-RS scrambling initialization using the RRC parameter RRC_SCID, where RRC_SCID indicates a pair $(N_{v-ID}^{cell}, n_{SCID2})$. Then, UE1 receives PDSCH with UE-RS scrambled by a scrambling sequence initialized with $c_{init}=(\lfloor n_s/2 \rfloor +1) \cdot (2N_{v-ID}^{cell}+1) \cdot 2^{16}+n_{SCID2} \cdot 2+n_{SCID}$. Her $n_{SCID2}$ is multiplied by 2 so that the initialization $c_{init}$ changes according to $n_{SCID2}$ independently of $n_{SCID}$, which is a one-bit quantity.

In another embodiment, UE1 is configured to receive UE-specifically scrambled UE-RS, and UE1 is instructed to generate the UE-RS scrambling initialization using the RRC parameter RRC_SCID, where RRC_SCID indicates a pair $N_{v-ID}^{cell}, n_{SCID2})$. Then, UE1 receives the PDSCH with UE-RS scrambled by a scrambling sequence initialized with $c_{init}=(\lfloor n_s/2 \rfloor +1) \cdot (2N_{v-ID}^{cell}+1) \cdot 2^{16}+n_{SCID2}$.

In another embodiment, UE1 is configured to receive UE-specifically scrambled UE-RS, and UE1 is instructed to generate the UE-RS scrambling initialization using the RRC parameter RRC_SCID, where RRC_SCID indicates $N_{v-ID}^{cell}$. Then, UE1 receives the PDSCH with UE-RS scrambled by a scrambling sequence initialized with $c_{init}=(\lfloor n_s/2 \rfloor +1) \cdot (2N_{v-ID}^{cell}+1) \cdot 2^{16}+n_{SCID}$.

Dynamic Indication of UE-RS Scrambling Method in a DL/UL Grant DCI Format

To facilitate the downlink transmissions in the heterogeneous network illustrated in FIG. 10, the following method may be performed.

A dynamic PHY signaling is introduced in a DL grant DCI format, for indicating a UE-RS scrambling method. In one embodiment, a new N-bit information element (IE) (e.g., UE-RS scrambling method TB) is embedded in a DL grant DCI format (e.g., DCI format 2B/2C) for indicating a UE-RS scrambling method out of 2N candidate UE-RS scrambling methods. The two candidate UE-RS scrambling methods can be selected from Rel-10 compatible UE-RS scrambling, TP-specific UE-RS scrambling, and UE-specific UE-RS scrambling. By indicating the two states in the new one-bit IE, the network (or eNodeB) can flexibly schedule transmissions for an advanced UE (e.g., Rel-11 UE).

The network can dynamically change the MU-MIMO pairing of an advanced UE (e.g., Rel-11 UE), either with one from a first group of UEs or with one from a second group of UEs. The network can dynamically change transmission schemes between SU-MIMO and MU-MIMO for an advanced UE (e.g., Rel-11 UE). The network can dynamically change transmission schemes between single-TP operation and CoMP scheduling for an advanced UE (e.g., Rel-11 UE).

When TP-specific UE-RS scrambling is configured for a UE by the dynamic signaling, the UE-RS for the UE is scrambled TP-specifically. In one example, the UE-RS scrambling initialization $c_{init}$ is determined at least partly upon an RRC-configured TP ID. In another example, the UE-RS scrambling initialization $c_{init}$ is determined at least partly upon a CSI-RS configuration (resourceConfig, subframeConfig, antennaPortCount) configured by RRC signaling.

When UE-specific UE-RS scrambling is configured for a UE by the dynamic signaling, the UE-RS for the UE is scrambled UE-specifically. For example, the UE-RS scrambling initialization $c_{init}$ is determined at least partly by a new RRC parameter for UE-RS scrambling initialization configured to a UE.

It is noted that the UE-specific UE-RS scrambling assignment is more flexible than TP-specific UE-RS scrambling because the new RRC parameter for UE-RS scrambling initialization can be configured to generate a UE-RS scrambling initialization $c_{init}$ to be identical to the UE-RS scrambling initialization $c_{init}'$, which is determined depending on the TP-specific parameters, e.g., RRC configured TP ID or CSI-RS configuration. It is also noted that UE-specific scrambling requires more overhead, i.e., more RRC signaling than the TP-specific scrambling because TP-specific scrambling can be implemented with already available TP-specific parameters.

DL Grant DCI Format Construction Examples

A new DL grant DCI format can be constructed by extending an existing DL grant DCI format (e.g., DCI format 2B/2C) to include the newly introduced UE-RS scrambling method IE.

In one example, the new DL grant DCI format is constructed by adding N bits for the N-bit UE-RS scrambling IE to an existing DCI format. In another example, the new DL grant DCI format is constructed by re-interpreting (or replacing) the SC-ID bit and adding additional bits as necessary for the UE-RS scrambling method IE. In yet another example, the new DL grant DCI format is constructed by re-interpreting (or replacing) the SC-ID code points and adding additional bits as necessary for the UE-RS scrambling method IE. It should be evident to those of skill in the art that even when the SC-ID field is re-interpreted, $n_{SCID}$ values may still be determined according to the SC-ID code points. For example, in DCI format 2B, $n_{SCID}$ can be either 0 or 1, and is given by the scrambling identity field according to Table 6.10.3.1-1.

Figure 11:
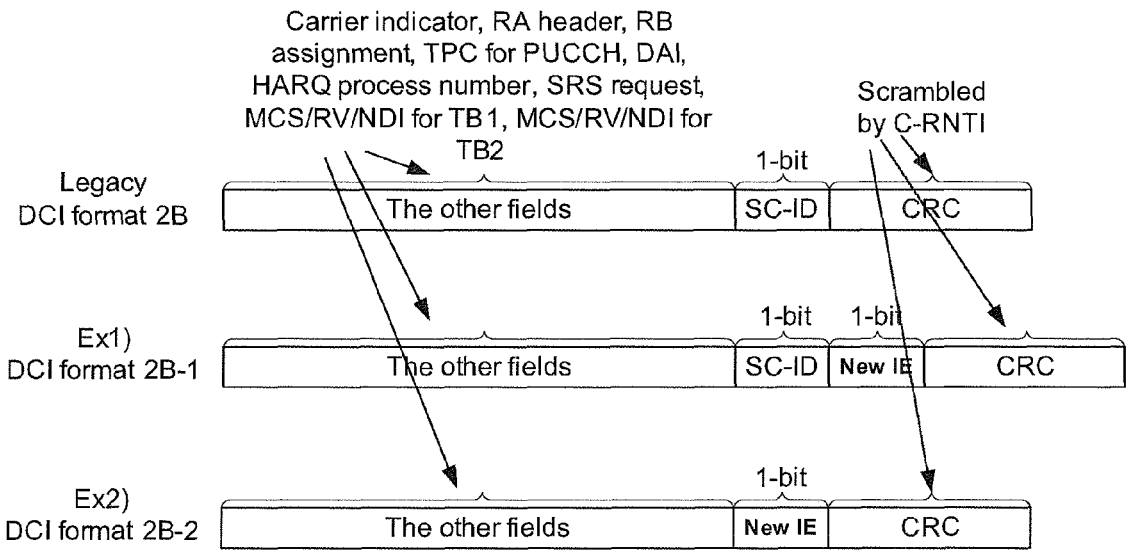
FIG. 11 illustrates a first downlink control information (DCI) format extended from DCI format 2B for dynamic indication of UE-RS scrambling, according to an embodiment of this disclosure.
Figure 12:
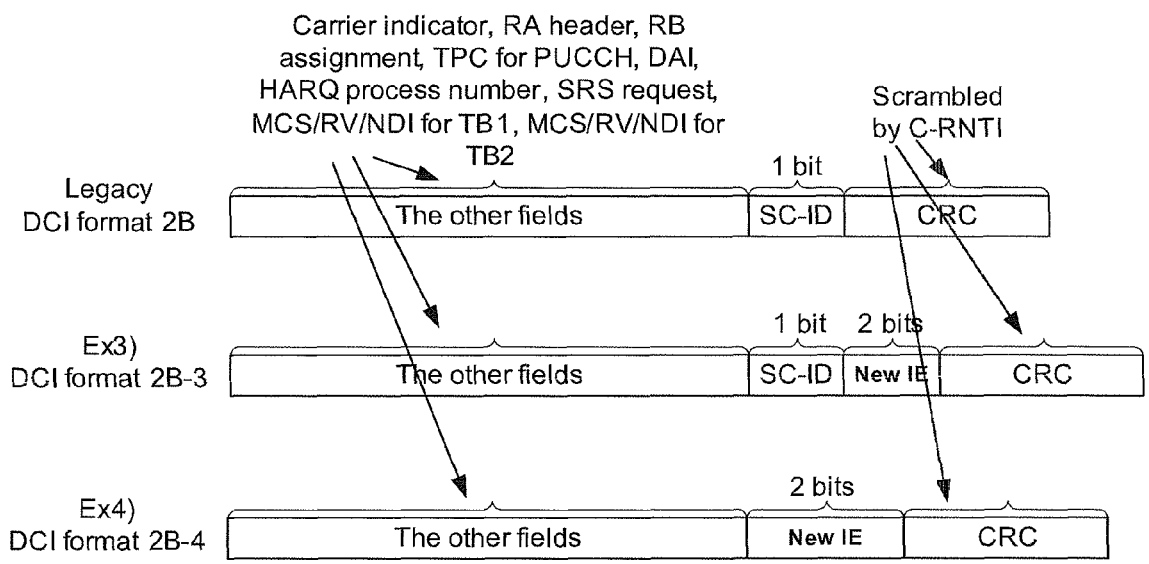
FIG. 12 illustrates a second DCI format extended from DCI format 2B for dynamic indication of UE-RS scrambling, according to an embodiment of this disclosure.

A number of example DCI format arrangements extending DCI format 2B, to embed the newly introduced UE-RS scrambling method IE are now explained, with reference to FIG. 11 and FIG. 12.

In one embodiment, a new one-bit information element (IE), UE-RS scrambling method IE, is embedded in a DL grant DCI format 2B for indicating a UE-RS scrambling method out of two candidate UE-RS scrambling methods. Two example methods for embedding the new one-bit IE in a new DL grant DCI format are described below.

In a first example method, the new DCI format (denoted by DCI format 2B-1 in FIG. 11) is defined by adding a bit to DCI format 2B, where the newly added bit is used for the UE-RS scrambling method IE indicating the UE-RS scrambling method. In a second example method, the new DCI format (denoted by DCI format 2B-2 in FIG. 11) is identical to a legacy DCI format (e.g., DCI format 2B), except for the interpretation of a one-bit field, e.g., SC-ID bit. In the new DCI format, the SC-ID bit is re-interpreted as (or replaced with) the UE-RS scrambling method IE indicating the UE-RS scrambling method.

In one embodiment, a new two-bit information element (IE), UE-RS scrambling method IE, is embedded in a DL grant DCI format 2B for indicating a UE-RS scrambling method out of four candidate UE-RS scrambling methods. Two example methods for embedding the new two-bit IE in a new DL grant DCI format are described below.

In a first example method, the new DCI format (denoted by DCI format 2B-3 in FIG. 12) is defined by adding two bits to DCI format 2B, where the newly added bits are used for the UE-RS scrambling method IE indicating the UE-RS scrambling method. In a second example method, the new DCI format (denoted by DCI format 2B-4 in FIG. 12) is identical to a legacy DCI format (e.g., DCI format 2B), except for the removal of a one-bit field, e.g., SC-ID bit. In the new DCI format, the SC-ID bit is re-interpreted as (or replaced with) the two-bit UE-RS scrambling method IE indicating the UE-RS scrambling method.

UE-RS Scrambling Method IE Examples

A number of example arrangements of the N-bit UE-RS scrambling method IE are explained with reference to Table 12, Table 13, Table 14, Table 15, Table 16 and Table 17 below.

In one embodiment, a new one-bit information element (IE), UE-RS scrambling method IE, defined in Table 12, is embedded in a DL grant DCI format (e.g., DCI format 2B/2C) for indicating a UE-RS scrambling method out of two candidate UE-RS scrambling methods: Rel-10 compatible (cell-specific) UE-RS scrambling and TP-specific UE-RS scrambling.

TABLE 12

Dynamic indication of UE-RS scrambling method (Example 1)

| UE-RS scrambling method IE | Meaning |
| --- | --- |
| 0 | Rel-10 compatible (cell specific) UE-RS scrambling |
| 1 | TP-specific UE-RS scrambling, e.g., according to an RRC-configured TP ID, or a CSI-RS configuration. |

There are a number of methods for implementing TP-specific UE-RS scrambling. For example, the scrambling initialization $c_{init}$ is at least partly determined by the RRC configured TP-ID. As another example, the scrambling initialization $c_{init}$ is at least partly determined by at least one of resourceConfig, subframeConfig and antennaPortCount in a CSI-RS configuration.

According to the one-bit UE-RS scrambling method IE defined as in Table 12, the network can perform downlink transmissions illustrated in FIG. 10 by setting the new one-bit IE as in the following scenarios.

In one scenario, both UE4 and UE5 are configured with the one-bit IE=1 in subframe n, i.e., TP-specific UE-RS scrambling. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. TP-specific UE-RS scrambling ensures that two UE-RS from RRH1 and RRH2 are not coherent combined at the receivers.

In another scenario, UE1 is configured with the one-bit IE=0 in subframe n, i.e., Rel-10 compatible UE-RS scrambling. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the one-bit IE=1 in subframe n, i.e., TP-specific UE-RS scrambling. UE2 and UE3 are associated with the macro. The two Rel-11 UEs's UE-RS can be orthogonally multiplexed for the MU-MIMO operation as long as the two UEs are associated with the same TP, which, in this case, is the macro.

In still another scenario, UE3 is configured with the one-bit IE=0 in subframe n+1, i.e., Rel-10 compatible UE-RS scrambling. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new one-bit information element (IE), UE-RS scrambling method IE, defined in Table 13, is embedded in a DL grant DCI format (e.g., DCI format 2B/2C)

for indicating a UE-RS scrambling method out of two candidate UE-RS scrambling methods: Rel-10 compatible (cell-specific) UE-RS scrambling and UE-specific UE-RS scrambling.

TABLE 13

Dynamic indication of UE-RS scrambling method (Example 2)

| 1-bit UE-RS scrambling method IE | Meaning |
| --- | --- |
| 0 | Rel-10 compatible (cell specific) UE-RS scrambling |
| 1 | UE-specific UE-RS scrambling, e.g., according to a new RRC configured parameter for the UE-RS scrambling initialization |

There are a number of methods for implementing UE-specific UE-RS scrambling. For example, the scrambling initialization $c_{init}$ is at least partly determined by a new RRC configured parameter for the UE-RS scrambling initialization.

According to the one-bit UE-RS scrambling method IE defined as in Table 13, the network can perform downlink transmissions illustrated in FIG. 10 by setting the new one-bit IE and configuring the new RRC parameters as in the following scenarios.

In one scenario, both UE4 and UE5 are configured with the one-bit IE=1 in subframe n, i.e., UE-specific UE-RS scrambling. The network assigns different RRC UE-RS scrambling initialization parameters for the UE4 and UE5 such that two UE-RS for UE4 and UE5 are not coherent combined at the receivers, or the two scrambling initialization parameters are not the same. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. UE-specific UE-RS scrambling ensures that two UE-RS from RRH1 and RRH2 are not coherent combined at the receivers.

In another scenario, UE1 is configured with the one-bit IE=0 in subframe n, i.e., Rel-10 compatible UE-RS scrambling. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the one-bit IE=1 in subframe n, i.e., UE-specific UE-RS scrambling. The network assigns the same RRC UE-RS scrambling initialization parameters for the UE2 and UE3 so that two UE-RS for UE2 and UE3 can be orthogonally multiplexed, or the two scrambling initialization parameters are the same. The two Rel-11 UEs's UE-RS can be orthogonally multiplexed for the MU-MIMO operation.

In still another scenario, UE3 is configured with the one-bit IE=0 in subframe n+1, i.e., Rel-10 compatible UE-RS scrambling. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new one-bit information element (IE), UE-RS scrambling method IE, defined in Table 14, is embedded in a DL grant DCI format (e.g., DCI format 2B/2C) for indicating a UE-RS scrambling method out of two candidate UE-RS scrambling methods: UE-specific UE-RS scrambling and TP-specific UE-RS scrambling.

TABLE 14

Dynamic indication of UE-RS scrambling method (Example 3)

| One-bit UE-RS scrambling method IE | Meaning |
| --- | --- |
| 0 | UE-specific UE-RS scrambling, e.g., according to a new RRC configuration parameter for the UE-RS scrambling initialization |
| 1 | TP-specific UE-RS scrambling, e.g., according to an RRC-configured TP ID, or a CSI-RS configuration. |

There are a number of methods for implementing TP-specific UE-RS scrambling. For example, the scrambling initialization $c_{init}$ is at least partly determined by the RRC configured TP-ID. As another example, the scrambling initialization $c_{init}$ is at least partly determined by at least one of resourceConfig, subframeConfig and antennaPortCount in a CSI-RS configuration.

There are a number of methods for implementing UE-specific UE-RS scrambling. For example, the scrambling initialization $c_{init}$ is at least partly determined by a new RRC configured parameter for the UE-RS scrambling initialization.

According to the one-bit UE-RS scrambling method IE defined as in Table 14, the network can perform downlink transmissions illustrated in FIG. 10 by setting the new one-bit IE and configuring the new RRC parameters as in the following scenarios.

In one scenario, both UE4 and UE5 are configured with the one-bit IE=1 in subframe n, i.e., TP-specific UE-RS scrambling. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. TP-specific UE-RS scrambling ensures that two UE-RS from RRH1 and RRH2 are not coherent combined at the receivers.

In another scenario, UE1 is configured with the one-bit IE=0 in subframe n, i.e., UE-specific UE-RS scrambling. The new RRC parameter for the UE-RS scrambling initialization is configured to generate the UE-specific UE-RS scrambling initialization identical to the Rel-10 UE-RS. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the one-bit IE=1 in subframe n, i.e., TP-specific UE-RS scrambling. The two Rel-11 UEs's UE-RS can be orthogonally multiplexed for the MU-MIMO operation as long as the two UEs are associated with the same TP, which, in this case, is the macro.

In still another scenario, UE3 is configured with the one-bit IE=0 in subframe n+1, i.e., UE-specific UE-RS scrambling. The new RRC parameter for the UE-RS scrambling initialization is configured to generate the UE-specific UE-RS scrambling initialization identical to the Rel-10 UE-RS. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new one-bit information element (IE), UE-RS scrambling method IE, defined in Table 15, is embedded in a DL grant DCI format (e.g., DCI format 2B/2C) for indicating a UE-RS scrambling method out of two candidate UE-RS scrambling methods: UE-specific UE-RS scrambling according to a first scrambling initialization, $c_{init,0}$, and UE-specific UE-RS scrambling according to a second scrambling initialization, $c_{init,1}$.

TABLE 15

Dynamic indication of UE-RS scrambling method (Example 4)

| One-bit UE-RS scrambling method IE | Meaning |
|---|---|
| 0 | UE-specific UE-RS scrambling with a first scrambling initialization, $c_{init,0}$ |
| 1 | UE-specific UE-RS scrambling with a second scrambling initialization, $c_{init,1}$ |

Here, $c_{init,0}$ is determined at least partly upon a first new RRC parameter for the UE-RS scrambling initialization, e.g., RRC_SCID0. Likewise, $c_{init,1}$ is determined at least partly upon a second new RRC configured parameter for the UE-RS scrambling initialization, e.g., RRC_SCID1.

According to the one-bit UE-RS scrambling method IE defined as in Table 15, the network can perform downlink transmissions illustrated in FIG. 10 by setting the new one-bit IE and configuring the new RRC parameters as in the following scenarios.

In one scenario, both UE4 and UE5 are configured with the one-bit IE=0 in subframe n, i.e., the first UE-specific UE-RS scrambling. The network assigns different RRC_SCID0's for UE4 and UE5 such that the two UE-RS for UE4 and UE5 are not coherent combined at the receivers, or the two scrambling initializations are not the same. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. UE-specific UE-RS scrambling ensures that two UE-RS from RRH1 and RRH2 are not coherent combined at the receivers.

In another scenario, UE1 is configured with the one-bit IE=1 in subframe n, i.e., the second UE-specific UE-RS scrambling. Here, RRC_SCID1 is configured such that it generates $c_{init,1}$ of UE1 identical to the Rel-10 UE-RS's. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the one-bit IE=0 in subframe n, i.e., the first UE-specific UE-RS scrambling. The network assigns the same RRC_SCID0's for UE2 and UE3 such that the two UE-RS for UE2 and UE3 can be made orthogonal. The two Rel-11 UEs's UE-RS can be orthogonally multiplexed for the MU-MIMO operation.

In still another scenario, UE3 is configured with the one-bit IE=1 in subframe n+1, i.e., the second UE-specific UE-RS scrambling. Here, RRC_SCID1 is configured such that it generates $c_{init,1}$ of UE3 identical to the Rel-10 UE-RS's. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new one-bit information element (IE), UE-RS scrambling method IE, defined in Table 16, is embedded in a DL grant DCI format (e.g., DCI format 2B/2C) for indicating a UE-RS scrambling method out of two candidate UE-RS scrambling methods: Rel-10 compatible (cell-specific) UE-RS scrambling with a fixed $n_{SCID}$ and TP-specific UE-RS scrambling. In one example, $n_{SCID}$ is fixed to be 0. In another example $n_{SCID}$ is fixed to be 1. Setting $n_{SCID}$ as a constant, one-bit signaling overhead can be saved. Accordingly, a new DL grant DCI format can be arranged by removing the SC-ID bit from DCI format 2B and replacing it by the UE-RS scrambling method IE, as in DCI format 2B-2 in FIG. 11 and DCI format 2B-4 in FIG. 12.

TABLE 16

Dynamic indication of UE-RS scrambling method (Example 5)

| One-bit UE-RS scrambling method IE | Meaning |
|---|---|
| 0 | Rel-10 compatible (cell specific) UE-RS scrambling with a fixed $n_{SCID}$ |
| 1 | TP-specific UE-RS scrambling, e.g., according to an RRC-configured TP ID, or a CSI-RS configuration. |

There are a number of methods for implementing TP-specific UE-RS scrambling. For example, the scrambling initialization $c_{init}$ is at least partly determined by the RRC configured TP-ID. As another example, the scrambling initialization $c_{init}$ is at least partly determined by at least one of resourceConfig, subframeConfig and antennaPortCount in a CSI-RS configuration.

According to the one-bit UE-RS scrambling method IE defined as in Table 16, the network can perform downlink transmissions illustrated in FIG. 10 by setting the new one-bit IE as in the following scenarios.

In one scenario, both UE4 and UE5 are configured with the one-bit IE=1 in subframe n, i.e., TP-specific UE-RS scrambling. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. TP-specific UE-RS scrambling ensures that two UE-RS from RRH1 and RRH2 are not coherent combined at the receivers.

In another scenario, UE1 is configured with the one-bit IE=0 in subframe n, i.e., Rel-10 compatible UE-RS scrambling. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the one-bit IE=1 in subframe n, i.e., TP-specific UE-RS scrambling. UE2 and UE3 are associated with the macro. The two Rel-11 UEs's UE-RS can be orthogonally multiplexed for the MU-MIMO operation as long as the two UEs are associated with the same TP, which, in this case, is the macro.

In still another scenario, UE3 is configured with the one-bit IE=0 in subframe n+1, i.e., Rel-10 compatible UE-RS scrambling. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new one-bit information element (IE), UE-RS scrambling method IE, defined in Table 17, is embedded in a DL grant DCI format (e.g., DCI format 2B/2C) for indicating a UE-RS scrambling method out of two candidate UE-RS scrambling methods: Rel-10 compatible (cell-specific) UE-RS scrambling with a fixed $n_{SCID}$ and UE-specific UE-RS scrambling. In one example, $n_{SCID}$ is fixed to be 0. In another example, $n_{SCID}$ is fixed to be 1. Setting $n_{SCID}$ as a constant, one-bit signaling overhead can be saved. Accordingly, a new DL grant DCI format can be arranged by removing the SC-ID bit from DCI format 2B and replacing it by the UE-RS scrambling method IE, as in DCI format 2B-2 in FIG. 11 and DCI format 2B-4 in FIG. 12.

TABLE 17

Dynamic indication of UE-RS scrambling method (Example 6)

| One-bit UE-RS scrambling method IE | Meaning |
| --- | --- |
| 0 | Rel-10 compatible (cell specific) UE-RS scrambling with a fixed $n_{SCID}$ |
| 1 | UE-specific UE-RS scrambling, e.g., according to a new RRC configuration parameter for the UE-RS scrambling initialization |

There are a number of methods for implementing UE-specific UE-RS scrambling. For example, the scrambling initialization $c_{init}$ is at least partly determined by a new RRC configured parameter for the UE-RS scrambling initialization.

According to the one-bit UE-RS scrambling method IE defined as in Table 17, the network can perform downlink transmissions illustrated in FIG. 10 by setting the new one-bit IE and configuring the new RRC parameters as in the following scenarios.

In one scenario, both UE4 and UE5 are configured with the one-bit IE=1 in subframe n, i.e., UE-specific UE-RS scrambling. The network assigns different RRC UE-RS scrambling initialization parameters for the UE4 and UE5 such that two UE-RS for UE4 and UE5 are not coherent combined at the receivers, or the two scrambling initialization parameters are not the same. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. UE-specific UE-RS scrambling ensures that two UE-RS from RRH1 and RRH2 are not coherent combined at the receivers.

In another scenario, UE1 is configured with the one-bit IE=0 in subframe n, i.e., Rel-10 compatible UE-RS scrambling. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the one-bit IE=1 in subframe n, i.e., UE-specific UE-RS scrambling. The network assigns the same RRC UE-RS scrambling initialization parameters for the UE2 and UE3 so that two UE-RS for UE2 and UE3 can be orthogonally multiplexed, or the two scrambling initialization parameters are the same. The two Rel-11 UEs's UE-RS can be orthogonally multiplexed for the MU-MIMO operation.

In still another scenario, UE3 is configured with the one-bit IE=0 in subframe n+1, i.e., Rel-10 compatible UE-RS scrambling. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new two-bit information element (IE), or UE-RS scrambling method IE defined in Table 18, is embedded in a DL grant DCI format (e.g., DCI format 2B/2C) for indicating a UE-RS scrambling method out of three candidate UE-RS scrambling methods: Rel-10 compatible (cell-specific) UE-RS scrambling, UE-specific UE-RS scrambling, and TP-specific UE-RS scrambling. Having one more state in the UE-RS scrambling method IE, the network can perform more flexible UE scheduling/pairing.

TABLE 18

Dynamic indication of UE-RS scrambling method (Example 7)

| Two-bit UE-RS scrambling method IE | Meaning |
| --- | --- |
| 0 | Rel-10 compatible (cell specific) UE-RS scrambling |
| 1 | UE-specific UE-RS scrambling, e.g., according to a new RRC configuration parameter for the UE-RS scrambling initialization |
| 2 | TP-specific UE-RS scrambling, e.g., according to an RRC-configured TP ID, or a CSI-RS configuration. |

There are a number of methods for implementing UE-specific UE-RS scrambling. For example, the scrambling initialization $c_{init}$ is at least partly determined by a new RRC configured parameter for the UE-RS scrambling initialization.

There are a number of methods for implementing TP-specific UE-RS scrambling. For example, the scrambling initialization $c_{init}$ is at least partly determined by the RRC configured TP-ID. As another example, the scrambling initialization $c_{init}$ is at least partly determined by at least one of resourceConfig, subframeConfig, and antennaPortCount in a CSI-RS configuration.

According to the two-bit UE-RS scrambling method IE defined as in Table 18, the network can perform downlink transmissions illustrated in FIG. 10 by setting the new two-bit IE and configuring the new RRC parameters as in the following scenarios.

In one scenario, both UE4 and UE5 are configured with the two-bit IE=2 in subframe n, i.e., TP-specific UE-RS scrambling. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. TP-specific UE-RS scrambling ensures that two UE-RS from RRH1 and RRH2 are not coherent combined at the receivers.

In another scenario, UE1 is configured with the two-bit IE=0 in subframe n, i.e., Rel-10 compatible UE-RS scrambling. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the two-bit IE=1 in subframe n, i.e., UE-specific UE-RS scrambling. The network assigns the same RRC UE-RS scrambling initialization parameters for the UE2 and UE3 so that two UE-RS for UE2 and UE3 can be orthogonally multiplexed, or the two scrambling initialization parameters are the same. The two Rel-11 UEs's UE-RS can be orthogonally multiplexed for the MU-MIMO operation.

In still another scenario, UE3 is configured with the two-bit IE=0 in subframe n+1, i.e., Rel-10 compatible UE-RS scrambling. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new two-bit information element (IE), UE-RS scrambling method IE, defined in Table 19, is embedded in a DL grant DCI format (e.g., DCI format 2B/2C) for indicating a UE-RS scrambling method out of three candidate UE-RS scrambling methods: Rel-10 compatible (cell-specific) UE-RS scrambling, UE-specific UE-RS scrambling, and TP-specific UE-RS scrambling. Having one more state in the UE-RS scrambling method IE, the network can perform more flexible UE scheduling/pairing. In one example, $n_{SCID}$ is fixed to be 0. In another example, $n_{SCID}$ is fixed to be 1. Setting $n_{SCID}$ as a constant, two-bit signaling overhead can be saved. Accordingly, a new DL grant DCI format can be arranged by removing the SC-ID bit from DCI format 2B and replacing it by the UE-RS scrambling method IE, as in DCI format 2B-2 in FIG. 11 and DCI format 2B-4 in FIG. 12.

TABLE 19

Dynamic indication of UE-RS scrambling method (Example 8)

| Two-bit UE-RS scrambling method IE | Meaning |
|---|---|
| 0 | Rel-10 compatible (cell specific) UE-RS scrambling with a fixed $n_{SCID}$ |
| 1 | UE-specific UE-RS scrambling, e.g., according to a new RRC configuration parameter for the UE-RS scrambling initialization |
| 2 | TP-specific UE-RS scrambling, e.g., according to an RRC-configured TP ID, or a CSI-RS configuration. |

There are a number of methods for implementing UE-specific UE-RS scrambling. For example, the scrambling initialization $c_{init}$ is at least partly determined by a new RRC configured parameter for the UE-RS scrambling initialization.

There are a number of methods for implementing TP-specific UE-RS scrambling. For example, the scrambling initialization $c_{init}$ is at least partly determined by the RRC configured TP-ID. As another example, the scrambling initialization $c_{init}$ is at least partly determined by at least one of resourceConfig, subframeConfig and antennaPortCount in a CSI-RS configuration.

According to the two-bit UE-RS scrambling method IE defined as in Table 19, the network can perform downlink transmissions illustrated in FIG. 10 by setting the new two-bit IE and configuring the new RRC parameters as in the following scenarios.

In one scenario, both UE4 and UE5 are configured with the two-bit IE=2 in subframe n, i.e., TP-specific UE-RS scrambling UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. TP-specific UE-RS scrambling ensures that two UE-RS from RRH1 and RRH2 are not coherent combined at the receivers.

In another scenario, UE1 is configured with the two-bit IE=0 in subframe n, i.e., Rel-10 compatible UE-RS scrambling. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the two-bit IE=1 in subframe n, i.e., UE-specific UE-RS scrambling. The network assigns the same RRC UE-RS scrambling initialization parameters for the UE2 and UE3 so that two UE-RS for UE2 and UE3 can be orthogonally multiplexed, or the two scrambling initialization parameters are the same. The two Rel-11 UEs's UE-RS can be orthogonally multiplexed for the MU-MIMO operation.

In still another scenario, UE3 is configured with the two-bit IE=0 in subframe n+1, i.e., Rel-10 compatible UE-RS scrambling. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new two-bit information element (IE), UE-RS scrambling method IE, defined in Table 20, is embedded in a DL grant DCI format (e.g., DCI format 2B/2C) for indicating a UE-RS scrambling method out of three candidate UE-RS scrambling methods: UE-specific UE-RS scrambling according to a first scrambling initialization, e.g., $c_{init,0}$, UE-specific UE-RS scrambling according to a second scrambling initialization, $c_{init,1}$, and UE-specific UE-RS scrambling according to a second scrambling initialization, $c_{init,2}$. Having one more state in the UE-RS scrambling method IE, the network can perform more flexible UE scheduling/pairing.

TABLE 20

Dynamic indication of UE-RS scrambling method (Example 9)

| Two-bit UE-RS scrambling method IE | Meaning |
|---|---|
| 0 | UE-specific UE-RS scrambling with a first scrambling initialization, $c_{init,0}$ |
| 1 | UE-specific UE-RS scrambling with a second scrambling initialization, $c_{init,1}$ |
| 2 | UE-specific UE-RS scrambling with a second scrambling initialization, $c_{init,2}$ |

Here, $c_{init,0}$ is determined at least partly upon a first new RRC configured parameter for the UE-RS scrambling initialization, e.g., RRC_SCID0. $c_{init,1}$ is determined at least partly upon a first new RRC configured parameter for the UE-RS scrambling initialization, e.g., RRC_SCID1. $c_{init,2}$ is determined at least partly upon a first new RRC configured parameter for the UE-RS scrambling initialization, e.g., RRC_SCID2.

According to the two-bit UE-RS scrambling method IE defined as in Table 20, the network can perform downlink transmissions illustrated in FIG. 10 by setting the new two-bit IF and configuring the new RRC parameters as in the following scenarios.

In one scenario, both UE4 and UE5 are configured with the two-bit IE=2 in subframe n, i.e., the first UE-specific UE-RS scrambling. The network assigns different RRC_SCID2's for UE4 and UE5 such that the two UE-RS for UE4 and UE5 are not coherent combined at the receivers, or the two scrambling initializations are not the same. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. UE-specific UE-RS scrambling ensures that two UE-RS from RRH1 and RRH2 are not coherent combined at the receivers.

In another scenario, UE1 is configured with the two-bit IF=1 in subframe n, i.e., the second UE-specific UE-RS scrambling. Here, RRC_SCID1 is configured such that it generates $c_{init,1}$ of UE1 identical to the Rel-10 UE-RS's. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the two-bit IE=0 in subframe n, i.e., the first UE-specific UE-RS scrambling. The network assigns the same RRC_SCID0's for UE2 and UE3 such that the two UE-RS for UE2 and UE3 can be made orthogonal. The two Rel-11 UEs's UE-RS can be orthogonally multiplexed for the MU-MIMO operation.

In still another scenario, UE3 is configured with the two-bit IE=1 in subframe n+1, i.e., the second UE-specific UE-RS scrambling. Here, RRC_SCID1 is configured such that it generates $c_{init,1}$ of UE3 identical to the Rel-10 UE-RS's. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new two-bit information element (IE), UE-RS scrambling method IF, defined in Table 21, is embedded in a DL grant DCI format (e.g., DCI format 2B/2C) for indicating a UE-RS scrambling method out of four candidate UE-RS scrambling methods: UE-specific UE-RS scrambling according to a first scrambling initialization, e.g., $c_{init,0}$; UE-specific UE-RS scrambling according to a second scrambling initialization, $c_{init,1}$; UE-specific UE-RS scrambling according to a second scrambling initialization, $c_{init,2}$; and UE-specific UE-RS scrambling according to a second scrambling initialization, $c_{init,3}$. Having two more states in the UE-RS scrambling method IE, the network can perform more flexible UE scheduling/pairing.

TABLE 21

Dynamic indication of UE-RS scrambling method (Example 10)

| Two-bit UE-RS scrambling method IE | Meaning |
|---|---|
| 0 | UE-specific UE-RS scrambling with a first scrambling initialization, $c_{init,0}$ |
| 1 | UE-specific UE-RS scrambling with a second scrambling initialization, $c_{init,1}$ |
| 2 | UE-specific UE-RS scrambling with a second scrambling initialization, $c_{init,2}$ |
| 3 | UE-specific UE-RS scrambling with a second scrambling initialization, $c_{init,3}$ |

Here, $c_{init,0}$ is determined at least partly upon a first new RRC configured parameter for the UE-RS scrambling initialization, e.g., RRC_SCID0. $c_{init,1}$ is determined at least partly upon a first new RRC configured parameter for the UE-RS scrambling initialization, e.g., RRC_SCID1. $c_{init,2}$ is determined at least partly upon a first new RRC configured parameter for the UE-RS scrambling initialization, e.g., RRC_SCID2. $c_{init,3}$ is determined at least partly upon a first new RRC configured parameter for the UE-RS scrambling initialization, e.g., RRC_SCID3.

According to the two-bit UE-RS scrambling method IE defined as in Table 21, the network can perform downlink transmissions illustrated in FIG. 10 by setting the new two-bit IE and configuring the new RRC parameters as in the following scenarios.

In one scenario, both UE4 and UE5 are configured with the two-bit IE=2 in subframe n, i.e., the first UE-specific UE-RS scrambling. The network assigns different RRC_SCID2's for UE4 and UE5 such that the two UE-RS for UE4 and UE5 are not coherent combined at the receivers, or the two scrambling initializations are not the same. UE4 is associated with RRH1, and UE5 is associated with RRH2. As UE4 is positioned close to RRH1 while UE5 is positioned close to RRH2 which is positioned far away from RRH1, the network can schedule the same PRBs for UE4 and UE5 in a subframe without a significant concern about the interference power. UE-specific UE-RS scrambling ensures that two UE-RS from RRH1 and RRH2 are not coherent combined at the receivers.

In another scenario, UE1 is configured with the two-bit IE=1 in subframe n, i.e., the second UE-specific UE-RS scrambling. Here, RRC_SCID1 is configured such that it generates $c_{init,1}$ of UE1 identical to the Rel-10 UE-RS's. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the two-bit IE=0 in subframe n, i.e., the first UE-specific UE-RS scrambling. The network assigns the same RRC_SCID0's for UE2 and UE3 such that the two UE-RS for UE2 and UE3 can be made orthogonal. The two Rel-11 UEs's UE-RS can be orthogonally multiplexed for the MU-MIMO operation.

In still scenario, UE3 is configured with the two-bit IE=3 in subframe n+1, i.e., the second UE-specific UE-RS scrambling. Here, RRC_SCID3 is configured such that it generates $c_{init,1}$ of UE3 identical to the Rel-10 UE-RS's. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new two-bit information element (IE), UE-RS scrambling method IE defined in Table 22, is embedded in a DL grant DCI format (e.g., DCI format 2B/2C) for indicating a UE-RS scrambling method out of four candidate UE-RS scrambling methods: Rel-10 compatible (cell-specific) UE-RS scrambling; TP-specific UE-RS scrambling; UE-specific UE-RS scrambling according to a first scrambling initialization, e.g., $c_{init,0}$; and UE-specific UE-RS scrambling according to a second scrambling initialization, $c_{init,1}$. In one example, $n_{SCID}$ is fixed to be 0. In another example $n_{SCID}$ is fixed to be 1. Setting $n_{SCID}$ as a constant, two-bit signaling overhead can be saved. Accordingly, a new DL grant DCI format can be arranged by removing the SC-ID bit from DCI format 2B and replacing it by the UE-RS scrambling method IE, as in DCI format 2B-2 in FIG. 11 and DCI format 2B-4 in FIG. 12.

TABLE 22

Dynamic indication of UE-RS scrambling method (Example 11)

| Two-bit UE-RS scrambling method IE | Meaning |
|---|---|
| 0 | Rel-10 compatible (cell specific) UE-RS scrambling with a fixed $n_{SCID}$ |
| 1 | TP-specific UE-RS scrambling, e.g., according to an RRC-configured TP ID, or a CSI-RS configuration. |
| 2 | UE-specific UE-RS scrambling with a first scrambling initialization, $c_{init,0}$ |
| 3 | UE-specific UE-RS scrambling with a second scrambling initialization, $c_{init,1}$ |

Here, $c_{init,0}$ is determined at least partly upon a first new RRC configured parameter for the UE-RS scrambling initialization, e.g., RRC_SCID0. $c_{init,1}$ is determined at least partly upon a first new RRC configured parameter for the UE-RS scrambling initialization, e.g., RRC_SCID1.

There are a number of methods for implementing TP-specific UE-RS scrambling. For example, the scrambling initialization $c_{init}$ is at least partly determined by the RRC configured TP-ID. In another example, the scrambling initialization $c_{init}$ is at least partly determined by at least one of resourceConfig, subframeConfig, and antennaPortCount in a CSI-RS configuration.

According to the two-bit UE-RS scrambling method IE defined as in Table 22, the network can perform downlink transmissions illustrated in FIG. 10 by setting the new two-bit IE and configuring the new RRC parameters as in the following scenarios.

In one scenario, both UE4 and UE5 are configured with the two-bit IE=2 in subframe n, i.e., TP-specific UE-RS scrambling. UE4 is associated with RRH1, and UE5 is associated with RRH2. As UE4 is positioned close to RRH1 while UE5 is positioned close to RRH2 (which is positioned far away from RRH1), the network can schedule the same PRBs for UE4 and UE5 in a subframe without a significant concern about the interference power. TP-specific UE-RS scrambling ensures that two UE-RS from RRH1 and RRH2 are not coherent combined at the receivers.

In another scenario, UE1 is configured with the two-bit IE=0 in subframe n, i.e., Rel-10 compatible UE-RS scrambling. Rel-11 UE1 and Rel-10 UE0 can be MU-MIMO multiplexed in the same PRBs and their UE-RS can be orthogonally multiplexed, without affecting Rel-10 UE0's demodulation performance.

In yet another scenario, both UE2 and UE3 are configured with the two-bit IE=1 in subframe n, i.e., UE-specific UE-RS scrambling. The network assigns the same RRC UE-RS scrambling initialization parameters for the UE2 and UE3 so that two UE-RS for UE2 and UE3 can be orthogonally multiplexed, or the two scrambling initialization parameters are the same. The two Rel-11 UEs's UE-RS can be orthogonally multiplexed for the MU-MIMO operation.

In still another scenario, UE3 is configured with the two-bit IE=0 in subframe n+1, i.e., Rel-10 compatible UE-RS scrambling. Rel-11 UE3 and Rel-10 UE0 can be MU-MIMO multiplexed in the same PRBs and their UE-RS can be orthogonally multiplexed, without affecting Rel-10 UE0's demodulation performance.

In another embodiment, a new two-bit information element (IE), UE-RS scrambling method IE, defined as in Table 23, is embedded in a DL grant DCI format (e.g., DCI format 2B/2C) for indicating a UE-RS scrambling method out of four candidate UE-RS scrambling methods.

TABLE 23

Dynamic indication of UE-RS scrambling method (Example 12)

| Two-bit UE-RS scrambling method IE | SC-ID2 | VCID |
|---|---|---|
| 0 | Generated according to RRC__SCID0, i.e., a first RRC signaled SCID2 | A first VC-ID |
| 1 | Generated according to RRC__SCID1, i.e., a second RRC signaled SCID2 | A first VC-ID |
| 2 | Generated according to RRC__SCID0, i.e., a first RRC signaled SCID2 | A second VC-ID |
| 3 | Generated according to RRC__SCID1, i.e., a second RRC signaled SCID2 | A second VC-ID |

For the signaling of the candidate VC-IDs, the candidate VC-IDs may be explicitly configured by an RRC signaling. Alternatively, the candidate VC-IDs may be the VC-IDs configured in the CSI-RS configurations. For example, the first VC-ID is the VC-ID in the first CSI-RS configuration, and the second VC-ID is the VC-ID in the second CSI-RS configuration.

In one example, the UE-RS scrambling initialization is performed according to the following equation with the indicated VC-ID and SCIID2:

$$c_{init}=(\lfloor n_s/2 \rfloor+1) \cdot (2N_{v\text{-}ID}^{cell}+1) \cdot 2^{16}+n_{SCID2}.$$

In one example of the dynamic signaling, SCID2 is indicated as in the same method as the scrambling identity is indicated in DCI format 2B and 2C. VC-ID is indicated by a newly added bit, as shown in Table 24.

TABLE 24

Code points for dynamic indication of UE-RS scrambling method

| SCID | One-bit VC-ID field | SC-ID2 | VCID |
|---|---|---|---|
| 0 | 0 | Generated according to RRC__SCID0, i.e., a first RRC signaled SCID2 | A first VC-ID |
| 1 | 0 | Generated according to RRC__SCID1, i.e., a second RRC signaled SCID2 | A first VC-ID |
| 0 | 1 | Generated according to RRC__SCID0, i.e., a first RRC signaled SCID2 | A second VC-ID |
| 1 | 1 | Generated according to RRC__SCID1, i.e., a second RRC signaled SCID2 | A second VC-ID |

Uplink PUCCH Resource Allocation

In some legacy systems (3GPP LTE Rel 8,9,10), a PUCCH resource carrying HARQ-ACK (PUCCH format 1a/1b) is dynamically configured to a UE when the UE's HARQ-ACK feedback is for a PDSCH dynamically scheduled by a PDCCH. In this situation, the PUCCH resource number $n_{PUCCH}^{(1)}$ for HARQ-ACK is determined by the following equation: $n_{PUCCH}^{(1)}=n_{CCE}+N_{PUCCH}^{(1)}$, where $N_{PUCCH}^{(1)}$ is RRC configured and $n_{CCE}$ is the smallest CCE number of the PDCCH. Using $n_{PUCCH}^{(1)}$, the UE determines CS and OCC for the PUCCH according to the mechanism described earlier. Furthermore, $n_{PUCCH}^{(1)}$ together with another higher-layer configured parameter $N_{RB}^{(2)}$ is used for determining the PRB index.

The physical resource blocks to be used for transmission of PUCCH in slot $n_s$ are given by:

$$n_{PRB} = \begin{cases} \lfloor \frac{m}{2} \rfloor & \text{if } (m+n_s \bmod 2) \bmod 2 = 0 \\ N_{RB}^{UL} - 1 - \lfloor \frac{m}{2} \rfloor & \text{if } (m+n_s \bmod 2) \bmod 2 = 1 \end{cases}$$

where the variable m depends on the PUCCH format. For formats 1, 1a and 1b, m is determined by:

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + & \text{otherwise} \\ N_{RB}^{(2)} + \left\lceil \frac{N_{cs}^{(1)}}{8} \right\rceil \end{cases}$$

$$c = \begin{cases} 3 & normal cyclic prefix \\ 2 & extended cyclic prefix \end{cases}$$

Some Rel-11 UEs can be configured to generate UE-specific or TP-specific UL RS base sequences (type-1 base sequences), while other Rel-11 UEs and legacy UEs can be configured to generate legacy (cell-specific) UL RS base sequences (type-0 base sequences) according to the 3GPP Rel-8/9/10 specifications (e.g., according to 3GPP TS 36.211/36.212/36.213 v8.x.x, v9.x.x., v10.x.x). To reduce interference between the two types of UEs and its adverse impact on the system performance, it would be beneficial to multiplex PUCCHs generated with only one type of base sequence in each PRB. FIG. 9 illustrates the concept.

As illustrated in FIG. 9, PRB#0 is used only by type 0 UEs' PUCCHs that transmit PUCCH according to the legacy (Rel-8) mechanism. However, PRB#1 and PRB#2 are used only by type 1 UEs' PUCCHs that transmit PUCCH generated with UE-specific or TP-specific base sequences. Herein, the PRBs used for mapping the PUCCHs generated with legacy UL RS base sequences are denoted as PUCCH PRBs, while the PRBs used for mapping the PUCCHs generated with the UE-specific or TP-specific base sequences are denoted as E-PUCCH PRBs.

In FIG. 9, the PUCCH PRBs are partitioned into two zones, wherein a first zone (zone 1) consists of PRB#0, and a second zone (zone 2) consists of PRB#1 and PRB#2. A PUCCH zone is defined by at least one of the following:

A set of PRBs;

A UL RS base sequence;

$\Delta_{shift}^{PUCCH}$;

$N_{cs}^{(1)}$.

In one example, zone 1 and zone 2 are defined according to Table 25 below.

TABLE 25

PUCCH zone partitioning example 1

| | Set of PRBs | A UL RS base sequence | $\Delta_{shift}^{PUCCH}$ | $N_{cs}^{(1)}$ |
|---|---|---|---|---|
| Zone 1 | PRB#0 | A first UE-specific (or a first TP-specific or Rel-10 compatible) | 2 | 2 |
| Zone 2 | PRB#1, PRB#2 | A second UE-specific (or a second TP-specific) | 1 | 0 |

In another example, zone 1 and zone 2 are defined according to Table 26 below, where a common set of values are assigned for $A_{shift}^{PUCCH}$ and $N_{cs}^{(1)}$ for the two zones.

TABLE 26

PUCCH zone partitioning example 2

| | Set of PRBs | A UL RS base sequence |
|---|---|---|
| Zone 1 | PRB#0 | A first UE-specific (or a first TP-specific or Rel-10 compatible) |
| Zone 2 | PRB#1, PRB#2 | A second UE-specific (or a second TP-specific) |

An eNodeB may configure a zone-specific UL power control (PC) for equalizing the received power at each RP, and to combat a near-far effect. For the zone-specific UL PC, the eNodeB configures at least one of the parameters used for the PUCCH UL PC zone-specifically, where the LTE-A PUCCH UL PC equation is as in the following:

$$P_{PUCCH}(i) = \min\left\{\begin{array}{c} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\}.$$

In one example, at least one of the values $P_{0\_PUCCH}, PL_c, \Delta_{F\_PUCCH}(F), \Delta_{TxD}(F'), g(i)$ is zone-specifically configured/updated/measured. For example, $P_{0\_PUCCH}, \Delta_{F\_PUCCH}(F), \Delta_{TxD}(F')$ can be zone-specifically RRC configured. $PL_c$ can be zone-specifically measured relying on cell-specific CRS or RP-specific CSI-RS. g(i) can be updated zone-specifically; e.g., one type of TPC command updates $P_{PUCCH}(i)$ of zone 1 by updating g(i) for zone 1, while another type of TPC command updates $P_{PUCCH}(i)$ of zone 2 by updating g(i) for zone 2.

When the zone-specific PC for N zones is configured for a UE, the UE keeps track of N PUCCH power control equations and associated parameters. For example, when a UE is configured with two PUCCH zones and a zone-specific PC for the two zones, the UE transmits PUCCH either with a first (zone-specific) PC or a second (zone-specific) PC method depending on the eNodeB instruction.

In addition, some Rel-11 UEs can be configured with a number of virtual cell IDs to generate UL RS sequences, e.g., by an RRC signaling indicating a candidate set of the virtual cell IDs. When such a Rel-11 UE is indicated to use a virtual cell ID $N_{v-ID}^{cell}$, the UE generates UL RS sequences according to the Rel-8 procedure, by replacing the cell ID with the virtual cell ID:

Sequence group number: $u = (f_{gh}(n_s) + f_{ss}) \mod 30$.

Sequence group hopping: The group-hopping pattern $f_{gh}(n_s)$ is the same for PUSCH and PUCCH and given by $$f_{gh}(n_s) = \begin{cases} 0 & \text{if group hopping is disabled} \\ \left(\sum_{i=0}^{7} c(8n_s + i) \cdot 2^i\right) \mod 30 & \text{if group hopping is enabled} \end{cases}$$

where the pseudo-random sequence c(i) is defined by section 7.2 of 3GPP TS 36.211. The pseudo-random sequence generator is initialized with $$c_{init} = \left\lfloor \frac{N_{v-ID}^{cell}}{30} \right\rfloor$$

at the beginning of each radio frame.

Sequence shift pattern: The sequence-shift pattern $f_{ss}$ definition differs between PUCCH and PUSCH. For PUCCH, the sequence-shift pattern $f_{ss}^{PUCCH}$ is given by $f_{ss}^{PUCCH} = N_{v-ID,PUCCH}^{cell} \mod 30$. In this case, $N_{v-ID,PUCCH}^{cell} = N_{v-ID}^{cell} \in \{0, 1, \ldots, 503\}$.

For PUSCH, the sequence-shift pattern $f_{ss}^{PUSCH}$ is given by $f_{ss}^{PUSCH} = (f_{ss}^{PUCCH} + \Delta_{ss}) \mod 30$, where $\Delta_{ss} \in \{0, 1, \ldots, 29\}$ is configured by higher layers.

In another example, for PUCCH, the sequence-shift pattern $f_{ss}^{PUCCH}$ is given by $f_{ss}^{PUCCH} = N_{v-ID,PUCCH}^{cell} \mod 30$, where $N_{v-ID,PUCCH}^{cell} \in \{0, 1, \ldots, 503\}$ is UE-specifically RRC configured. For PUSCH, the sequence-shift pattern $f_{ss}^{PUSCH}$ is given by $f_{ss}^{PUSCH} = N_{v-ID,PUSCH}^{cell} \mod 30$, where $N_{v-ID,PUSCH}^{cell} \in \{0, 1, \ldots, 509\}$ is UE-specifically RRC configured. For the sequence group hopping and the sequence hopping, $N_{v-ID}^{cell} = N_{v-ID,PUSCH}^{cell}$ will be used.

In another example, for PUSCH, the sequence-shift pattern $f_{ss}^{PUSCH}$ is given by $f_{ss}^{PUSCH}=(N_{v\text{-}ID\text{-}PUSCH}^{cell})\bmod 30$, where $N_{v\text{-}ID\text{-}PUSCH}^{cell}=N_{v\text{-}ID}^{cell} \in \{0, 1, \ldots, 509\}$. This is for aligning the PUSCH DM-RS sequence of a UE attached to cell 1 with the PUSCH DM-RS sequence assigned to cell 2. For example, when the physical cell ID and the cell-specific $\Delta_{ss}$ of cell 2 are PCI and D, to align the UE 1's PUSCH DM-RS sequence with the cell 2's, $N_{v\text{-}ID}^{cell}$ should be chosen as in the following way: $N_{v\text{-}ID}^{cell}=B\cdot 30+A$, where $$B = \left\lfloor \frac{PCI}{30} \right\rfloor$$

and $A=(PCI+D)\bmod 30$.

For PUCCH, the sequence-shift pattern $f_{ss}^{PUCCH}$ is given by $f_{ss}^{PUCCH}=(N_{v\text{-}ID\text{-}PUCCH}^{cell})\bmod 30$, where $N_{v\text{-}ID\text{-}PUCCH}^{cell}=N_{v\text{-}ID}^{cell}+\Delta_{ss}'$, or alternatively $N_{v\text{-}ID\text{-}PUCCH}^{cell}=N_{v\text{-}ID}^{cell}-\Delta_{ss}'$, where $\Delta_{ss}' \in \{0, 1, \ldots, 29\}$ is configured by higher layers. In one method, $\Delta_{ss}'$ is UE-specifically configured. In another method, $\Delta_{ss}'$ is the same as the cell-specifically configured $\Delta_{ss}$ value configured by the legacy equation. This is for aligning the PUCCH DM-RS sequence of a UE attached to cell 1 with the PUCCH DM-RS sequence assigned to cell 2. For example, when the physical cell ID and the cell-specific $\Delta_{ss}$ of cell 2 are PCI and D, and when $N_{v\text{-}ID}^{cell}$ is chosen as in the following way: $N_{v\text{-}ID}^{cell}=B\cdot 30+A$, where $$B = \left\lfloor \frac{PCI}{30} \right\rfloor$$

and $A=(PCI+D)\bmod 30$, then to align UE 1's PUCCH DM-RS sequence with the cell 2's, $\Delta_{ss}'$ can be chosen as to be the same as D (in case of $N_{v\text{-}ID\text{-}PUCCH}^{cell}=N_{v\text{-}ID}^{cell}-\Delta_{ss}'$) or 30−D (in case of $N_{v\text{-}ID\text{-}PUCCH}^{cell}=N_{v\text{-}ID}^{cell}+\Delta_{ss}'$).

For SRS, in the case of the first example, sequence group number u and sequence number v are generated according to the 3GPP LTE Rel-8/9/10 procedure with replacing physical cell ID with $N_{v\text{-}ID\text{-}PUCCH}^{cell}$. In the case of the later two examples, sequence group number u is generated with $f_{ss}^{PUCCH}$ defined here and sequence group hopping $f_{gh}(n_s)$ generated by replacing the cell ID with $N_{v\text{-}ID\text{-}PUCCH}^{cell}$ in the 3GPP LTE Rel-8/9/10 sequence group hopping initialization equation. The base sequence number v is generated by replacing the cell ID with $N_{v\text{-}ID\text{-}PUSCH}^{cell}$ in the 3GPP LTE Rel-8/9/10 base sequence hopping initialization equation.

Sequence hopping: For reference-signals of length $M_{sc}^{RS}<6N_{sc}^{RB}$, the base sequence number v within the base sequence group is given by v=0. For reference-signals of length $M_{sc}^{RS}\geq 6N_{sc}^{RB}$, the base sequence number v within the base sequence group in slot $n_s$ is defined by $$v = \begin{cases} c(n_s) & \text{if group hopping is disabled and} \\ & \text{sequence hopping is enabled} \\ 0 & \text{otherwise} \end{cases}$$

where the pseudo-random sequence c(i) is given by section 7.2 of 3GPP TS 36.211. The pseudo-random sequence generator is initialized with $$c_{init} = \left\lfloor \frac{N_{v\text{-}ID}^{cell}}{30} \right\rfloor \cdot 2^5 + f_{ss}^{PUSCH}$$

at the beginning of each radio frame.

RS base sequence ($\bar{r}_{u,v}(n)$) generation for DM-RS: According to Rel-8 method, with the values of u and v calculated according to the above.

In another embodiment, UE1 in FIG. 8 or FIG. 10 is configured with CSI-RS configuration 1 and configured to receive a UE-specifically or TP-specifically scrambled DL UE-RS. Then, UE1 determines a PUCCH format 1a/1b resource and generates its base sequence differently depending on the DL UE-RS scrambling method, i.e., whether Rel-10 compatible or UE-specific/TP-specific UE-RS scrambling is used for the PDSCH associated with the HARQ-ACK feedback.

In one example, UE1 generates an UL RS base sequence for a PUCCH format 1a/1b and maps the PUCCH format 1a/1b in the time-frequency resources as shown in Table 27.

TABLE 27

Base RS sequence Generation depending on DL RS scrambling method

| DL UE-RS scrambling method | UL RS Base sequence generation method | PUCCH format 1a/1b resource mapping |
|---|---|---|
| Rel-10 compatible (i.e. cell-specific) | Rel-8 compatible (i.e., cell-specific) | According to the legacy (Rel-8) equations, mapped to a PUCCH PRB |
| UE-specific or TP-specific | UE-specific or TP-specific | According to the new equations derived with the new RRC parameters, mapped to the an E-PUCCH PRB |

Generalizing the example in Table 27, UE1 generates a UL RS base sequence for a PUCCH format 1a/1b and maps the PUCCH format 1a/1b in the time-frequency resources depending on the DL RS scrambling method, as shown in Table 28 and Table 29.

TABLE 28

Base RS sequence Generation depending on DL RS scrambling method

| DL UE-RS scrambling method | UL RS Base sequence generation method | PUCCH format 1a/1b resource mapping |
|---|---|---|
| A first UE-specific (or TP-specific) | A first UE-specific (or TP-specific) | Mapped to a first set of PUCCH PRBs (e.g., PRB#0 in FIG. 9) |
| A second UE-specific (or TP-specific) | A second UE-specific (or TP-specific) | Mapped to a second set of PUCCH PRBs (e.g., PRB#1, #2 in FIG. 9) |

In Table 29, UE1 determines the PUCCH zone depending on the DL RS scrambling method, as shown in Table 28. Some examples for the PUCCH zone partitioning can be found in Table 25 and Table 26.

TABLE 29

| PUCCH Zone assignment depending on DL RS scrambling method | |
|---|---|
| DL UE-RS scrambling method | PUCCH Zone |
| A first UE-specific (or TP-specific) | A first zone |
| A second UE-specific (or TP-specific) | A second zone |

In one embodiment, a PUCCH zone for a PUCCH transmission is indicated by a corresponding DL grant DCI format. Some example code points to indicate a PUCCH zone are now described.

In a first example, a new field is appended to a DL grant DCI format to explicitly indicate a PUCCH zone for ACK/NACK transmission. For example, to indicate one zone out of two candidate zones, a new one-bit field is appended to a DL grant DCI format. One example is illustrated in Table 30 below.

TABLE 30

| PUCCH Zone assignment depending on SCID | |
|---|---|
| A new one-bit field | PUCCH Zone |
| 0 | A first zone |
| 1 | A second zone |

In a second example, the PUCCH zone is implicitly indicated by the scrambling ID value (e.g., SCID in DCI format 2B and 2C in Rel-10). One example indication method is illustrated in the Table 31, when there are two candidate values for the SCID. A table similar to Table 31 can be used when there are four candidate values.

TABLE 31

| PUCCH Zone assignment depending on SCID | |
|---|---|
| Scrambling ID (SCID) value | PUCCH Zone |
| A first value (e.g., 0) | A first zone |
| A second value (e.g., 1) | A second zone |

In a third example, the PUCCH zone is implicitly indicated by the VC-ID value, or TP-ID. One example indication method is illustrated in Table 32, when there are two candidate values for the VC-ID or TP-ID. A table similar to Table 32 can be used when there are four candidate values.

TABLE 32

| PUCCH Zone assignment depending on VC-ID or TP-ID | |
|---|---|
| VC-ID or TP-ID | PUCCH Zone |
| A first ID | A first zone |
| A second ID | A second zone |

In a fourth example, the PUCCH zone is implicitly indicated by the location of the DL grant, i.e., depending on whether the DL grant is transmitted on PDCCH or ePDCCH. One example method is illustrated in Table 33 below.

TABLE 33

| PUCCH PC method depending on DL grant location | |
|---|---|
| DL grant location | PUCCH Zone |
| PDCCH | A first zone |
| ePDCCH | A second zone |

In another embodiment, a PUCCH power control method for a PUCCH transmission is indicated by a corresponding DL grant DCI format. Some example code points to indicate a PUCCH power control method are now described.

In a first example, a new field is appended to a DL grant DCI format to explicitly indicate a PUCCH power control method for ACK/NACK transmission. For example, to indicate one zone out of two candidate zones, a new one-bit field is appended to a DL grant DCI format. One example is illustrated in Table 34 below.

TABLE 34

| PUCCH PC method depending on SCID | |
|---|---|
| A new one-bit field | PUCCH power control method |
| 0 | A first PC method |
| 1 | A second PC method |

In a second example, the PUCCH PC method is implicitly indicated by the scrambling ID value (e.g., SCID in DCI format 2B and 2C in Rel-10). One example indication method is illustrated in Table 35 below, when there are two candidate values for the SCID. A table similar to Table 35 can be used when there are four candidate values.

TABLE 35

| PUCCH PC method depending on SCID | |
|---|---|
| Scrambling ID (SCID) value | PUCCH power control method |
| A first value (e.g., 0) | A first PC method |
| A second value (e.g., 1) | A second PC method |

In a third example, the PUCCH PC method is implicitly indicated by the VC-ID value, or TP-ID. One example indication method is illustrated in Table 36, when there are two candidate values for the VC-ID or TP-ID. A table similar to Table 36 can be used when there are four candidate values.

TABLE 36

| PUCCH PC method depending on VC-ID or TP-ID | |
|---|---|
| VC-ID or TP-ID | PUCCH power control method |
| A first ID | A first PC method |
| A second ID | A second PC method |

In a fourth example, the PUCCH PC method is implicitly indicated by the location of the DL grant, i.e., depending on whether the DL grant is transmitted on PDCCH or ePDCCH. One example method is illustrated in Table 37 below.

TABLE 37

| | |
|---|---|
| PUCCH PC method depending on DL grant location | |
| DL grant location | PUCCH power control method |
| PDCCH | A first PC method |
| ePDCCH | A second PC method |

In some embodiments, a PUCCH PC method and a PUCCH zone for A/N PUCCH are jointly indicated by an IE in the DL grant DCI format. Some examples of the joint indication are illustrated in Table 38, Table 39, Table 40, and Table 41 below.

TABLE 38

| | | |
|---|---|---|
| PUCCH Zone and PC method assignment depending on SCID | | |
| A new one-bit field | PUCCH Zone | PUCCH power control method |
| 0 | A first zone | A first PC method |
| 1 | A second zone | A second PC method |

TABLE 39

| | | |
|---|---|---|
| PUCCH Zone and PC method assignment depending on SCID | | |
| Scrambling ID (SCID) value | PUCCH Zone | PUCCH power control method |
| A first value (e.g., 0) | A first zone | A first PC method |
| A second value (e.g., 1) | A second zone | A second PC method |

TABLE 40

| | | |
|---|---|---|
| PUCCH Zone and PC method assignment depending on VC-ID or TP-ID | | |
| VC-ID or TP-ID | PUCCH Zone | PUCCH power control method |
| A first ID | A first zone | A first PC method |
| A second ID | A second zone | A second PC method |

TABLE 41

| | | |
|---|---|---|
| PUCCH Zone and PC method assignment depending on DL grant location | | |
| DL grant location | PUCCH Zone | PUCCH power control method |
| PDCCH | A first zone | A first PC method |
| ePDCCH | A second zone | A second PC method |

In one embodiment, UE1 in FIG. 8 or FIG. 10 is configured to generate TP-specific or UE-specific UL RS sequences and is configured with CSI-RS configuration 1. Then, $n_{PUCCH}^{(1)}$ of UE 1's HARQ-ACK corresponding to a PDSCH scheduled by a PDCCH is determined by $n_{PUCCH}^{(1)} = n_{CCE} + n_{PUCCH,1}^{(1)}$, and the variable m determining the PRB on which the HARQ-ACK is transmitted is $$m = \begin{cases} N_{RB,1}^{(2)} & \text{if } n_{PUCCH}^{(1)} < c \cdot N_{cs}^{(1)} / \Delta_{shift}^{PUCCH} \\ \left\lfloor \dfrac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + \\ N_{RB,1}^{(2)} + \left\lceil \dfrac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases},$$

where both $N_{PUCCH,1}^{(1)}$ and $N_{RB,1}^{(2)}$ are RRC configured separately from legacy offsets $N_{PUCCH}^{(1)}$ and $N_{RB}^{(2)}$. In some embodiments, $\Delta_{shift}^{PUCCH}$ and $N_{cs}^{(1)}$ can also be separately RRC configured from the legacy values. In one example, $N_{PUCCH,1}^{(1)}$ and $N_{RB,1}^{(2)}$ are configured in the RRC layer. In another example, at least one of $N_{PUCCH,1}^{(1)}$ and $N_{RB,1}^{(2)}$ are determined at least partly upon at least one of RC1, SC1, APC1, and X of CSI-RS configuration 1.

In another embodiment, UE1 in FIG. 8 or FIG. 10 is configured to generate TP-specific or UE-specific UL RS sequences and is configured with CSI-RS configuration 1. Then, $n_{PUCCH}^{(1)}$ of UE 1's HARQ-ACK corresponding to a PDSCH scheduled by a PDCCH is determined by $n_{PUCCH}^{(1)} = n_{CCE} + N_{PUCCH}^{(1)} + N_{PUCCH,offset}^{(1)}$, and the variable m determining the PRB on which the HARQ-ACK is transmitted is determined by $$m = \begin{cases} N_{RB}^{(2)} + N_{RB,offset}^{(2)} & \text{if } n_{PUCCH}^{(1)} < c \cdot N_{cs}^{(1)} / \Delta_{shift}^{PUCCH} \\ \left\lfloor \dfrac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + \\ N_{RB,1}^{(2)} + N_{RB,offset}^{(2)} + \left\lceil \dfrac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

where both $N_{PUCCH,offset}^{(1)}$ and $N_{RB,offset}^{(2)}$ are RRC configured separately from legacy offsets $N_{PUCCH}^{(1)}$ and $N_{RB}^{(2)}$. In one example, $N_{PUCCH,offset}^{(1)}$ and $N_{RB,offset}^{(2)}$ are configured in the RRC layer. In another example, at least one of $N_{PUCCH,1}^{(1)}$ and $N_{RB,1}^{(2)}$ are determined at least partly upon at least one of RC1, SC1, APC1 and X of CSI-RS configuration 1.

In some embodiments, UE1 in FIG. 8 or FIG. 10 is configured to generate TP-specific or UE-specific UL RS sequences and is configured with CSI-RS configuration 1. Then, $n_{PUCCH}^{(1)}$ of UE 1's HARQ-ACK corresponding to a PDSCH scheduled by a PDCCH is determined by a combination of semi-static RRC signaling and dynamic PDCCH signaling. The network semi-statically configures a set of N candidates for $n_{PUCCH}^{(1)}$ by RRC, and it dynamically indicates one $n_{PUCCH}^{(1)}$ out of the N candidates by PDCCH signaling.

In one example, the number of the candidates N=4, and thus a two-bit information element (IE) is included in the PDCCH, e.g., corresponding to the DL grant. In this case, 4 candidate $n_{PUCCH}^{(1)}$ values are configured by RRC, and depending on the value of IE, $n_{PUCCH}^{(1)}$ is determined as shown in Table 42 below. In one example, the IE is included in the DL grant as an explicit 2-bit field. In another example, the IE is implicitly indicated by at least one of those values to indicate DL UE-RS scrambling in the DL grant. The values to indicate DL UE-RS include SCID, SCID2, VC-ID, TP-ID, and the like.

TABLE 42

Dynamic indication of $n_{PUCCH}^{(1)}$ example 1

| The two-bit IE indicating $n_{PUCCH}^{(1)}$ | Indicated $n_{PUCCH}^{(1)}$ value |
|---|---|
| 00 | The first $n_{PUCCH}^{(1)}$ value configured by RRC |
| 01 | The second $n_{PUCCH}^{(1)}$ value configured by RRC |
| 10 | The third $n_{PUCCH}^{(1)}$ value configured by RRC |
| 11 | The fourth $n_{PUCCH}^{(1)}$ value configured by RRC |

In another example, the number of the candidates N=2, and thus a one-bit information element (IE) is included in the PDCCH, e.g., corresponding to the DL grant. In this case, 2 candidate $n_{PUCCH}^{(1)}$ values are configured by RRC, IE, and depending on the value of IE, $n_{PUCCH}^{(1)}$ is determined as shown in Table 43 below. In one example, the IE is included in a DL grant as an explicit 1-bit field. In another example, the IE is implicitly indicated by at least one of those values to indicate DL UE-RS scrambling in the DL grant. The values to indicate DL UE-RS include SCID, SCID2, VC-ID, TP-ID and the like.

TABLE 43

Dynamic indication of $n_{PUCCH}^{(1)}$ example 2

| The one-bit IE indicating $n_{PUCCH}^{(1)}$ | Indicated $n_{PUCCH}^{(1)}$ value |
|---|---|
| 0 | The first $n_{PUCCH}^{(1)}$ value configured by RRC |
| 1 | The second $n_{PUCCH}^{(1)}$ value configured by RRC |

The base sequence generation method for the PUCCH ACK/NACK may depend on the indicated $n_{PUCCH}^{(1)}$ value. For example, when $n_{PUCCH}^{(1)}$ is in the first range (e.g., corresponding to a first set of PUCCH PRBs or corresponding to a first PUCCH zone), the UE generates a PUCCH ACK/NACK using a first base sequence generation method. When $n_{PUCCH}^{(1)}$ is in the second range (e.g., corresponding to a second set of PUCCH PRBs or corresponding to a second PUCCH zone), the UE generates the PUCCH ACK/NACK using a second base sequence generation method.

TABLE 44

Base RS sequence Generation depending on $n_{PUCCH}^{(1)}$ value

| Indicated $n_{PUCCH}^{(1)}$ value | UL RS Base sequence generation method |
|---|---|
| In a first region (e.g., corresponding to PUCCH PRBs #0 in FIG. 9) | A first UE-specific (or TP-specific, or R10 compatible) |
| In a second region (e.g., corresponding to PUCCH PRBs #1 and #2 in FIG. 9) | A second UE-specific (or TP-specific) |

In some embodiments, both the UL PC method and the UL RS base sequence generation method are jointly indicated by the $n_{PUCCH}^{(1)}$ value, as shown in Table 45 below.

TABLE 45

Base RS sequence Generation and PUCCH UL PC depending on $n_{PUCCH}^{(1)}$ value

| Indicated $n_{PUCCH}^{(1)}$ value | UL RS Base sequence generation method | PUCCH power control method |
|---|---|---|
| In a first region (e.g., corresponding to PUCCH PRBs #0 in | A first UE-specific (or TP-specific, or R10 compatible) | A first PC method |

TABLE 45-continued

Base RS sequence Generation and PUCCH UL PC depending on $n_{PUCCH}^{(1)}$ value

| Indicated $n_{PUCCH}^{(1)}$ value | UL RS Base sequence generation method | PUCCH power control method |
|---|---|---|
| FIG. 9) | | |
| In a second region (e.g., corresponding to PUCCH PRBs #1 and #2 in FIG. 9) | A second UE-specific (or TP-specific) | A second PC method |

In another embodiment, UE2 in FIG. 8 or FIG. 10 is configured with CSI-RS configurations 1 and 2. Then, UE2 determines a PUCCH format 1a/1b resource and generates its base sequence differently depending on at least one of the one-bit VCID field and the SC-ID value indicated in the DL grant DCI format scheduling the PDSCH associated with the HARQ-ACK feedback.

To determine $n_{PUCCH}^{(1)}$ of UE2's HARQ-ACK corresponding to a PDSCH scheduled by a PDCCH or an ePDCCH, the two following alternatives are available:

$n_{PUCCH}^{(1)} = n_{CCE} + N_{PUCCH}^{(1)}$.

$n_{PUCCH}^{(1)} = n_{CCE} + n_{offset} + N_{PUCCH}^{(1)}$, where $n_{offset}$ is selected among a number of predetermined candidate values. The candidate values can be RRC configured. Here, $N_{PUCCH}^{(1)}$ can be the cell-specifically configured value according to the LTE Rel-8, 9, 10 specification, or a separately RRC configured UE-specific value. $n_{offset}$ can be indicated by a code point in the DCI format carrying the PDCCH or the ePDCCH. Note that one candidate value of $n_{offset}$ can be hard-coded to be 0.

Depending on whether UE 2 is configured with cell-specific R10 compatible base sequence generation or UE-specific (or TP-specific) base sequence generation (where the 11 configuration can be performed by an RRC signaling), the UE is indicated to use different $n_{PUCCH}^{(1)}$ mapping methods. In one example, when R10 base sequence generation is configured, $n_{PUCCH}^{(1)} = n_{CCE} + N_{PUCCH}^{(1)}$ is used. When the UE-specific (or TP-specific) base sequence generation is configured, $n_{PUCCH}^{(1)} = n_{CCE} + n_{offset} + N_{PUCCH}^{(1)}$. In another example, when R10 base sequence generation is configured, $n_{PUCCH}^{(1)} = n_{CCE} + N_{PUCCH}^{(1)}$ is used, where $N_{PUCCH}^{(1)}$ is the cell-specifically configured value. When the UE-specific (or TP-specific) base sequence generation is configured, $n_{PUCCH}^{(1)} = n_{CCE} + N_{PUCCH-UE}^{(1)}$ where $n_{PUCCH-UE}^{(1)}$ is UE-specifically configured separately from the cell specifically configured value $N_{PUCCH}^{(1)}$.

In one example, UE2 maps the PUCCH format 1a/1b in the time-frequency resources according to the SC-ID as shown in Table 46. In Table 46, the value of SC-ID determines $n_{offset}$.

TABLE 46

Base RS sequence generation example

| SC-ID indicated in the DL grant | PUCCH format 1a/1b resource mapping |
|---|---|
| 0 | According to a first $n_{offset}$,1 |
| 1 | According to a second $n_{offset}$,2 |

In another example, UE2 maps the PUCCH format 1a/1b in the time-frequency resources according to an explicit bit included in a DL DCI format, e.g., DCI format 1A, 2, 2A, 2B, 2C, etc., where the explicit bit determines $n_{offset}$.

For the variable m, which determines the PRB on which the HARQ-ACK is transmitted, two alternatives are now described.

In the first alternative, m is determined by adding an offset $N_{RB,offset}^{(2)}$ to $N_{RB}^{(2)}$ as in the following:

$$m = \begin{cases} N_{RB}^{(2)} + N_{RB,offset}^{(2)} & \text{if } n_{PUCCH}^{(1)} < c \cdot N_{cs}^{(1)}/\Delta_{shift}^{PUCCH} \\ \left\lfloor \dfrac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB,1}^{(2)} + N_{RB,offset}^{(2)} + \left\lceil \dfrac{N_{cs}^{(1)}}{8} \right\rceil & \end{cases}$$

$$c = \begin{cases} 3 & \text{normal cyclic prefix} \\ 2 & \text{extended cyclic prefix} \end{cases}$$

where $N_{RB,offset}^{(2)}$ is dynamically indicated among a number of candidate values. The candidate offset values can be RRC configured.

In one example, UE2 generates UL RS base sequence for a PUCCH format 1a/1b and maps the PUCCH format 1a/1b in the time-frequency resources according to the one-bit VCID field in the downlink DCI format (DL grant) as shown in Table 47.

TABLE 47

Base RS sequence generation example

| VCID value indicated in the downlink DCI format (DL grant) | Base sequence generation method | PUCCH format 1a/1b resource mapping |
|---|---|---|
| 0 | According to a first virtual cell ID | According to a first PRB offset $N_{RB,offset1}^{(2)}$ (or a first $N_{PUCCH}^{(1)}$) |
| 1 | According to a second virtual cell ID | According to a second PRB offset $N_{RB,offset2}^{(2)}$ (or a second $N_{PUCCH}^{(1)}$) |

In another example, UE2 generates an UL RS base sequence for a PUCCH format 1a/1b and maps the PUCCH format 1a/1b in the time-frequency resources according to both the SC-ID and the one-bit VCID field in the DL grant, as shown in Table 48. In the table, the value of the VCID field determines $N_{RB,offset}^{(2)}$ while the value of SC-ID determines $n_{offset}$.

TABLE 48

Base RS sequence generation example

| SC-ID indicated in the DL grant | One-bit VCID field in the DL grant | Base sequence generation method | PUCCH format 1a/1b resource mapping |
|---|---|---|---|
| 0 | 0 | According to a first virtual cell ID | According to a first PRB offset $N_{RB,offset1}^{(2)}$ (or a first $N_{PUCCH}^{(1)}$) and a first $n_{offset,1}$ |
| 0 | 1 | According to a second virtual cell ID | According to a second PRB offset $N_{RB,offset2}^{(2)}$ (or a second $N_{PUCCH}^{(1)}$) and a first $n_{offset,1}$ |
| 1 | 0 | According to a first virtual cell ID | According to a first PRB offset $N_{RB,offset1}^{(2)}$ (or a first $N_{PUCCH}^{(1)}$) and a second $n_{offset,2}$ |
| 1 | 1 | According to a second virtual cell ID | According to a second PRB offset $N_{RB,offset2}^{(2)}$ (or a second $N_{PUCCH}^{(1)}$) and a second $n_{offset,2}$ |

In the second alternative, m is determined by $N_{RB,new}^{(2)}$ dynamically indicated) among a number of candidate values of $N_{RB,new}^{(2)}$ as in the following:

$$m = \begin{cases} N_{RB,new}^{(2)} & \text{if } n_{PUCCH}^{(1)} < c \cdot N_{cs}^{(1)}/\Delta_{shift}^{PUCCH} \\ \left\lfloor \dfrac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB,1}^{(2)} + N_{RB,offset}^{(2)} + \left\lceil \dfrac{N_{cs}^{(1)}}{8} \right\rceil & \end{cases}$$

$$c = \begin{cases} 3 & \text{normal cyclic prefix} \\ 2 & \text{extended cyclic prefix} \end{cases}$$

The candidate values of $N_{RB,new}^{(2)}$ can be RRC configured.

In one example, UE2 generates an UL RS base sequence for a PUCCH format 1a/1b and maps the PUCCH format 1a/1b in the time-frequency resources according to the one-bit VCID field in the downlink DCI format (DL grant), as shown in Table 49.

TABLE 49

Base RS sequence generation example

| One-bit VCID field in the downlink DCI format (DL grant) | Base sequence generation method | PUCCH format 1a/1b resource mapping |
|---|---|---|
| 0 | According to a first virtual cell ID | According to a first PRB offset $N_{RB,new,1}^{(2)}$ (or a first $N_{PUCCH}^{(1)}$) |
| 1 | According to a second virtual cell ID | According to a second PRB offset $N_{RB,new,2}^{(2)}$ (or a second $N_{PUCCH}^{(1)}$) |

In another example, UE2 generates UL RS base sequence for a PUCCH format 1a/1b and maps the PUCCH format 1a/1b in the time-frequency resources according to both the SC-ID and the one-bit VCID field in the DL grant as shown in Table 50. In Table 50, the value of the VCID field determines $N_{RB,offset}^{(2)}$, while the value of SC-ID determines $n_{offset}$.

TABLE 50

Base RS sequence generation example

| SC-ID indicated in the DL grant | One-bit VCID field in the DL grant | Base sequence generation method | PUCCH format 1a/1b resource mapping |
|---|---|---|---|
| 0 | 0 | According to a first virtual cell ID | According to a first PRB offset $N_{RB,new,1}^{(2)}$ (or a first $N_{PUCCH}^{(1)}$) and a first $n_{offset,1}$ |
| 0 | 1 | According to a second virtual cell ID | According to a second PRB offset $N_{RB,new,1}^{(2)}$ (or a second $N_{PUCCH}^{(1)}$) and a first $n_{offset,1}$ |
| 1 | 0 | According to a first virtual cell ID | According to a first PRB offset $N_{RB,new,2}^{(2)}$ (or a first $N_{PUCCH}^{(1)}$) and a second $n_{offset,2}$ |
| 1 | 1 | According to a second virtual cell ID | According to a second PRB offset $N_{RB,new,2}^{(2)}$ (or a second $N_{PUCCH}^{(1)}$) and a second $n_{offset,2}$ |

In another embodiment, UE2 in FIG. 8 or FIG. 10 is configured with CSI-RS configurations 1 and 2. Then, UE2 determines a PUCCH format 2/2a/2b resource and generates its base sequence differently depending on the RRC configured virtual cell ID, or VCID. The PUCCH format 2/2a/2b is configured for periodic CQI/PMI/RI reporting. For example, the Rel-11 configuration for periodic CQI/PMI/RI includes the VCID. More specifically, the RRC message for periodic reporting can be constructed by adding a new field VCID. As another example, a CSI-RS configuration includes the VCID and periodic CQI/PMI/RI configuration.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a user equipment (UE) configured to communicate with a plurality of base stations in a wireless network, a method comprising:
    receiving a downlink grant scheduling a physical downlink shared channel (PDSCH) for the UE, the downlink grant being transmitted in a physical downlink control channel (PDCCH) or an enhanced physical downlink control channel (ePDCCH); and
    receiving UE-specific demodulation reference signals (UE-RS) provided for demodulation of the PDSCH, wherein the UE-RS are scrambled according to a scrambling sequence initialized with an initialization value $c_{init}$,
    wherein the downlink grant comprises a one-bit scrambling identifier (SCID) information field configured to indicate a pair of values comprising a scrambling identifier $n_{SCID}$ and a virtual cell ID $N_{v\text{-}ID}^{cell}$ out of two candidate pairs, the pair of values to be used for determining the initialization value $c_{init}$ for the UE-RS,
    wherein $c_{init}$ is determined according to the equation $$c_{init} = (\lfloor n_s/2 \rfloor + 1) \cdot (2N_{v\text{-}ID}^{cell} + 1) \cdot 2^{16} + n_{SCID}$$

where $n_s$ is a slot number.

2. The method of claim 1, wherein the SCID information field in the downlink grant replaces a SCID field in a standard 3GPP LTE DCI format 2B or DCI format 2C downlink grant.

3. The method of claim 1, wherein the two candidate pairs of values are associated with two radio resource control (RRC)-configured values, RRC_SCID0 and RRC_SCID1, wherein each of RRC_SCID0 and RRC_SCID1 comprises a pair of values for $(N_{v\text{-}ID}^{cell}, n_{SCID})$.

4. The method of claim 1, wherein the two candidate pairs of values for $N_{v\text{-}ID}^{cell}, n_{SCID})$ comprise $(N_{v\text{-}ID,0}^{cell}, 0)$ and $(N_{v\text{-}ID,1}^{cell}, 1)$, wherein $N_{v\text{-}ID,0}^{cell}$ and $N_{v\text{-}ID,1}^{cell}$ are RRC-configured.

5. The method of claim 1, further comprising:
    transmitting a hybrid automatic repeat request acknowledgement signal (HARQ-ACK) in a physical uplink channel (PUCCH) selected among a plurality of PUCCHs, wherein the plurality of PUCCHs are partitioned into a plurality of zones, wherein a first of the zones is associated with a first UE-specific uplink reference signal (UL RS) base sequence and a second of the zones is associated with a second UE-specific UL RS base sequence.

6. The method of claim 5, wherein the first PUCCH zone is indicated by a first value of the SCID and the second PUCCH zone is indicated by a second value of the SCID.

7. The method of claim 5, wherein the index of the PUCCH for the HARQ-ACK is determined according to the equation $$n_{PUCCH}^{(1)} = n_{CCE} + n_{offset} + N_{PUCCH}^{(1)}$$

where $N_{PUCCH}^{(1)}$ is RRC configured, $n_{CCE}$ is a smallest control channel element (CCE) number of the PDCCH, and $n_{offset}$ is an offset value selected among a plurality of predetermined candidate values.

8. The method of claim 7, wherein a first of the plurality of predetermined candidate values is indicated by a first value of the SCID and a second of the plurality of predetermined candidate values is indicated by a second value of the SCID.

9. The method of claim 7, wherein the plurality of predetermined candidate values are RRC configured.

10. A user equipment (UE) configured to communicate with a plurality of base stations in a wireless network, the user equipment comprising:
    a processor configured to:
        receive a downlink grant scheduling a physical downlink shared channel (PDSCH) for the UE, the downlink grant being transmitted in a physical downlink control channel (PDCCH) or an enhanced physical downlink control channel (ePDCCH); and
        receive UE-specific demodulation reference signals (UE-RS) provided for demodulation of the PDSCH, wherein the UE-RS are scrambled according to a scrambling sequence initialized with an initialization value $c_{init}$,
    wherein the downlink grant comprises a one-bit scrambling identifier (SCID) information field configured to indicate a pair of values comprising a scrambling identifier $n_{SCID}$ and a virtual cell ID $N_{v\text{-}ID}^{cell}$ out of two candidate pairs, the pair of values to be used for determining the initialization value $c_{init}$ for the UE-RS, wherein $c_{init}$ is determined according to the equation $$c_{init}=(\lfloor n_s/2 \rfloor+1)\cdot(2N_{v\text{-}ID}^{cell}+1)\cdot 2^{16}+n_{SCID}$$

where $n_s$ is a slot number.

11. The UE of claim 10, wherein the SCID information field in the downlink grant replaces a SCID field in a standard 3GPP LTE DCI format 2B or DCI format 2C downlink grant.

12. The UE of claim 10, wherein the two candidate pairs of values are associated with two radio resource control (RRC)-configured values, RRC_SCID0 and RRC_SCID1, wherein each of RRC_SCID0 and RRC_SCID1 comprises a pair of values for $(N_{v\text{-}ID}^{cell}, n_{SCID})$.

13. The UE of claim 10, wherein the two candidate pairs of values for $(N_{v\text{-}ID}^{cell}, n_{SCID})$ comprise $(N_{v\text{-}ID,0}^{cell}, 0)$, and $(N_{v\text{-}ID,1}^{cell}, 1)$, wherein $N_{v\text{-}ID,0}^{cell}$ and $N_{v\text{-}ID,1}^{cell}$ are RRC-configured.

14. The UE of claim 10, the processor further configured to:
transmit a hybrid automatic repeat request acknowledgement signal (HARQ-ACK) in a physical uplink channel (PUCCH) selected among a plurality of PUCCHs, wherein the plurality of PUCCHs are partitioned into a plurality of zones, wherein a first of the zones is associated with a first UE-specific uplink reference signal (UL RS) base sequence and a second of the zones is associated with a second UE-specific UL RS base sequence.

15. The UE of claim 14, wherein the first PUCCH zone is indicated by a first value of the SCID and the second PUCCH zone is indicated by a second value of the SCID.

16. The UE of claim 14, wherein the index of the PUCCH for the HARQ-ACK is determined according to the equation $$n_{PUCCH}^{(1)}=n_{CCE}+n_{offset}+N_{PUCCH}^{(1)}$$

where $N_{PUCCH}^{(1)}$ is RRC configured, $n_{CCE}$ is a smallest control channel element (CCE) number of the PDCCH, and $n_{offset}$ is an offset value selected among a plurality of predetermined candidate values.

17. The UE of claim 16, wherein a first of the plurality of predetermined candidate values is indicated by a first value of the SCID and a second of the plurality of predetermined candidate values is indicated by a second value of the SCID.

18. The UE of claim 16, wherein the plurality of predetermined candidate values are RRC configured.

19. A base station configured for communication with a plurality of user equipments (UEs), the base station comprising:
a processor configured to:
transmit a downlink grant scheduling a physical downlink shared channel (PDSCH) for the UE, the downlink grant being transmitted in a physical downlink control channel (PDCCH) or an enhanced physical downlink control channel (ePDCCH); and
transmit UE-specific demodulation reference signals (UE-RS) provided for demodulation of the PDSCH, wherein the UE-RS are scrambled according to a scrambling sequence initialized with an initialization value $c_{init}$,
wherein the downlink grant comprises a one-bit scrambling identifier (SCID) information field configured to indicate a pair of values comprising a scrambling identifier $n_{SCID}$ and a virtual cell ID $N_{v\text{-}ID}^{cell}$ out of two candidate pairs, the pair of values to be used for determining the initialization value $c_{init}$ for the UE-RS,
wherein $c_{init}$ is determined according to the equation $$c_{init}=(\lfloor n_s/2 \rfloor+1)\cdot(2N_{v\text{-}ID}^{cell}+1)\cdot 2^{16}+n_{SCID}$$

where $n_s$ is a slot number.

20. The base station of claim 19, wherein the SCID information field in the downlink grant replaces a SCID field in a standard 3GPP LTE DCI format 2B or DCI format 2C downlink grant.

21. The base station of claim 19, wherein the two candidate pairs of values are associated with two radio resource control (RRC)-configured values, RRC_SCID0 and RRC_SCID1, wherein each of RRC_SCID0 and RRC_SCID1 comprises a pair of values for $(N_{v\text{-}ID}^{cell}, n_{SCID})$.

22. The base station of claim 19, wherein the two candidate pairs of values for cell $(N_{v\text{-}ID}^{cell}, n_{SCID})$ comprise $(N_{v\text{-}ID,0}^{cell}, 0)$ and $(N_{v\text{-}ID,1}^{cell}, 1)$, wherein $N_{v\text{-}ID,0}^{cell}$ and $N_{v\text{-}ID,1}^{cell}$ are RRC-configured.

23. The base station of claim 19, the processor further configured to:
receive a hybrid automatic repeat request acknowledgement signal (HARQ-ACK) in a physical uplink channel (PUCCH) selected among a plurality of PUCCHs, wherein the plurality of PUCCHs are partitioned into a plurality of zones, wherein a first of the zones is associated with a first UE-specific uplink reference signal (UL RS) base sequence and a second of the zones is associated with a second UE-specific UL RS base sequence.

24. The base station of claim 23, wherein the first PUCCH zone is indicated by a first value of the SCID and the second PUCCH zone is indicated by a second value of the SCID.

25. The base station of claim 23, wherein the index of the PUCCH for the HARQ-ACK is determined according to the equation $$n_{PUCCH}^{(1)}=n_{CCE}+n_{offset}+N_{PUCCH}^{(1)}$$

where $N_{PUCCH}^{(1)}$ is RRC configured, $n_{CCE}$ is a smallest control channel element (CCE) number of the PDCCH, and $n_{offset}$ is an offset value selected among a plurality of predetermined candidate values.

26. The base station of claim 25, wherein a first of the plurality of predetermined candidate values is indicated by a first value of the SCID and a second of the plurality of predetermined candidate values is indicated by a second value of the SCID.

27. The base station of claim 25, wherein the plurality of predetermined candidate values are RRC configured.

* * * * *